(12) United States Patent
Stuckenberg et al.

(10) Patent No.: US 12,276,090 B2
(45) Date of Patent: Apr. 15, 2025

(54) ATMOSPHERIC WATER GENERATION SYSTEMS AND METHODS

(71) Applicant: Genesis Systems LLC, Tampa, FL (US)

(72) Inventors: David James Stuckenberg, Tampa, FL (US); Erick Keith Went, Camarillo, CA (US); Owen Michael Erickson, Tampa, FL (US); Shania Samantha Madramootoo, Dover, FL (US); Miguel Angel Jurado, Jr., Brandon, FL (US); Ethan Emerson Plumer, Riverview, FL (US); Jashal Patel, Brandon, FL (US)

(73) Assignee: GENESIS SYSTEMS LLC, Tampa, FL (US)

( * ) Notice: Subject to any disclaimer, the term of this patent is extended or adjusted under 35 U.S.C. 154(b) by 476 days.

(21) Appl. No.: 17/552,173

(22) Filed: Dec. 15, 2021

(65) Prior Publication Data

US 2022/0195706 A1 Jun. 23, 2022

Related U.S. Application Data

(60) Provisional application No. 63/126,860, filed on Dec. 17, 2020.

(51) Int. Cl.
*B01D 53/02* (2006.01)
*C02F 1/04* (2023.01)
*E03B 3/28* (2006.01)

(52) U.S. Cl.
CPC ........... *E03B 3/28* (2013.01); *C02F 1/041* (2013.01); *C02F 1/043* (2013.01); *C02F 2201/005* (2013.01); *C02F 2303/18* (2013.01)

(58) Field of Classification Search
CPC .. A01D 46/30; A01G 2009/248; A01G 9/085; A01G 9/143; A01G 9/1438;
(Continued)

(56) References Cited

U.S. PATENT DOCUMENTS

| 4,134,269 A | 1/1979 | Arzet |
| 4,315,599 A | 2/1982 | Biancardi |

(Continued)

FOREIGN PATENT DOCUMENTS

| CN | 1223325 A | 7/1999 |
| CN | 203675747 U | 7/2014 |

(Continued)

OTHER PUBLICATIONS

Bocanegra, R., et al., "Multiple electrosprays emitted from an array of holes", Journal of Aerosol Science, Dec. 2005, pp. 1387-1399, vol. 36, No. 12, Elsevier Ltd., UK.

(Continued)

*Primary Examiner* — Christopher P Jones
(74) *Attorney, Agent, or Firm* — ALSTON & BIRD LLP

(57) ABSTRACT

An atmospheric water generation system comprises water vapor consolidation systems configured to increase the relative humidity of a controlled air stream prior to condensing water from the controlled air stream. The water vapor consolidation system comprises a fluid-desiccant flow system configured to decrease the temperature of the desiccant to encourage water vapor to be absorbed by the desiccant from an atmospheric air flow. The desiccant flow is then heated to encourage water vapor evaporation from the desiccant flow into a controlled air stream that circulates within the system. The humidity of the controlled air stream is thereby increased above the relative humidity of the atmospheric air to facilitate condensation of the water vapor into usable liquid water.

11 Claims, 19 Drawing Sheets

(58) Field of Classification Search
CPC .......... A01G 9/24; A01G 9/243; A01G 9/247; B01D 2251/302; B01D 2251/404; B01D 2251/60; B01D 2252/2026; B01D 2257/504; B01D 5/0003; B01D 53/1425; B01D 53/263; C02F 1/041; C02F 1/043; C02F 2201/005; C02F 2303/18; E03B 3/28; F24F 11/30; F24F 2110/10; F24F 2110/20; F24F 2110/70; F24F 3/1417; Y02A 20/00; Y02A 40/25; Y02B 30/70; Y02P 60/12

See application file for complete search history.

(56) References Cited

U.S. PATENT DOCUMENTS

| | | | |
|---|---|---|---|
| 4,323,424 A | 4/1982 | Secunda et al. | |
| 4,344,778 A | 8/1982 | Matsuoka et al. | |
| 5,601,236 A | 2/1997 | Wold | |
| 5,634,342 A | 6/1997 | Peeters et al. | |
| 5,857,344 A | 1/1999 | Rosenthal | |
| 6,156,102 A | 12/2000 | Conrad et al. | |
| 6,499,309 B1 | 12/2002 | Yeh | |
| 6,574,979 B2 | 6/2003 | Faqih | |
| 6,581,849 B2 | 6/2003 | Zhang | |
| 6,709,198 B2 | 3/2004 | Wachtel | |
| 7,293,420 B2 | 11/2007 | Max | |
| 7,337,615 B2 | 3/2008 | Reidy | |
| 7,895,847 B2 | 3/2011 | Larsen | |
| 7,942,011 B2 | 5/2011 | Forkosh | |
| 8,028,527 B2 | 10/2011 | Vidmar | |
| 8,321,061 B2 | 11/2012 | Anderson | |
| 8,519,012 B2 | 8/2013 | O'Connor | |
| 8,754,269 B2 | 6/2014 | O'Connor | |
| 8,820,107 B2 | 9/2014 | Parent | |
| 9,101,093 B2 | 8/2015 | Chance et al. | |
| 9,550,142 B2 | 1/2017 | Roestenberg et al. | |
| 9,751,039 B2 | 9/2017 | Gebald et al. | |
| 9,969,665 B2 | 5/2018 | O'Connor et al. | |
| 10,232,305 B2 | 3/2019 | Gebald et al. | |
| 10,260,761 B2 | 4/2019 | Martin | |
| 10,279,306 B2 | 5/2019 | Gebald et al. | |
| 10,350,547 B2 | 7/2019 | Bijl et al. | |
| 10,427,086 B2 | 10/2019 | Gebald et al. | |
| 10,583,389 B2 | 3/2020 | Stuckenberg | |
| 10,807,042 B2 | 10/2020 | Bijl et al. | |
| 10,882,743 B2 | 1/2021 | O'Connor | |
| 11,000,799 B2 | 5/2021 | Stuckenberg | |
| 11,007,470 B2 | 5/2021 | Wurzbacher et al. | |
| 11,285,425 B2 | 3/2022 | Sauerbeck et al. | |
| 11,359,356 B2 | 6/2022 | Friesen et al. | |
| 11,420,149 B2 | 8/2022 | Gebald et al. | |
| 11,441,393 B2 | 9/2022 | Meehan et al. | |
| 11,572,765 B2 | 2/2023 | Meehan et al. | |
| 11,612,879 B2 | 3/2023 | Gebald et al. | |
| 11,712,652 B2 | 8/2023 | Spiteri et al. | |
| 2004/0079228 A1 | 4/2004 | Wijmans et al. | |
| 2004/0244398 A1* | 12/2004 | Radermacher | B01D 5/0039 62/93 |
| 2007/0028769 A1 | 2/2007 | Eplee et al. | |
| 2007/0079624 A1 | 4/2007 | Max | |
| 2007/0186768 A1 | 8/2007 | Coors | |
| 2008/0135495 A1 | 6/2008 | Sher | |
| 2009/0183631 A1 | 7/2009 | Hall et al. | |
| 2010/0213201 A1 | 8/2010 | Schultz et al. | |
| 2012/0048117 A1 | 3/2012 | Katzir et al. | |
| 2013/0227879 A1 | 9/2013 | Lehky | |
| 2013/0340458 A1 | 12/2013 | Shaw et al. | |
| 2014/0048467 A1 | 2/2014 | Matsuura | |
| 2014/0352536 A1 | 12/2014 | Dahlback et al. | |
| 2015/0265962 A1 | 9/2015 | Dahlback et al. | |
| 2016/0102874 A1 | 4/2016 | Buchholz et al. | |
| 2016/0211796 A1 | 7/2016 | Hammad et al. | |
| 2016/0237659 A1 | 8/2016 | Thielow et al. | |
| 2016/0296884 A1 | 10/2016 | Tremel et al. | |
| 2016/0336467 A1 | 11/2016 | Janet | |
| 2017/0282131 A1 | 10/2017 | Berzinis et al. | |
| 2018/0167591 A1 | 6/2018 | Stuckenberg | |
| 2018/0209123 A1* | 7/2018 | Bahrami | B01D 5/006 |
| 2018/0361323 A1 | 12/2018 | Vilagines et al. | |
| 2018/0362366 A1 | 12/2018 | Shahriari et al. | |
| 2019/0060820 A1 | 2/2019 | O'Connor | |
| 2019/0153704 A1 | 5/2019 | Gido et al. | |
| 2019/0242595 A1* | 8/2019 | Eplee | F24F 13/30 |
| 2019/0331353 A1 | 10/2019 | Dahlbäck et al. | |
| 2021/0093996 A1 | 4/2021 | Cremaschi | |
| 2021/0162338 A1 | 6/2021 | Zaworotko et al. | |
| 2021/0205783 A1 | 7/2021 | O'Connor | |
| 2021/0229028 A1 | 7/2021 | Stuckenberg | |
| 2021/0244059 A1 | 8/2021 | Sobel et al. | |
| 2022/0176310 A1 | 6/2022 | Suter et al. | |
| 2022/0193598 A1 | 6/2022 | Suter et al. | |
| 2022/0195706 A1* | 6/2022 | Stuckenberg | A01G 9/1438 |
| 2022/0288505 A1 | 9/2022 | Stuckenberg et al. | |
| 2023/0160283 A1 | 5/2023 | Meehan et al. | |
| 2023/0173427 A1 | 6/2023 | Repond et al. | |
| 2023/0201759 A1 | 6/2023 | Spiteri et al. | |
| 2023/0211276 A1 | 7/2023 | Spiteri et al. | |
| 2023/0233985 A1 | 7/2023 | Vargas et al. | |
| 2023/0249123 A1 | 8/2023 | Stuckenberg | |
| 2023/0407609 A1 | 12/2023 | Stuckenberg et al. | |

FOREIGN PATENT DOCUMENTS

| | | |
|---|---|---|
| CN | 104775476 A | 7/2015 |
| CN | 107476380 A | 12/2017 |
| CN | 212881072 U | 4/2021 |
| DE | 19632272 A1 | 2/1998 |
| DE | 10154351 A1 | 5/2003 |
| EP | 2631549 A1 | 8/2013 |
| EP | 2643530 A1 | 10/2013 |
| EP | 3481535 A1 | 5/2019 |
| IL | 246467 | 11/2016 |
| JP | 55-152521 A | 11/1980 |
| JP | 2008-511774 A | 4/2008 |
| WO | WO 2006/026494 A1 | 3/2006 |
| WO | WO 2006/129200 A2 | 12/2006 |
| WO | WO 2008/018071 A2 | 2/2008 |
| WO | WO 2011/062554 A1 | 5/2011 |
| WO | 2011/150081 A2 | 12/2011 |
| WO | WO 2012/073794 A1 | 6/2012 |
| WO | 2012/162545 A2 | 11/2012 |
| WO | WO 2013/002612 A2 | 1/2013 |
| WO | WO 2015/162599 A2 | 10/2015 |
| WO | WO 2016/081863 A1 | 5/2016 |
| WO | WO 2016/187709 A1 | 12/2016 |
| WO | 2018/002918 A1 | 1/2018 |

OTHER PUBLICATIONS

Cai, Yufeng, et al., "Energy-efficient desalination by forward osmosis using responsive ionic liquid draw solutes", Environmental Science Water Research & Technology, Feb. 11, 2015, pp. 341-347, retrieved from the Internet at https://pubs.rsc.org/en/content/articlepdf/2015/ew/c4ew00073k on Sep. 30, 2023.

Castell, Dominic C., et al., "Crystal Engineering of Two Light and Pressure Responsive Physisorbents", Angewandte Chemie International Edition, Mar. 2023, 7 pages, vol. 62, Wiley-VCH GmbH, Germany.

Chen, Zhihui, et al., "Recent progress on sorption/desorption-based atmospheric water harvesting powered by solar energy", Solar Energy Materials and Solar Cells, Jun. 18, 2021, 19 pages, vol. 230, No. 111233, Elsevier BV, NL.

Dumitran, L. M., et al., "Experimental Study of Air Dehumidification in an Electrostatic Wire-Cylinder Condenser", Proceedings of the 10th International Symposium on Advanced Topics in Electrical Engineering, Mar. 23-25, 2017, pp. 440-443, Bucharest, Romania, IEEE.

Gido, Ben, et al., "Liquid-Desiccant Vapor Separation Reduces the Energy Requirements of Atmospheric Moisture Harvesting", Environmental Science & Technology, Jul. 20, 2016, pp. 8362-8367, vol. 50, ACS Publications, US.

(56) References Cited

OTHER PUBLICATIONS

International Searching Authority, International Search Report and Written Opinion for International Application No. PCT/US2017/067915, dated Apr. 12, 2018, 15 pages, European Patent Office, Netherlands.

IP Australia, Examination Report received for Application No. 2021209303, dated Sep. 9, 2022, 6 pages, Australia.

Liu, Aotian, et al., "Photo-modulated regeneration of hypercrosslinked polymer adsorbents for water treatment," Separation and Purification Technology, Jan. 15, 2024, (Sep. 22, 2023 (online)), 13 pages, vol. 329, No. 125142, Elsevier, B.V., Netherlands.

Nikolayenko, Varvara I., et al., "Guest-Induced Structural Transformations in a Porous Halogen-Bonded Framework", Angewandte Chemie International Edition, Jul. 2018, pp. 12086-12091, vol. 57, Wiley-VCH Verlag GmbH& Co. KGaA, Germany.

Outgoing—ISA/210—International Search Report and Written Opinion Mailed on Aug. 1, 2023 for WO Application No. PCT/US23/022886, 9 page(s).

Outgoing—ISA/210—International Search Report and Written Opinion Mailed on Jul. 11, 2022 for WO Application No. PCT/US22/019491, 8 page(s).

Owens, J. S., "Salt Crystals as Nuclei of Sea Fog Particles", Nature, Jun. 2, 1928, p. 866, vol. 121, No. 866, retrieved from the Internet at https://www.nature.com/articles/121866c0 on Sep. 30, 2023.

Parhizkar, M. et al., "Performance of novel high throughput multi electrospray systems for forming of polymeric microlnanoparticles", Materials & Design, Apr. 9, 2017, pp. 73-84, vol. 126, Elsevier Ltd., UK.

Peeters, Robin, et al., "Fresh water production from atmospheric air: Technology and innovation outlook", iScience, Nov. 19, 2021, vol. 24, No. 103266, retrieved from the Internet at https://www.researchgate.net/publication/355434143_Fresh_Water_Production_from_Atmospheric_air_Technology_and_Innovation_Outlook/link/64I35bf792cfd54f8406502c/download on Sep. 30, 2023, 19 pages.

Reznikov, M., et al., "Electrically enhanced harvesting of water vapor from the air", Proceedings of 2015 ESA Annual Meeting on Electrostatics, retrieved from the Internet at http://www.electrostatics.org/images/ESA_2015_F5_Reznikov.pdf on Sep. 30, 2023, 11 pages.

Reznikov, Michael, et al., "Further Progress in the Electrostatic Nucleation of Water Vapor", IEEE Transactions on Industry Applications, Jan./Feb. 2018 (date of first publication Sep. 20, 2017), pp. 591-598, vol. 54, No. 1, IEEE, US.

Salazar, Manuel Gallardo, et al., "Electrospray technique to produce fine sprays of desiccant liquids. Application to moisture removal from air," Energy and Buildings, Mar. 1, 2018, pp. 187-197, vol. 162, Elsevier B.V., NL.

Semiat, Raphael, "Energy Issues in Desalination Processes", Environmental Science & Technology, Oct. 22, 2008, pp. 8193-8201, vol. 42, No. 22,ACS Publications, US.

Tang, K. et al. "Generation by electrospray of monodisperse water droplets for targeted drug delivery by inhalation", Journal of Aerosol Science, Sep. 1994, pp. 1237-1249, vol. 26, No. 6, Elsevier Science Ltd., UK.

U.S. Nonprovisional Patent Application for "Concentration Of Chemical Species Through The Use Of Photosensitive Sorbent Materials", unpublished (filed Dec. 13, 2023), Kurt Francis (Inventor), Genesis Systems LLC (Assignee), U.S. Appl. No. 18/538,832.

U.S. Patent and Trademark Office, Office Action received for U.S. Appl. No. 16/782,808, dated Nov. 2, 2020, 16 pages.

U.S. Patent Application for "Artificially Intelligent Atmospheric Water Generation System Control", Unpublished (filed Feb. 2, 2024), David Stuckenberg (Inventor), Genesis Systems LLC (Assignee), U.S. Appl. No. 18/431,011.

U.S. Patent Application for "Modulating Object Signatures Through the Use of Photosensitive Sorbent Coatings", Unpublished (filed Dec. 13, 2023), Kurt Francis (Inventor), Genesis Systems LLC (Assignee), U.S. Appl. No. 18/538,696.

United States Patent and Trademark Office, Office Action for U.S. Appl. No. 15/850,870, dated Jul. 30, 2019, 12 pages, U.S.

"Ink used to print paper-thin solar panels. University of Newcastle", YouTube, <https://www.youtube.com/watch?v=KhpCXTp736Y&feature=youtu.be>, May 23, 2017.

"The solar cell that is transparent like glass. Keynote Prof. Richard Lunt at BMW Welcomes.", YouTube, <https://www.youtube.com/watch?v=5Vx59VLc98E&feature=youtu.be>, Nov. 26, 2015.

Belleza, Irish E., "Burj Khalifa: Towering challenge for builders", Gulf News, Jan. 4, 2010, retrieved from <https://gulfnews.com/business/property/burj-khalifa-towering-challenge-for-builders-1.561802> on Oct. 28, 2016.

Eole Water, "Our Products: Range of Water Generators", Jan. 7, 2011 to Sep. 17, 2017, Internet Archive <https://web.archive.org/web/*/http://www.eolewater.com/gb/our-products/range.html>, 6 pages, retrieved Mar. 22, 2018.

International Searching Authority, International Search Report and Written Opinion received for International Application No. PCT/US2021/072930, dated Mar. 22, 2022, 11 pages, European Patent Office, Netherlands.

Snowden, Scott, "Solar Power Stations In Space Could Supply The World With Limitless Energy", Mar. 12, 2019, retrieved from https://www.forbes.com/sites/scottsnowden/2019/03/12/solar-power-stations-in-space-could-supply-the-world-with-limitless-energy/ on Apr. 15, 2020, 5 pages.

Wikipedia Contributors, "Air Well (Condenser)", Wikipedia, The Free Encyclopedia, Wikimedia Foundation, Inc., last modified Oct. 17, 2016, retrieved from <https://en.wikipedia.org/wiki/Air_well_(condenser)> on Oct. 28, 2016.

Wood, Daniel, "Space-Based Solar Power", U.S. Department of Energy, Mar. 6, 2014, retrieved from https://www.energy.gov/articles/space-based-solar-power on Apr. 15, 2020, 6 pages, U.S.

www.solarclothsystem.com, Jan. 17, 2017 to May 17, 2017, Internet Achieve, retrieved from https://web.archive.org/web/20170517094053/https://www.solarclothsystem.com/technology on Apr. 15, 2020, 4 pages.

Non-Final Rejection Mailed on Jul. 19, 2024 for U.S. Appl. No. 18/179,750, 10 page(s).

English Translation of JP Office Action, including Search Report dated Jul. 29, 2024 for JP Application No. 2023537236, 21 page(s).

JP Office Action, including Search Report Mailed on Jul. 29, 2024 for JP Application No. 2023537236, 16 page(s).

Non-Final Rejection Mailed on Jan. 28, 2025 for U.S. Appl. No. 17/690,550, 26 page(s).

\* cited by examiner

ATMOSPHERIC WATER GENERATION SYSTEMS AND METHODS

CROSS-REFERENCE TO RELATED APPLICATIONS

This patent application claims priority to U.S. Provisional Patent Appl. No. 63/126,860, filed Dec. 17, 2020, the contents of which are incorporated herein by reference in their entirety.

This patent application additionally relates to U.S. patent application Ser. No. 16/782,808, filed Feb. 5, 2020, which is a continuation of U.S. patent application Ser. No. 15/850,870, filed Dec. 21, 2017, which claims priority from Provisional Application Ser. No. 62/437,471, filed Dec. 21, 2016; Provisional Application Ser. No. 62/459,462, filed Feb. 15, 2017; and Provisional Application Ser. No. 62/459,478, filed Feb. 15, 2017, all of which are incorporated herein by reference in their entirety.

BACKGROUND

The amount of freshwater available for human consumption, plant irrigation, livestock and herd sustenance, commercial and/or industrial usage, and other purposes has generally been overtaken by the amount of freshwater needed for such purposes. Particularly in arid climates characterized by minimal annual rainfall and without access to other freshwater sources, maintaining an adequate amount of water for human and/or animal consumption and usage has become increasingly expensive in recent years. Processes such as desalination, water filtration and/or purification, groundwater (e.g., aquifer) exploitation, and other processes are often used in combination to supply freshwater to various geographical regions, depending on the relative availability and expense of each water sourcing process.

Water shortages in certain geographical regions are also at least partially responsible for food shortages in certain areas of the globe as well. Where water is not readily available for crop irrigation and for hydrating livestock, basic nutritional foods may be difficult to cultivate, and may be difficult or expensive to procure in an open market.

Accordingly, a need generally exists for processes that expand the availability of freshwater, particularly in arid geographical areas and/or areas with no access to standing water or sub-surface water or in areas where such have become contaminated

BRIEF SUMMARY

Certain embodiments are directed to a method for extracting water from air, the method comprising: intersecting an atmospheric air stream with a rich desiccant fluid within an absorber flowing along a desiccant circulation loop to extract water vapor from the atmospheric air stream and to absorb extracted water vapor to dilute the rich desiccant fluid to form a diluted desiccant fluid; flowing the diluted desiccant fluid along a solution flow path into an evaporator vessel to evaporate water from the diluted desiccant fluid to form a post-evaporation desiccant fluid flow and an evaporated water vapor flow; prior to flowing the diluted desiccant fluid into the evaporator vessel, heating the diluted desiccant fluid via one or more heating subsystems, wherein the one or more heating subsystems comprises at least one heat exchanger for implementing sensible heat transfer between the diluted desiccant fluid and the post-evaporation desiccant fluid flow; and directing the evaporated water vapor flow through a compressor and into a condenser to form condensed water, wherein the condenser defines at least a portion of the solution flow path and wherein the condenser is configured to utilize sensible and/or latent heat transfer between the diluted desiccant fluid flowing through the condenser and the evaporated water vapor flow to lower a temperature of the evaporated water vapor to condense the water vapor into the condensed water; and wherein the post-evaporation desiccant fluid flow is returned to the absorber as the rich desiccant fluid. In certain embodiments, evaporated water vapor is directed from the MVC evaporator vessel through a compressor and into a condenser to form condensed water, wherein the condenser defines at least a portion of the solution flow path, downstream of at least one heat exchanger, and wherein the condenser is configured to utilize sensible and/or latent heat transfer between the diluted desiccant fluid flowing through the condenser and the evaporated water vapor flow to lower a temperature of the evaporated water vapor to condense the water vapor into the condensed water; and wherein the post-evaporation desiccant fluid flow is returned to the absorber as the rich desiccant fluid.

In various embodiments, intersecting an atmospheric air stream with a rich desiccant fluid within an absorber comprises providing the atmospheric air stream and the rich desiccant fluid to the absorber with a reverse flow configuration, such that the atmospheric air stream flows from a lower portion of the absorber to an upper portion of the absorber, and the rich desiccant fluid flows from the upper portion of the absorber to the lower portion of the absorber. In certain embodiments, the rich desiccant fluid flows through a packing configuration within the absorber. In various embodiments, intersecting an atmospheric air stream with a rich desiccant fluid within an absorber comprises providing the atmospheric air stream and the rich desiccant fluid to the absorber with a cross-flow configuration, such that the atmospheric air stream flows from a first side of the absorber to an opposite second side of the absorber, and the rich desiccant fluid flows at least substantially perpendicular to the atmospheric air stream from an upper portion of the absorber to a lower portion of the absorber. In certain embodiments, the atmospheric air stream flows from an air inlet proximate an upper portion of the absorber on the first side of the absorber to an air exhaust proximate a lower portion of the absorber on the second side of the absorber. In various embodiments, the atmospheric air stream flows from an air inlet proximate a lower portion of the absorber on the first side of the absorber to an air exhaust proximate an upper portion of the absorber on the second side of the absorber. In certain embodiments, the method further comprises, prior to intersecting the atmospheric air stream with the rich desiccant fluid, passing the rich desiccant fluid through a heat exchanger cooled by a cool water flow, wherein the cool water flow is cooled via at least one of geothermal cooling system or a chiller prior to introduction to the heat exchanger.

In various embodiments, the one or more heating subsystems comprises a heater positioned downstream of the at least one heat exchanger, and wherein the method further comprises heating the diluted desiccant fluid via the heater. In certain embodiments, the desiccant circulation loop comprises a plurality of valves for reconfiguring a flow path of desiccant fluid, and wherein the method comprises: prior to flowing the diluted desiccant fluid along the solution flow path, configuring the plurality of valves such that diluted desiccant fluid is redirected into an intake of the absorber as the rich desiccant fluid for one or more fluid flow cycles; and configuring the plurality of valves such that the diluted desiccant fluid flows along the solution flow path.

In certain embodiments, the method further comprises, prior to returning the post-evaporation desiccant fluid flow to the absorber, directing the post-evaporation desiccant fluid flow to a second evaporator vessel to evaporate additional water vapor from the post-evaporation desiccant fluid flow.

Various embodiments are directed to a system for extracting water from atmospheric air, the system comprising: an absorber configured to dilute a desiccant fluid from a rich desiccant fluid state to a diluted desiccant fluid state by absorbing water vapor from atmospheric air passing across the desiccant fluid within the absorber; an evaporator vessel configured to concentrate the desiccant fluid from the diluted desiccant fluid state by evaporating water vapor from the desiccant fluid and to direct the evaporated water vapor toward a compressor; a desiccant flow path from the absorber to the evaporator vessel for providing the desiccant fluid from the absorber to the evaporator vessel, wherein the desiccant flow path comprises one or more heating subsystems and wherein the one or more heating subsystems comprises: a heat exchanger for exchanging heat from desiccant fluid exiting the evaporator vessel with the desiccant fluid passing along the desiccant flow path between the absorber and the evaporator vessel; and a condenser configured to condense the water vapor after the compressor raises a vapor pressure of the water vapor, wherein the condenser defines at least a portion of the desiccant flow path and wherein the condenser is configured to utilize sensible and/or latent heat transfer between the desiccant fluid flowing through the condenser and the water vapor to lower a temperature of the water vapor to condense the water vapor into condensed water. In certain embodiments, evaporated water vapor is directed from the evaporator vessel through a compressor and into a condenser to form condensed water, wherein the condenser defines at least a portion of the solution flow path, downstream of at least one heat exchanger, and wherein the condenser is configured to utilize sensible and/or latent heat transfer between the diluted desiccant fluid flowing through the condenser and the evaporated water vapor flow to lower a temperature of the evaporated water vapor to condense the water vapor into the condensed water; and wherein the post-evaporation desiccant fluid flow is returned to the absorber as the rich desiccant fluid.

In certain embodiments, an interior of the absorber defines a plurality of packing components, a desiccant inlet proximate an upper end of the absorber and a desiccant outlet proximate a lower end of the absorber, wherein the packing components are configured such that liquid desiccant flowing from the desiccant inlet to the desiccant outlet flows across a plurality packing components. In various embodiments, the absorber additionally defines an atmospheric air inlet proximate the lower end of the absorber and an atmospheric air outlet proximate the upper end of the absorber. In various embodiments, the method further comprises an input heat exchanger within a portion of the desiccant flow path upstream of the absorber, wherein the input heat exchanger is cooled by a cool water flow, wherein the cool water flow is cooled via a geothermal cooling system prior to introduction to the heat exchanger. In certain embodiments, the one or more heating subsystems comprises a heater positioned downstream of at least one heat exchanger. In various embodiments, the desiccant flow path is configurable via a plurality of valves between: a first configuration in which desiccant fluid exiting the absorber in the diluted state is redirected to an inlet of the absorber to be provided to the absorber as the desiccant fluid in a rich state; a second configuration in which desiccant fluid exiting the absorber is directed to the evaporator vessel; a third configuration in which desiccant fluid exiting the evaporator vessel is redirected to an inlet of the evaporator vessel; and a fourth configuration in which desiccant fluid exiting the evaporator vessel is directed to the inlet of the absorber to be provided to the absorber as the desiccant solution in the rich state.

In certain embodiments, the evaporator vessel is a first evaporator vessel, and wherein the system further comprises a second evaporator vessel connected downstream to the first evaporator vessel such that desiccant solution exiting the first evaporator vessel is directed to the second evaporator vessel. In various embodiments, the system further comprises a second set of one or more heating subsystems located between the first evaporator vessel and the second evaporator vessel, wherein the second set of one or more heating subsystems comprises a second heat exchanger for exchanging heat from desiccant fluid exiting the second evaporator vessel with the desiccant fluid passing to the second evaporator vessel. In various embodiments, the system further comprises a water storage tank for holding the condensed water.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
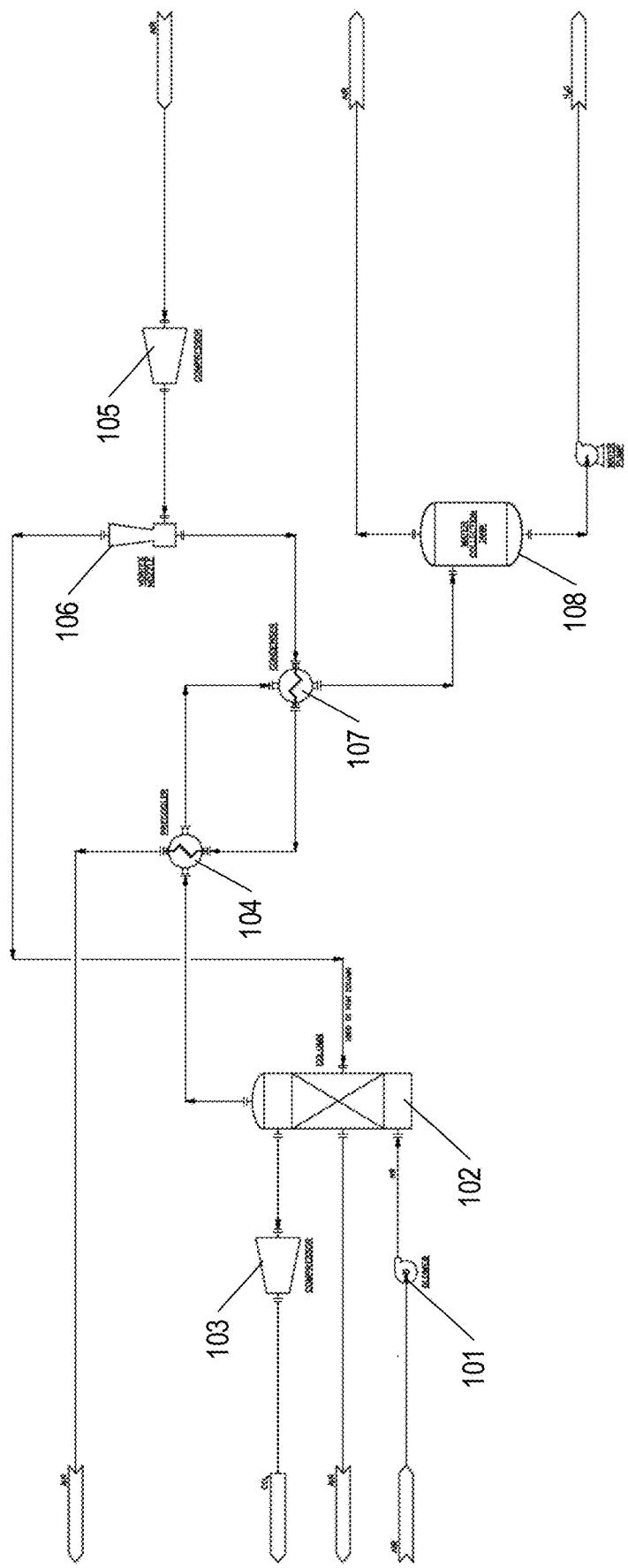
FIG. 1 shows a schematic diagram an air preconditioning system and condenser according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

The AWG system utilizes a condensation coil and/or plate system for extracting water from air. During the water extraction process of the integrated AWG process, humid air (having greater than 0% humidity) is passed over/around/through cooled condensation surfaces (e.g., coils, plates, and/or the like) to lower the temperature of the humid air below the dew point, thereby causing water vapor within the humid air to condense on the condensation surfaces. The condensed water is then directed into a collection chamber (e.g., tank, basin, and/or the like) for storage and use.

In certain embodiments, the AWG system additionally comprises one or more air compression mechanisms, air cooling mechanisms, or air humidity increasing mechanisms to optimize the amount of water extracted from air (per unit of source air intake into the AWG system).

In certain embodiments, the AWG system may be integrated with one or more carbon dioxide filtration/capture modules, one or more greenhouse modules, one or more power generation modules, and/or the like. For example, the source air intake into the AWG system may be routed through a carbon dioxide capture system prior to exhausting the dry, dehumidified air to the surrounding environment. The captured carbon dioxide may be stored for later processing in a tank, or it may be released (e.g., in a monitored quantity) into one or more greenhouse modules to increase the carbon dioxide concentration within the greenhouse to thereby increase crop growth efficiency.

Moreover, a power generation module, which may comprise one or more renewable energy power generation systems, such as solar/photovoltaic, geothermal, and/or the like, or hydrocarbon-fuel based power generation systems, may be integrated with the AWG system to provide needed electrical and/or thermal energy inputs for the AWG processes. In the event that such power generation modules generate carbon dioxide or other exhaust gases, the exhaust gases of the power generation modules may be routed through the carbon dioxide capture modules to decrease the carbon dioxide production of the integrated system.

Atmospheric Water Resources

The atmosphere contains approximately 3100 cubic miles ($mi^3$) or 12,900 cubic kilometers ($km^3$) of water. This quantity is roughly equivalent to all of the water held by the Great Lakes by volume. Water vapor as a natural resource is constantly replenished by the natural closed loop hydrologic cycle, thereby providing a nearly limitless supply of water that may be extracted from air without adverse environmental impact.

Atmospheric Water Generation

The process of AWG comprises systems and methods for extracting water vapor from atmospheric source air by condensing the water vapor and capturing the condensed, liquid water. Certain embodiments may be combined with carbon dioxide capture systems as discussed herein. Certain embodiments comprise steps for preconditioning and/or compressing raw source air (e.g., air at atmospheric conditions) to ease the water extraction process, and/or condensing the water vapor trapped within the raw source air (e.g., by increasing the humidity of at least a portion of the raw source air) to maximize the amount of water vapor that may be extracted from a given unit volume of source air. As discussed herein, processed source air is compressed, consolidated, and/or otherwise manipulated through one or more processes, for example, to ease the water extraction process.

Ultimately, various embodiments of the AWG process comprise condensation mechanisms through which source air (raw source air and/or processed source air, as discussed herein) may be directed over one or more condensation surfaces each having a surface temperature below the dew point of the source air. As the source air flows over and/or around the condensation surfaces, the temperature of the source air adjacent the condensation surfaces drops (e.g., through convective heat transfer), and water vapor within the source air condenses on the condensation surfaces, and the condensed, liquid water flows into a storage vessel (e.g., a capture tank) and/or to one or more related modules (e.g., a greenhouse module) for immediate use.

Air Preconditioning

As noted above, raw source air may be preconditioned to ease the water extraction process utilized to ultimately condense water vapor into usable liquid water. In certain embodiments, the preconditioning process may comprise steps for compressing the air to increase the vapor pressure of the air (thereby biasing a greater volume of water to the liquid state rather than the vapor state) and/or to decrease the temperature of the source air to a temperature nearer to the dew point. In certain embodiments, an air preconditioning system described herein may be utilized before and/or after a humidity increasing system, such as a dessicant-based humidity increasing system as described herein. Moreover, the air preconditioning system may be utilized before and/or after a carbon dioxide capture system as discussed herein.

As just one example, the air preconditioning process may comprise a series of compressors/pumps, venturi valves, vortex valves, manifolds, and/or the like collectively configured to decrease the temperature of the source air closer to the air dew point and/or to increase the pressure of the air prior to removing water vapor from the air (e.g., through condensation or absorption by a desiccant). For example, raw source air may be drawn into the air preconditioning system via a vacuum pressure formed at an inlet via a compressor 101 (e.g., a turbine/blower compressor having a plurality of stator or variable pitch turbine blades controllable via servo motors) and/or a centrifugal fan configured to increase the raw air pressure entering the air preconditioning system. In certain embodiments, the compressor 101 and/or centrifugal fan may be rotated via one or more electrical motors (which may receive electrical input power from one or more power systems in communication with the air preconditioning system) mechanically connected with the compressor 101 and/or centrifugal fan via a gear transmission, a belt drive, a chain drive, and/or the like.

In embodiments comprising a centrifugal fan, particulates, dust, and other heavy air contaminants are spun to the outermost edge of the centrifugal fan and are removed from the air stream and ejected from the air preconditioning system.

In the illustrated embodiment of FIG. 1, the filtered air may be directed into a carbon dioxide capture column 102, where it is passed over a fixed absorption bed configured to absorb carbon dioxide from the air, as discussed in greater detail herein. The carbon dioxide may be separated and directed away from the air stream via a compressor 103.

In certain embodiments, the filtered air (with a reduced carbon dioxide content) may then directed further through the air preconditioning system into a primary manifold, where the air is divided at a selected ratio by a variable plenum/valve. From the primary manifold, a first air stream continues along a bulk air stream, and a second air stream is directed to a vortex tube manifold as discussed herein.

The bulk air stream may proceed through one or more venturi valves each configured to decrease the pressure and temperature of the bulk air stream (the volume and quantity of air remains constant across each venturi valve while the pressure decreases, thereby causing the temperature of the air stream to decrease proportionally to the temperature) and/or through a precooler 104 (e.g., a heat exchanger with a cooling fluid passing therethough). After proceeding through the one or more venturi valves and/or the precooler 104, the bulk air stream may proceed to a temperature measurement portion, where the temperatures (e.g., dry bulb and wet bulb temperatures) of the bulk air stream are measured by one or more temperature measurement devices (e.g., thermometers) to determine the dew point of the bulk air stream. Outputs from the temperature measurement devices may be utilized by a controller to mix the bulk air stream with at least a portion of the vortex-chilled air stream to lower the temperature of the bulk air closer to the air dew point. For example, the controller may be in electronic communication with an electromechanical mixing valve that may be selectably opened or closed to vary the amount of vortex-chilled air that is introduced into the bulk air stream. Based on the determined dry-bulb and/or wet-bulb temperatures (as monitored by the controller), the controller may transmit a signal to a motor to move the electromechanical valve to a desired position to obtain a desired mixture of vortex-chilled air with the bulk air stream.

The vortex-chilled air begins as the second stream of air exiting the primary manifold. The second stream of air exits the primary manifold, and proceeds to a vortex tube manifold where it is pressurized (e.g., via a compressor 105) to a sufficient pressure to achieve a drop in temperature of the air travelling through one or more vortex tubes 106 of between approximately 70-150 degrees Fahrenheit. For example, the air may be pressurized to at least approximately 70-120 PSI prior to being directed into the one or more vortex tubes 106. Each vortex tube 106 comprises an entry port directing the stream of air tangentially into an internal spin chamber. As air enters the spin chamber, the air takes on an angular momentum, causing dense, warm air to migrate towards an exterior perimeter of the spin chamber and out of an exhaust valve. In certain embodiments, the warm air may be utilized to heat the carbon dioxide capture column 102 as shown in FIG. 1. The remaining, vortex-chilled air migrates toward the center of the spin chamber and out of a vortex outlet. As mentioned above, the vortex-chilled air may be mixed with the bulk air stream to lower the temperature of the bulk air stream closer to the dew point. As yet another alternative, the vortex chilled air may be utilized to chill the precooler 104 through which the bulk air passes.

In certain embodiments, the mixed and chilled bulk air stream is then directed into a condensation chamber 107, where the water vapor within the air is condensed into liquid water. As just one example, the bulk air stream may be directed over a series of condensation surfaces (e.g., chilled plates, screens, tubes, and/or the like configured to lower the localized temperature of the air at the condensation surfaces below the air dew point, thereby causing the water vapor to condense on the condensation surfaces. The condensed water may then be routed from the condensation surfaces into a retention chamber 108 for collection and later use. However, it should be understood that any of a variety of condensation mechanisms may be used. For example, as discussed herein, one or more desiccant-based condensation mechanisms may be utilized to more effectively remove water vapor from the bulk air stream. Moreover, in certain embodiments the air-preconditioning system may be omitted, and raw air may be filtered and/or directed immediately into a condensation chamber. Such embodiments may have a lower input power requirement, and therefore the amount of power required for water generation may be decreased.

It should also be understood that certain preconditioning system embodiments comprise one or more filters (e.g., fabric-based air filters, non-woven based air filters, and/or the like), one or more refrigerant systems (e.g., warm air is passed through a heat-exchanger to lower the temperature of the air closer to the dew point), and/or the like in place of or in addition to the vortex and venturi valve mechanisms discussed herein.

Desiccant-Based Air Humidity Increasing System

As mentioned above, certain embodiments comprise one or more subsystems configured to increase the humidity of a portion of the source air to increase the amount of water that may be extracted from the source air. Specifically, water vapor may be extracted from a first, large quantity of source air, and may be reintroduced into a second, smaller quantity of source air, thereby consolidating the water vapor of the source air and increasing the humidity of the second quantity of source air before the water vapor in the second quantity of source air is condensed into liquid water.

The desiccant-based air humidity increasing systems comprise at least one air scrubber comprising a column of aqueous desiccant. The desiccant may be selected from any of a variety of ionic solutions capable of absorbing water, such as lithium-chloride (LiCl), lithium-bromide (LiBr), Calcium Chloride (CaCl), triethylene glycol. and/or the like. In certain embodiments, the desiccant fluid may comprise a mixture of a plurality of ionic solutions, such as a mixture of LiCl solution and CaCl solution, The desiccant may be dissolved in water to provide a highly concentrated desiccant fluid that may be pumped (e.g., via liquid pumps) through the at least one desiccant column.

Moreover, the amount of water vapor that may be absorbed by the desiccant (and/or released by the desiccant into air) is dependent on the vapor pressure and temperature of a closed system including the aqueous desiccant and air adjacent the desiccant column. Accordingly, various embodiments are configured to absorb water from the air into the aqueous desiccant while the vapor pressure in the closed system is high and the temperature is low, and those same embodiments are configured to evaporate water from the desiccant into air while the vapor pressure is low and the temperature is high.

Single Stage Batch Vapor Consolidation

The single stage batch vapor consolidation system utilizes a single desiccant column that is configurable between an absorption phase and an evaporation phase. Because the functionality of the desiccant column between the absorption phase and the evaporation phase is dependent at least in part on the temperature of the closed system, the desiccant column may be switched between the absorption phase and the evaporation phase based on the ambient temperature surrounding the system. For example, the system may operate in the absorption phase during low temperature time periods (e.g., during a night time) and may operate in the evaporation phase during high temperature time periods (e.g., during a day time).

Figure 2A:
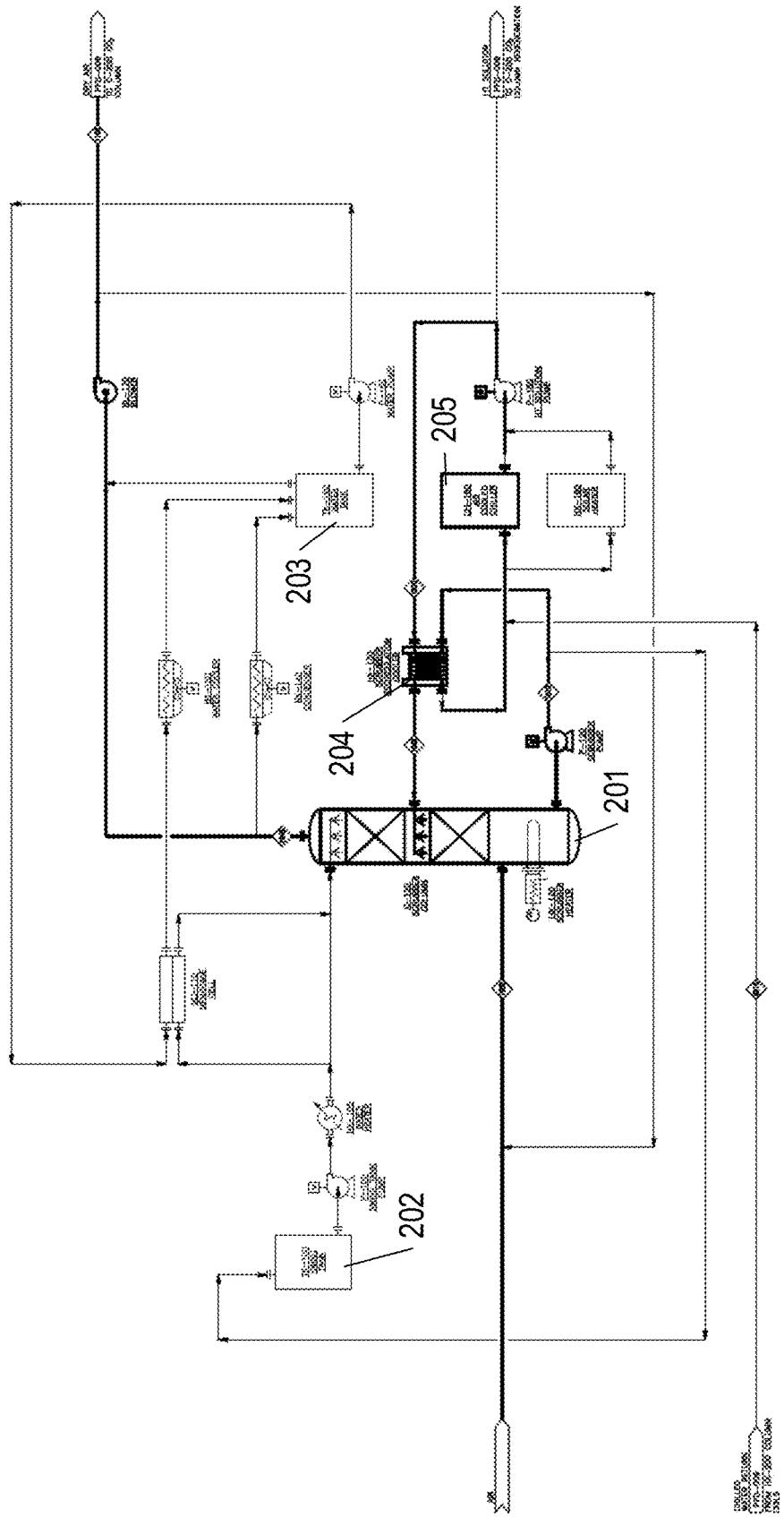
FIGS. 2A-2B show schematic diagrams of a batch vapor consolidation system inline with a vapor condensation system according to one embodiment.
Figure 2B:
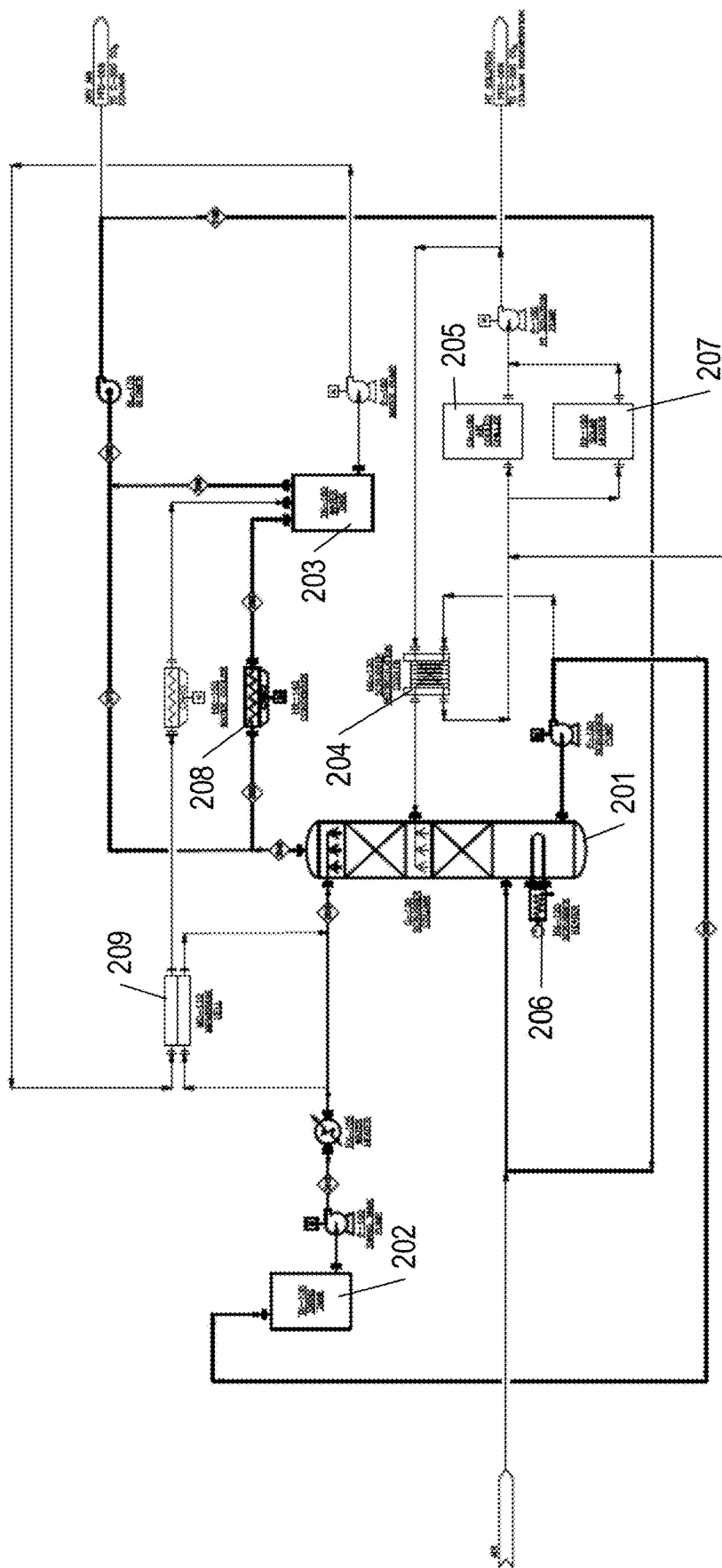

FIGS. 2A and 2B illustrate a single-stage batch vapor consolidation system according to various embodiments. Each figure highlights the fluid flow path during each of the absorption and evaporation phases, respectively. The single-stage batch vapor consolidation system comprises an air scrubber including an aqueous desiccant column 201, a desiccant swing tank 202 configured to hold excess desiccant fluid, a water tank configured to hold retrieved water 203, and one or more liquid and/or air heat exchangers.

During low-temperature ambient periods (e.g., night-time hours between sunset and sunrise), the single-stage vapor consolidation system may operate in an absorption phase, during which water vapor from ambient air is absorbed into the aqueous desiccant fluid passing through the desiccant column. Prior to beginning the absorption phase, the desiccant fluid is highly concentrated, such that the desiccant fluid is highly receptive to absorbing additional water. As the absorption phase proceeds, air having entrained water vapor is passed through the desiccant column 201 (e.g., with a turbulent flow) to contact the air with the desiccant fluid. Water vapor within the air is absorbed by the desiccant fluid, which causes the humidity of the air to drop (such that dry air exits the desiccant column), the volume of the desiccant fluid to increase, and the concentration of the desiccant fluid to decrease. Excess desiccant fluid from the desiccant column 201 is stored within the swing tank 202, which has an available volume greater than the volume of the desiccant column 201.

In certain embodiments, the desiccant column 201 may be embodied as a membrane-separated desiccant column, having a desiccant flow path on a first side of a porous membrane, and an air flow path on an opposite, second side of the porous membrane. Separating the air flow path from the desiccant fluid flow path may impede undesirable mass flow of the desiccant salt itself into the air flow path and ultimately out of the AWG system. Water may be absorbed by the desiccant fluid from the air based on osmotic water flow through the membrane from the air to the desiccant fluid. Water vapor may condense on the second side of the membrane, travel through the membrane pores through capillary action, and be absorbed by the high-salt content concentrated desiccant fluid.

Based on the mass and heat transfer from the air to the desiccant fluid, the temperature of the desiccant fluid increases as water is absorbed. Accordingly, the desiccant fluid is circulated through an absorption loop highlighted in FIG. 2B, including the desiccant column 201 and a cooling recirculation loop configured to maintain the temperature of the desiccant fluid at the ambient temperature of the system or below. In certain embodiments, the desiccant fluid may be circulated through the swing tank 202 as a part of the cooling recirculation loop.

Any of a variety of cooling mechanisms may be utilized in the cooling recirculation loop. For example, the cooling recirculation loop may comprise a dual-fluid heat exchanger 204 (e.g., a shell and tube heat exchanger; a counter-flow heat exchanger; and/or the like) in which the liquid desiccant fluid flows through a first fluid flow path, and a cooling fluid (e.g., a refrigerant, a cooled air, and/or the like) may pass through a second fluid flow path, such that heat from the liquid desiccant may be passed to the cooling fluid. The cooling fluid may be maintained at a desired cooling temperature via a traditional refrigeration cycle, via geo-thermal cooling, and/or the like. As yet another example, the liquid desiccant may pass through a geo-thermal cooling loop 205 (e.g., by directing the liquid desiccant through a series of underground conductive tubes that enables heat to pass from the liquid desiccant to the ground), and/or the like.

The absorption phase of the single-stage vapor consolidation system may be stopped when the ambient temperature begins to rise (e.g., approximately sunrise) and/or when the desiccant fluid becomes super saturated, such that the desiccant fluid at least substantially stops absorbing additional water from air passing through the desiccant column 201. In certain embodiments, concentration of the desiccant fluid may be monitored by a control system, and the control system may halt the absorption phase by stopping the various fluid pumps, air fans, and/or the like from moving various fluids through the system upon determining that a trigger event occurs. In certain embodiments, the trigger event may be identified as a threshold desiccant concentration within the desiccant fluid (e.g., once the desiccant fluid concentration drops below a threshold value, the controller may stop the absorption phase), a threshold rate of concentration change (e.g., the desiccant fluid concentration decreases by less than a threshold amount over a set period of time), and/or the like. The trigger event may be based on other characteristics of the single-stage vapor consolidation system, such as the temperature of the desiccant fluid (e.g., the temperature of the desiccant fluid increasing beyond a threshold value), the temperature (dry bulb and/or wet bulb) of the source air (e.g., the temperature of the ambient air surrounding the system increases beyond a threshold value), the volume of the desiccant fluid increases above a threshold value, and/or the like.

Once the absorption phase is stopped, the single-stage vapor consolidation system moves the desiccant fluid out of the cooling recirculation loop and into the swing tank 202. In certain embodiments, at least a portion of the desiccant fluid within the desiccant column 201 is pumped into the swing tank, such that a majority of the desiccant fluid resides in the swing tank after the absorption phase is stopped. In certain embodiments, at least 85% of the desiccant fluid is pumped into the swing tank 202 after the absorption phase is stopped.

The single-stage vapor consolidation system may be switched to an evaporation phase. In certain embodiments, the single-stage vapor consolidation system may be switched to the evaporation phase upon the detection of a trigger event by a controller. For example, once the ambient air temperature surrounding the single-stage vapor consolidation system increases above a threshold temperature, once the concentration of the desiccant fluid decreases below a threshold concentration, and/or the like, the single-stage vapor consolidation system may switch into the evaporation phase. In various embodiments, the single-stage vapor consolidation system is configured to switch directly between the absorption phase and the evaporation phase. Accordingly, it should be understood that any of the trigger events noted above as being used to determine the end of the absorption phase may be used (e.g., simultaneously and/or consecutively) to begin the evaporation phase.

However, it should be understood that in certain embodiments the single-stage vapor consolidation system may be configured to enter a stand-by phase between the end of the absorption phase and the beginning of the evaporation phase. For example, the single-stage vapor consolidation system may be configured to enter the stand-by phase upon the detection of a first trigger event (e.g., the concentration of the desiccant fluid decreases below a threshold level) and the single-stage vapor consolidation system may be configured to begin the evaporation phase (thus ending the standby phase) upon the occurrence of a second trigger event (e.g., the ambient temperature surrounding the single-stage vapor consolidation system increases above a threshold level).

During the evaporation phase, air within the single-stage vapor consolidation system is circulated in a closed loop as shown in FIG. 2B, such that water vapor evaporated from the liquid desiccant does not leave the single-stage vapor consolidation system.

As the air circulates through the closed loop of the single-stage vapor consolidation system, the low-concentration desiccant fluid is pumped through a closed loop from the swing tank 202, past/through a heater 206, and through the desiccant column 201 of the scrubber. In certain embodiments, the swing tank 202 and/or the desiccant column 202 may comprise a heater 206 as shown in FIG. 2B, such that a separate heating mechanism is unnecessary. However, it should be understood that the heater mechanism may be embodied in any of a variety of forms that may be implemented as a part of the swing tank 202, a part of the desiccant column 201, or as a separate mechanism located within the closed loop of the desiccant flow. For example, the heater may comprise a resistance heater having a heating element positioned within the flow path of the liquid desiccant. As yet another example, the heater may comprise a dual-fluid heat exchanger, in which the liquid desiccant flows through a first fluid flow path and a heating fluid (e.g., a heated gas, a heated liquid, and/or the like) flows through a second flow path such that heat from the heating fluid is transferred (e.g., via conductive heat transfer) to the liquid desiccant. As a specific example, the heat exchanger may comprise a shell and tube heat exchange, a plate heat exchanger, or a counter-flow heat exchanger. In such embodiments, the heating fluid may be heated using any of a variety of heating mechanisms, such as a resistance heater having a heater element within the fluid flow of the heating fluid, a solar-heater in which the heating fluid flows through a series of solar-heated tubes that absorb radiant and/or convective ambient heat, and/or the like.

As yet another example, the desiccant fluid may flow through a solar heater 207 comprising a series of solar-heated tubes that absorb radiant and/or convective ambient heat, and/or the like to heat the desiccant fluid to a desired temperature.

The heating mechanism of the closed-loop desiccant flow path may be configured to heat the temperature of the liquid desiccant fluid to lower the vapor pressure of the closed system of air and liquid within the desiccant column. In certain embodiments, the heating mechanism is configured to heat the desiccant fluid to a steady-state temperature of at least about 65-95 degrees Celsius.

The evaporation phase of the single-stage batch vapor consolidation system may operate as a desalination system to remove water from the desiccant fluid. As air and heated desiccant fluid pass through the desiccant column 201, water from the desiccant fluid evaporates into the air, thereby increasing the concentration of the desiccant fluid while simultaneously increasing the humidity of the air. This mass transfer causes the temperature of the desiccant fluid to decrease, and the heating mechanism is configured to maintain the desiccant fluid at a desired elevated temperature.

As discussed in greater detail herein, the elevated-humidity air may be directed through a condensation chamber 208 as a part of the closed-loop air flow path to condense water from the air to lower the humidity of the air and to collect the water as a usable liquid within the water tank 203. This simultaneously enables the collection of usable water and maintains the humidity level of the air at a desired low level to maintain a low vapor pressure within the desiccant column to encourage water to evaporate from the desiccant fluid.

In certain embodiments, the condensation chamber 208 may comprise a heat exchanger configured to lower the temperature of the increased-humidity air exiting the desiccant column 201 closer to the dew point of the air to increase the rate of condensation once the air enters the condensation chamber 208.

Various embodiments may additionally comprise a membrane desalination system 209 inline with the desiccant closed loop flow path. In the membrane desalination system 209, the desiccant flow path may flow past a first side of a membrane, such that the desiccant fluid contacts the membrane as it travels along the desiccant flow path. The membrane may separate the desiccant fluid flow path from a water flow path for water collected from the condensation process described herein. The water flow path may pass a second side of the membrane such that the water contacts the second side of membrane as it flows along the water flow path. In certain embodiments the mass transfer across the membrane may be driven by raising the vapor pressure of the desiccant. This may be accomplished by heating of the liquid prior to contact with the membrane or using a vacuum to reduce the pressure on the second side of the membrane or a combination of both. The water in the desiccant begins permeation of the membrane in the liquid state and exits the membrane in a vapor state. The water is then condensed utilizing a heat exchanger (e.g. condenser) and/or contacting it with a colder fluid (e.g. condensed water).

The membrane may comprise a porous membrane, such as non-woven membrane having a small pore size. As just one example, the membrane may comprise expanded polytetrafluoroethylene (ePTFE). As the desiccant fluid and the water flow past opposite sides of the membrane, water molecules migrate from the high-salt content desiccant fluid through the membrane (via capillary action), to the water flow. The membrane desalination system 209 may be positioned between the swing tank 202 and the desiccant column 201, such that the desiccant fluid first passes through the membrane system before entering the desiccant column 201. Accordingly, a first quantity of water may be removed from the desiccant fluid at the membrane system before the desiccant fluid enters the desiccant column for evaporation of additional water therefrom.

Moreover, as mentioned above, the single-stage batch vapor consolidation system may be a part of an AWG system comprising one or more air preconditioning systems and/or carbon dioxide capture systems. For example, the air preconditioning system may be located upstream of the single-stage batch vapor consolidation system, such that source air entering the AWG system first passes through the air preconditioning system prior to entering the single-stage batch vapor consolidation system.

In certain embodiments, the AWG system may comprise an air preconditioning system as discussed above between the single-stage batch vapor consolidation system and the condensation chamber.

Single Stage Continuous Vapor Consolidation

Figure 3A:
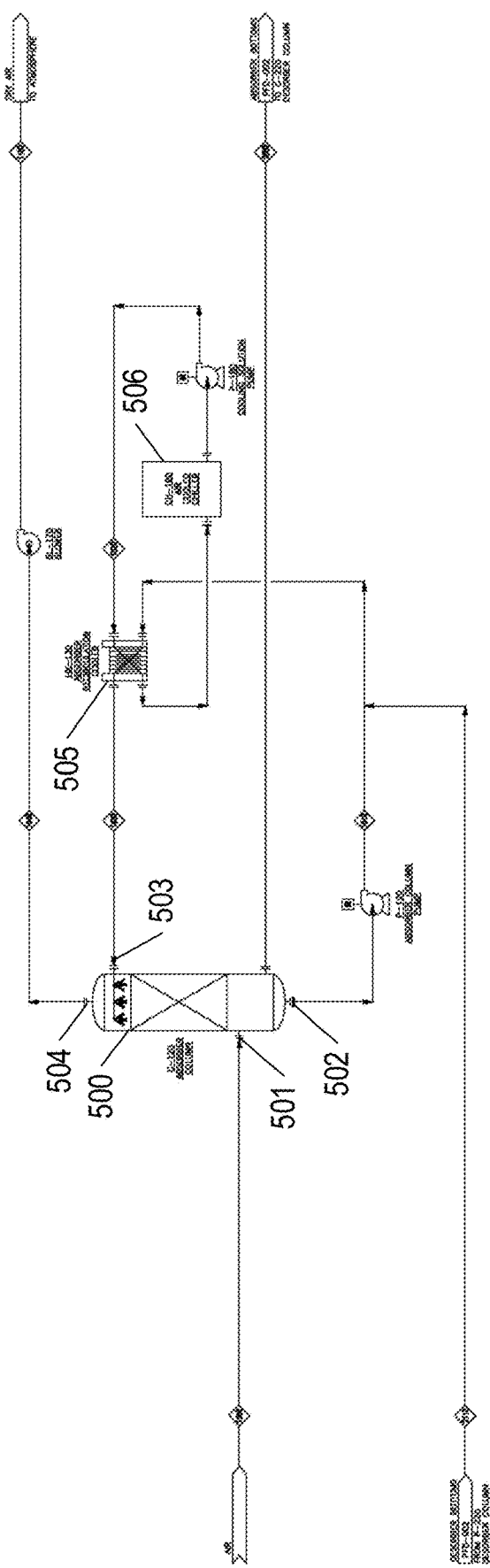
FIGS. 3A-3B show a schematic diagram of a continuous vapor consolidation system inline with a water vapor condensation system according to one embodiment.
Figure 3B:
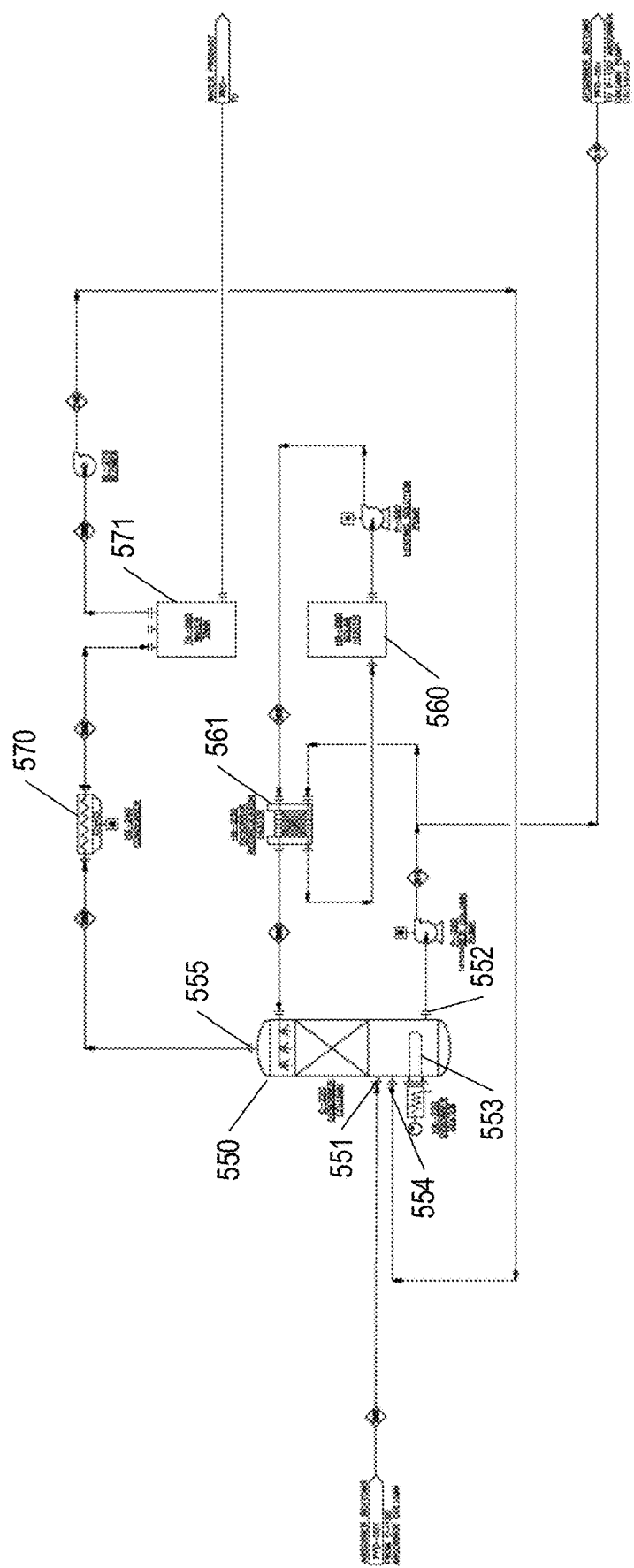

FIGS. 3A-3B illustrate a single-stage continuous vapor consolidation system according to an example embodiment. The single-stage continuous vapor consolidation system is configured to continuously absorb water from air in an absorption desiccant column 500 and to simultaneously evaporate water into air in a second, evaporation desiccant column 550. The absorption desiccant column 500 is in fluid connection with the evaporation desiccant column 550 (e.g., via a series of closable valves, such that desiccant fluid may flow between the absorption desiccant column 500 and the evaporation desiccant column 550 as needed. In short, the desiccant fluid absorbs water from air entering the system via an air input 501 while in the absorption column 500, and the dilute desiccant fluid then exits the absorption column at a solution exit 502 passes through a series of fluid conduits and enters into the evaporation column 550 at a diluted input 551, where water in the desiccant fluid is evaporated into a closed air stream. The rich desiccant fluid exits the evaporation desiccant column at a rich solution exit 552 and travels into to the absorption column at a rich solution entrance 503 for another cycle. As shown in the figures, the various conduits may be optionally be closed to create closed loop systems at the absorber 500 and the evaporation column 550, respectively.

As noted, the single-stage continuous vapor consolidation system comprises an absorption scrubber including an absorption desiccant column 500, and an evaporation scrubber including an evaporation desiccant column 550. In certain embodiments, the absorption desiccant column 500 operates at a low temperature (e.g., a temperature lower than an ambient temperature) to facilitate absorption of water vapor from air (passing through the absorption desiccant column 500 from air entrance 501 to air exit 504) into the desiccant fluid. Accordingly, as rich desiccant fluid is moved toward the absorption column 500, the desiccant fluid may pass through a cooling recirculation loop to maintain the temperature of the desiccant fluid at a desired temperature (e.g., at an ambient temperature or below an ambient temperature). The cooling recirculation loop may have a configuration similar to the cooling recirculation loop discussed above.

As just one example, rich desiccant fluid moving toward the absorption column 500 (e.g., exiting the evaporation column) may be directed through a series of geothermal tubes having heat transfer properties with surrounding ground beneath the AWG system. The rich desiccant fluid may directly pass through the series of geothermal tubes, or the rich desiccant fluid may pass through a dual-fluid heat exchanger opposite a cooling fluid that is maintained at a desired low temperature via geothermal cooling. As yet another example as shown in FIG. 3A, the desiccant fluid may pass through a heat exchanger (e.g., a shell-and-tube heat exchanger) to cool the desiccant fluid. The heat exchanger may be cooled via a cooling solution that passes through a refrigeration circuit and/or other fluid chiller 506 to absorb heat from the desiccant fluid before the desiccant fluid enters the absorption column 500.

As yet another example, the single-stage water consolidation system may be positioned proximate a high-pressure gas well, such as proximate a natural gas well, an oil well (where natural gas is extracted simultaneously with oil), and/or the like. The high pressure gas may be directed through one or more expansion valves to regulate and/or decrease the pressure of the incoming gas, which, through the Joules-Thompson effect, experiences a rapid temperature decrease (following the gas law formula, the pressure of the gas rapidly decreases across the valve while the volume and amount of gas remains substantially constant, thereby causing a proportional rapid temperature decrease across the expansion valve). The expanded and super-cooled gas may be passed through a heat exchanger 505 opposite the rich desiccant fluid, thereby absorbing heat from the rich desiccant fluid and decreasing the temperature of the desiccant fluid prior to entry into the absorption column 500 as described in referenced Provisional Application No. 62/459,462, filed Feb. 15, 2017 and incorporated herein by reference in its entirety. The expanded gas may then be directed away from the AWG system, where it may be collected for future use, flared off, utilized for power generation (e.g., via a steam turbine), and/or utilized to heat the desiccant fluid entering the evaporation column, as discussed herein.

The absorption column 500 of the single-stage continuous vapor consolidation system may operate in a manner similar to the absorption phase of the single-stage batch vapor consolidation system described above. As mentioned, prior to entry into the absorption column 500, the desiccant fluid is highly concentrated, such that the desiccant fluid is highly receptive to absorbing additional water. As the desiccant fluid passes through the absorption column 500, air having entrained water vapor is simultaneously passed through the absorption column (e.g., with a turbulent flow) to contact the air with the desiccant fluid. Water vapor within the air is absorbed by the desiccant fluid, which causes the humidity of the air to drop (such that dry air exits the desiccant column), the volume of the desiccant fluid to increase, and the concentration of the desiccant fluid to decrease. As the volume of the desiccant fluid increases (and its concentration decreases) excess desiccant fluid is directed toward the evaporation column 550 discussed herein. In certain embodiments, the absorption column 500 may be configured to create a concentration gradient of desiccant fluid therein, such that highly rich desiccant fluid enters through a solution input 503 proximate a first end of the absorption column 500 (e.g., a top of the absorption column 500), moves through the absorption column 500 and simultaneously absorbs water (thereby decreasing the concentration of the desiccant fluid as it moves), and ultimately exits the absorption column 500 at a lower concentration at a solution exit 502 proximate a second end of the absorption column 500 (e.g., a bottom of the absorption column 500) opposite the first end. The absorption column 500 thereby has a concentration gradient between a high concentration portion at the first end and a lower concentration portion at the second end, such that low concentration desiccant fluid exits the absorption column 500 to be directed to the evaporation column 550, while the desiccant fluid is constantly replenished with high concentration desiccant fluid within the absorption column 500.

Moreover, as shown in FIG. 3A, the absorption column 500 may be a part of a selectably closed loop for the desiccant fluid, which may be pumped through the absorption column 500 and a cooling heat exchanger 505 in a continuous loop, without entering the evaporation column 550. The closed loop may be configured to enable the desiccant fluid to absorb more water prior to entering the evaporation column 550. In such embodiments, the closed loop may be opened (e.g., by a controller system) upon the occurrence of a trigger event (e.g., upon measuring a desired desiccant fluid concentration within the closed loop) as discussed in greater detail herein to enable the desiccant fluid to move to the evaporation column 550.

Like the desiccant column discussed in the single-stage batch vapor consolidation system, the absorption column 500 may be embodied as a membrane-separated absorption column, having a desiccant flow path on a first side of a porous membrane, and an air flow path on an opposite, second side of the porous membrane. Separating the air flow path from the desiccant fluid flow path may impede undesirable mass flow of the desiccant salt itself into the air flow path and ultimately out of the AWG system. Water may be absorbed by the desiccant fluid from the air based on osmotic water flow through the membrane from the air to the desiccant fluid. Water vapor may condense on the second side of the membrane, travel through the membrane pores through capillary action, and be absorbed by the high-salt content rich desiccant fluid.

As yet another example, the absorption column 500 may have a structured packing configuration defined by a plurality of corrugated baffles stacked within the column and positioned in alternating orientations (each orientation rotated by 90 degrees relative to adjacent orientations). The corrugated baffles create a highly tortuous fluid flow path for the desiccant fluid and the air, thereby increasing the overall available surface area of the desiccant fluid exposed to the air within the column. This configuration maximizes the amount of water vapor absorbed by the desiccant fluid passing through the absorption column 500.

As discussed above, the absorption column 500 may selectably operate in a closed loop, such that desiccant fluid may be repeated recirculated through the cooling loop and the absorption column 500 until the desiccant fluid reaches a threshold concentration. Accordingly, a control mechanism may be in communication with one or more sensors within the absorption column 500 (or external to the absorption column but within the closed absorption column loop) to monitor the concentration of the desiccant fluid within the absorption column loop. Once the controller determines that the desiccant fluid concentration has dropped to or below the threshold concentration level, the controller may send operational signals to one or more valves to direct at least a portion of the desiccant fluid from the absorption column loop toward the evaporation column 550, and to direct a higher concentration desiccant fluid from the evaporation column 550 into the absorption column loop. The controller may be configured to maintain the various valves in the open configuration until the measured concentration of the desiccant fluid within the absorption column 500 rises to or above a threshold concentration level, at which time the controller may transmit operational signals to the various valves to close those valves and to reform the closed absorption loop. In certain embodiments, air may be continuously directed through the absorption column 500 regardless of whether the absorption loop is closed or open. However, in certain embodiments, the air flow may be passed through the absorption column 500 only while the absorption loop is closed, and the air flow may be blocked from entering the absorption column 500 while the absorption loop is in the open configuration. In such embodiments in which the absorption column 500 may be selectively operated in a closed loop, the single-stage continuous vapor consolidation system may additionally comprise a swing tank configured to support excess desiccant fluid volume as the concentration of the desiccant fluid decreases and the absorption loop remains closed.

Dilute desiccant fluid that exits the absorption column 500 (or the absorption loop) is directed toward the evaporation column 550 where water is evaporated from the desiccant fluid into a closed air system. To facilitate evaporation of the water from the desiccant fluid, the dilute desiccant fluid may be heated prior to and/or while present within the evaporation column 550. For example, the evaporation column 550 may include an embedded heater 553 (e.g., a resistance heater) configured to maintain the desiccant fluid at a desired minimum temperature to facilitate evaporation of water from the desiccant fluid. As yet another example, the desiccant fluid may pass through a heating system prior to entry into the evaporation column. For example, the heating system may comprise a solar heating system 560 configured to utilize radiant and/or convective heat from the ambient environment to heat the desiccant fluid to encourage water evaporation once the desiccant fluid is within the evaporation column 550. In certain embodiments, the desiccant fluid may pass through a series of solar-heated tubes (e.g., tubes having one or more solar collectors associated therewith to heat the tube and the fluid within the tube based on collected radiant solar energy) or the desiccant fluid may pass through a dual-fluid heat exchanger 561 (e.g., a shell-and-tube heat exchanger) opposite a heating fluid, wherein the heating fluid is heated from a series of solar-heated tubes. In certain embodiments, the solar heating mechanism 560 may be supplemented by an electrical heater, a combustion heater (e.g., using expanded gas from the gas-expansion cooling mechanism discussed above), and/or the like, particularly during night-time system usage or when solar power is otherwise unavailable.

In various embodiments, the heating mechanism of the desiccant flow path may be configured to heat the temperature of the dilute desiccant fluid to lower the vapor pressure of the fluid while the desiccant is present within the evaporation column 550. In certain embodiments, the heating mechanism is configured to heat the desiccant fluid to a steady-state temperature of at least about 65-95 degrees Celsius.

The evaporation column 550 may operate as a desalination column to remove water from the desiccant fluid. As air and heated desiccant fluid pass through the desiccant column 550, water from the desiccant fluid evaporates into the air, thereby increasing the concentration of the desiccant fluid while simultaneously increasing the humidity of the air. The air passing through the evaporation column may be a part of a closed air loop (with no air exiting or entering the closed loop) such that evaporated water from the dilute desiccant fluid is not lost to the surrounding environment. In such embodiments, the air within the closed loop may enter at a dry air inlet 554, pass through the evaporation column 550, and exit as humid air at a humid air outlet 555.

In certain embodiments, the absorption column 500 and the evaporation column 550 may be part of a continuous loop for the desiccant fluid, such that the desiccant fluid constantly flows from a first end of the absorption column 500 (where it enters as a high concentration solution) through the absorption column 500 (thereby absorbing water as it flows therethrough), and exiting the second end of the absorption column 500 as a dilute desiccant fluid. The dilute desiccant fluid may then flow through a heating mechanism where it is heated, and then into a first end of the evaporation column 550. The desiccant fluid may then flow through the evaporation column 550, where it is concentrated due to water evaporation, and then out of a second end of the evaporation column 550 as a concentrated solution. The desiccant fluid may then pass through a cooling mechanism and back into the first end of the absorption column 500. As the desiccant fluid is circulated between the absorption column 500 and the evaporation column 550, two air flow streams may be passed through respective columns. A first, open air flow stream may be constantly circulated through the absorption column 500, with source air pulled from the ambient environment, passed through the absorption column 500, and exhausted to the environment as dry processed air. Simultaneously, a closed air flow stream may be cycled through the evaporation column 550, where it absorbs water from the dilute desiccant, and then through a condensation chamber 570 (as discussed herein) where water is condensed and ultimately collected in a water tank 571 from the humid air.

In certain embodiments, the single-stage continuous vapor consolidation system may comprise a membrane desalination system inline and upstream from the evaporation column 550 or instead of an evaporation column 550. In the membrane desalination system, the desiccant flow path may flow past a first side of a membrane, such that the desiccant fluid contacts the membrane as it travels along the desiccant flow path. The membrane may separate the desiccant fluid flow path from a water flow path for water collected from the condensation process described herein. The water flow path may pass a second side of the membrane such that the water contacts the second side of the membrane as it flows along the water flow path.

The membrane may comprise a porous membrane, such as a non-woven membrane having a small pore size. As just one example, the membrane may comprise ePTFE. As the desiccant fluid and the water flow past opposite sides of the membrane, water molecules migrate from the high-salt content desiccant fluid through the membrane (via capillary action), to the water flow. Accordingly, as the dilute desiccant fluid passes through the membrane system prior to entry into the evaporation column 550, a first quantity of water is removed from the desiccant fluid at the membrane system before the desiccant fluid enters the evaporation column 550 for evaporation of additional water therefrom. In certain embodiments the mass transfer across the membrane may be driven by raising the vapor pressure of the desiccant. This may be accomplished by heating of the liquid prior to contact with the membrane or using a vacuum to reduce the pressure on the second side of the membrane or a combination of both. The water in the desiccant begins permeation of the membrane in the liquid state and exits the membrane in a vapor state. The water is then condensed utilizing a heat exchanger (e.g. condenser) and/or contacting it with a colder fluid (e.g. condensed water).

Like the absorption column 500, the evaporation column 550 may be selectively operated in a closed loop, such that desiccant fluid may be repeated recirculated through the heating mechanism and the evaporation column 550 until the desiccant fluid reaches a threshold concentration. Accordingly, a control mechanism may be in communication with one or more sensors within the evaporation column 550 (or external to the evaporation column but within the closed evaporation column loop) to monitor the concentration of the desiccant fluid within the evaporation column loop. Once the controller determines that the desiccant fluid concentration is raised to or above the threshold concentration level, the controller may send operational signals to one or more valves to direct at least a portion of the desiccant fluid from the evaporation column loop toward the absorption column 500, and to direct a lower concentration desiccant fluid from the absorption column 500 (e.g., the absorption column loop) into the evaporation column loop. The controller may be configured to maintain the various valves in the open configuration until the measured concentration of the desiccant fluid with the evaporation column 550 falls to or below a threshold concentration level, at which time the controller may transmit operational signals to the various valves to close those valves and to reform the closed evaporation loop. In certain embodiments, air may be continuously directed through the evaporation column regardless of whether the evaporation column loop is closed or open. However, in certain embodiments, the air flow may be passed through the evaporation column only while the evaporation column loop is closed, and the air flow may be blocked from entering the evaporation column while the evaporation column loop is in the open configuration.

Moreover, in certain embodiments the operation of the various valves for opening and closing the absorption column loop and the evaporation column loop may be synchronized, such that the loops are simultaneously in the open configuration or simultaneously in the closed configuration. In such embodiments, the trigger events for opening and/or closing the evaporation and absorption column loops may be based on a concentration measured within only one column loop (e.g., based on the measured concentration of the desiccant fluid within the absorption loop or based on the measured concentration of the desiccant fluid within the evaporation loop). In other embodiments, the trigger event for opening/closing the various valves may be based on measured concentrations of the desiccant fluid within both the absorption loop and the evaporation loop. For example, the controller may be configured to open the valves to pass desiccant fluid between the evaporation column and the absorption column upon determining that either the solution concentration within the evaporation column rises to/above a threshold value or the solution concentration within the absorption column falls to/below a threshold value. As yet another example, the controller may be configured to open the valves to pass desiccant fluid between the evaporation column 550 and the absorption column 500 upon determining that both solution concentrations within the evaporation column and the absorption column satisfy respective thresholds.

Similarly, the controller may rely on measurements of one or both solution concentrations within the evaporation loop and/or the absorption loop when determining when to close the valves to separate the desiccant fluid between the respective absorption loop and the evaporation loop.

In certain embodiments, the single-stage continuous vapor consolidation system may be part of an AWG system comprising one or more air preconditioning systems. For example, the air preconditioning system may be located upstream of the absorption column, such that source air entering the AWG system first passes through the air preconditioning system prior to entering the absorption column. Moreover, the AWG system may comprise an air preconditioning system as discussed herein between the evaporation column and the condensation chamber.

An example system may be configured for producing at least approximately 180 gallons of water per day based on an ambient air temperature of 95° F. and an ambient relative humidity level of 30%. Ambient air may be provided to the absorption column at a flow rate of at least approximately 2800 cubic feet/minute to pass through a packed column directing a rich lithium chloride solution having a concentration of between about 38-45 wt % (e.g., about 40 wt %). Water may be absorbed by the lithium chloride solution and the concentration of the lithium chloride solution may fall to a lean concentration level of about 38-40 wt % (e.g., about 38.6 wt %) before the desiccant fluid is directed out of the absorption column. During the absorption process, the absorption column may be maintained at a temperature of at least approximately 80-90 degrees Fahrenheit.

The lean desiccant fluid may be heated and directed to an evaporation column operating at a temperature of at least approximately 180-190 degrees Fahrenheit to evaporate the absorbed water into a closed loop of air. The air may then be passed to a condensation chamber, where water vapor is condensed into liquid water at rate of at least approximately 180 gallons/day.

The above-mentioned example system may additionally comprise a carbon dioxide capture system as discussed in greater detail herein. In such embodiments, the air flow of approximately 2800 cubic feet/minute may be passed through the carbon dioxide capture column, and at least approximately 1.1 tons of carbon dioxide may be captured per day. The quantity of carbon dioxide produced, water generated, and air flow rate are interrelated, such that an adjustment to any one of these rates will change the others.

Multi-Stage Continuous Vapor Consolidation

The multi-stage continuous vapor consolidation system is configured to absorb water from air in one or more absorption desiccant columns and to simultaneously evaporate water into air in one or more evaporation desiccant columns similar to those discussed above. For example, the multi-stage continuous vapor consolidation system may be configured as two or more single-stage continuous vapor consolidation systems operating in parallel, and together with a single condensation system. In certain embodiments, a single evaporation column may be in fluid communication with two or more absorption columns such that a single desiccant fluid may be passed through all of the absorption columns in series and/or in parallel. The plurality of absorption columns may comprise a first, high concentration absorption column and a second, low concentration absorption column. The high concentration absorption column may comprise highly concentrated desiccant fluid (e.g., desiccant fluid passed immediately from the evaporation column), while the low concentration absorption column may comprise lower concentrated desiccant fluid (e.g., at least a portion of the desiccant fluid from the high concentration absorption column may pass through the lower concentration absorption column).

Moreover the plurality of absorption columns may be arranged in series within the air flow path, such that source air may be pulled from the environment and passed through the plurality of absorption columns in series prior to being exhausted back to the environment as dry air. For example, the source air may be first passed through the low concentration absorption column to absorb a first quantity of water from the air, then may be passed through the high concentration absorption column to absorb a second quantity of water from the air. Because the initial absorption requires less energy (and does not require a low vapor pressure between the air and the liquid desiccant), the initial absorption using the lower concentration desiccant fluid enables absorption of a first quantity of water from the air. After the initial, low energy requirement absorption process is completed, the air (which still contains water vapor) is passed through the second absorption column having a higher concentration desiccant fluid, such that a second quantity of water is absorbed from the air. The now dry (e.g., low humidity) air may then be exhausted from the system to the environment.

On the desiccant side, once the dilute desiccant exits the low concentration absorption column, the desiccant fluid passes to an evaporation system as discussed herein, where the desiccant fluid is heated and passed through an evaporation column where water is evaporated into a closed air flow loop.

In certain embodiments, each absorption column may be in fluid communication with a corresponding evaporation column, and each absorption column-evaporation column pair may comprise separate desiccant flow loop. For example a first quantity of desiccant fluid may flow between a first absorption column and a first evaporation column, and a second desiccant fluid may flow between a second absorption column and a second evaporation column, and the first quantity of desiccant fluid does not mix with the second quantity of desiccant fluid. In certain embodiments, the first quantity of desiccant fluid may comprise a first desiccant (e.g., LiCl) and the second quantity of desiccant fluid may comprise a second desiccant (e.g., CaCl).

Moreover, in embodiments comprising a plurality of independent desiccant flows, each desiccant flow may have a different concentration range. For example, a first desiccant flow (e.g., corresponding to a first absorption column passed through by source air) may have a first concentration range measured between a high concentration value at an exit of the evaporation column and a low concentration value at an exit of the absorption column; and a second desiccant flow may have a second concentration range. As the source air is directed through the absorption columns in series, the air may be directed through a low concentration range absorption column first, and may be directed through a high concentration range absorption column second.

In various embodiments, each of the absorption column-evaporation column combination may operate in a manner similar to that discussed above in relation to the single-stage continuous vapor consolidation system.

Condensation Process

Processed air (which may comprise air exiting the pre-conditioning system and/or air exiting one or more humidity increasing systems) may be passed through a condensation chamber as discussed herein to condense water vapor in the air into usable liquid water.

The condensation chamber may be embodied as a heat exchanger (e.g., a cross-flow heat exchanger) or another chamber having a series of chilled condensation surfaces on which water vapor condenses into liquid water. For example, the condensation chamber may comprise a series of tubes and/or coils (e.g., metallic tubes and/or coils) in which the processed air passes through. The exterior surfaces of the tubes and/or coils are chilled (e.g., by a refrigerant, a super-cooled gas, a cooled liquid, and/or the like) such that water in the processed air condenses on the interior surfaces of the tubes and/or coils. In such embodiments, the tubes and/or coils may be angled, such that the condensed water streams out of the tubes and/or coils and into a retention chamber.

As yet another example, the condensation chamber may comprise a series of chilled tubes and/or coils (e.g., having super-cooled gas, refrigerant, cooled liquid, and/or the like flowing through the interior of the chilled tubes and/or coils), and the processed air may run across the exterior surface of the chilled tubes and/or coils such that water condenses on the exterior surfaces of the tubes and/or coils.

It should be understood that the condensation surfaces may have any of a variety of shapes and/or configurations.

As mentioned, condensed water flows off of the condensation surfaces into a retention chamber. The retention chamber may comprise one or more water catch trays positioned under the condensation surfaces and configured to capture water dripping off of the condensation surfaces. The water catch trays may be angled toward a holding reservoir configured to hold a volume of water collected via the condensation process. In certain embodiments, the holding reservoir may comprise one or more water outlets in fluid communication with liquid conduits leading to one or more external systems, such as agricultural systems, potable water systems, and/or the like.

Carbon Dioxide Process

Processed air (which may comprise air exiting a water consolidation system as discussed herein) may be passed through a carbon dioxide capture system prior to exhaustion to the atmosphere. The carbon dioxide may be captured from the air for filtration and/or disposal (e.g., through one or more chemical processes to convert the carbon dioxide into water, oxygen, and/or a solid or liquid composition that may be disposed of; through capture of the carbon dioxide in a filtration media; and/or the like).

As shown in the illustrative example of FIG. 1, the carbon dioxide capture system may comprise a carbon dioxide capture column 102 having a fixed bed of a carbon dioxide absorbing material (e.g., a sodium hydroxide solution). As air is passed over the carbon dioxide absorbing material, the carbon dioxide is absorbed by the material. Moreover, as shown in FIG. 1, the carbon dioxide capture column 102 may be heated (e.g., with a hot fluid jacket) to facilitate increased carbon dioxide absorption by the absorbing material.

As yet other examples, the carbon dioxide capture material may be configured to reversibly absorb the carbon dioxide, such that the captured carbon dioxide may be compressed and stored as a gas for later use.

In certain embodiments, captured carbon dioxide gas may be directed to a greenhouse to optimize the internal greenhouse environment for plant growth. As discussed herein, the greenhouse may be supplied by water generated by the AWG system discussed herein.

Power Generation Processes

Certain embodiments of the foregoing AWG system may incorporate one or more power-consuming components, such as air blowers, gas/air compressors, liquid fluid pumps, resistance heaters, monitoring computing devices, and/or the like. These components (as well as other power-consuming components of various embodiments) may receive electrical power from one or more integrated power generation mechanisms of the described system. As noted above, certain embodiments may be operated proximate hydrocarbon fuel wells, and off-gases (e.g., natural gas) from those fuel wells may be combusted and utilized to generate power through energy-generating turbines (e.g., steam turbines). As yet another example, various embodiments may comprise one or more solar heat-generating mechanisms as discussed above, and these solar-heat generating mechanisms may additionally comprise one or more electrical energy generation mechanisms for converting solar energy into storage electrical energy (which may be stored via one or more batteries, uninterruptable power supplies (UPSs), and/or the like.

Moreover, the AWG system and/or power generating aspects of the AWG system may be associated with a greenhouse or other agricultural system for facilitating plant growth (e.g., consumable plant growth). Thus, the power generation systems may be configured to provide electrical power to various aspects of the agricultural system, such as heating/cooling mechanisms for air within the greenhouse, air circulation blowers within the greenhouse, artificial growth lights within the greenhouse, water/irrigation pumps within the greenhouse, agricultural robots (e.g., planters, harvesters, and/or the like) within the greenhouse, and/or the like.

Figure 7:
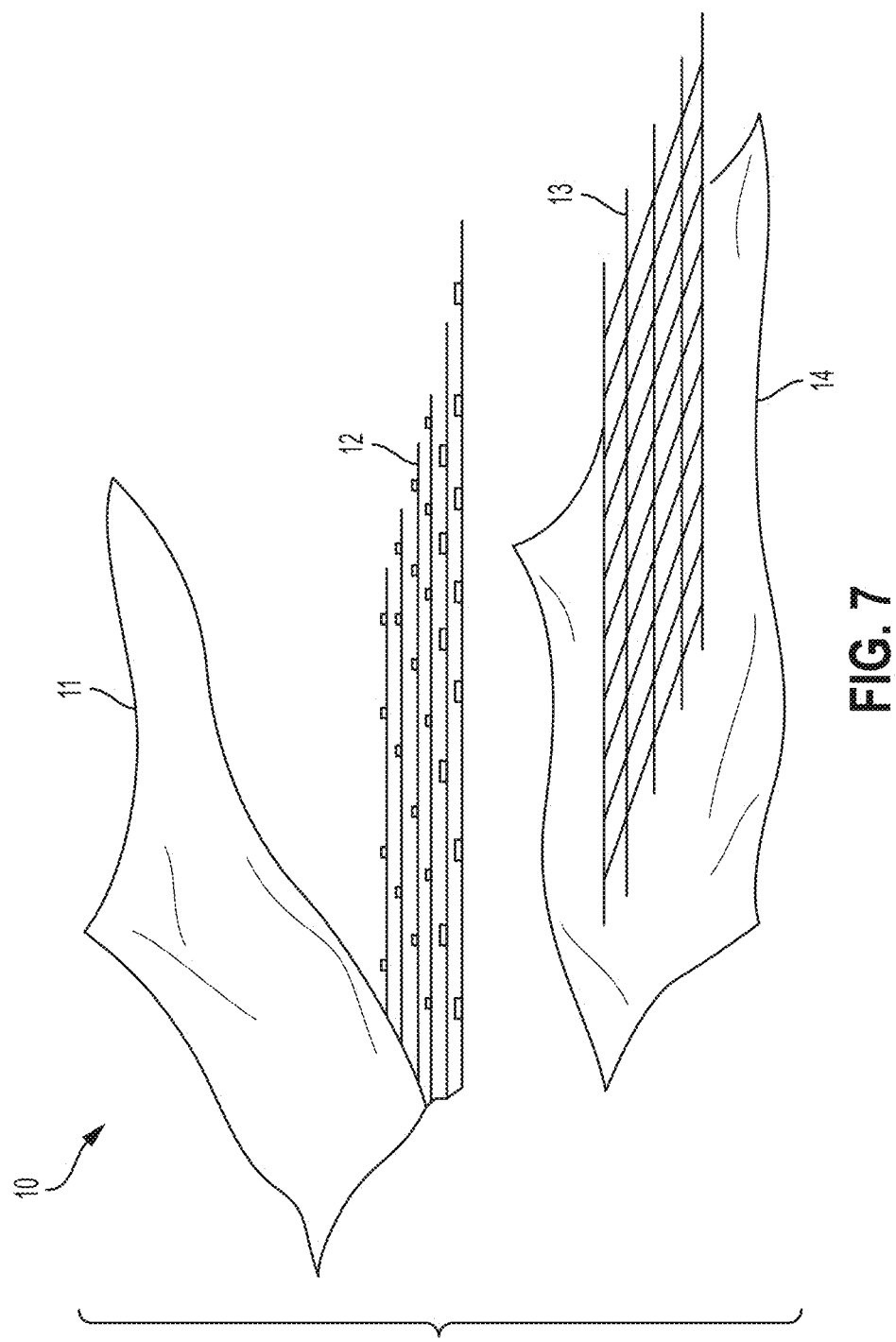
FIG. 7 shows an exploded view of a surface covering according to one embodiment.
Figure 8:
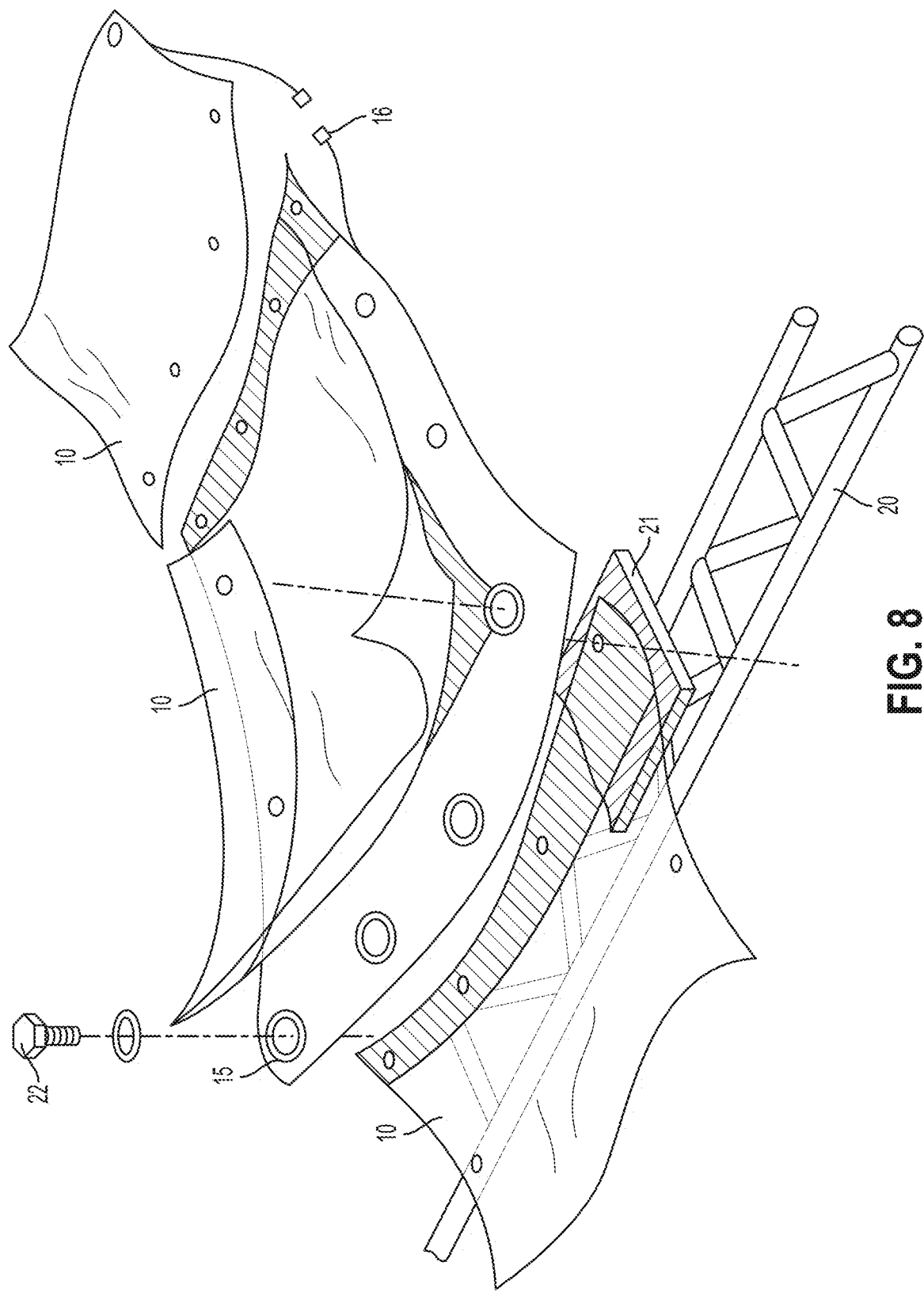
FIG. 8 shows an example view of a surface covering panel secured relative to a support frame.

As just one example, a solar canopy material 10 may be provided as a covering material of a plant growth habitat as discussed in greater detail herein. The solar canopy 10 may be embodied as a transparent or translucent sheet configured to enable sunlight to pass through the solar canopy 10. However, it should be understood that the sheet may be opaque in certain embodiments to prevent external light from passing through the solar canopy material 10. As shown in FIGS. 7-8, the solar canopy may additionally comprise photovoltaic elements 13 (e.g., patches, strips, and/or the like) embedded within the solar canopy 10. Those photovoltaic elements 13 may be configured to convert radiant sunlight into electrical energy that may ultimately be stored via one or more batteries, or utilized in one or more electrical circuits that may be embedded within the solar canopy 10. For example, the solar canopy may additionally comprise one or more light emitting diode (LED) light sources 12 embedded therein that may be configured for providing light (e.g., ultraviolet light) to plants within the plant growth habitat. The LEDs may be directional such that light may be provided in a fixed direction relative to the LED, or the LEDs may be omnidirectional, such that light is emitted around the entire perimeter of the LED.

As a specific example, the solar canopy material 10 may be embodied as a multi-layer flexible sheet (e.g., a plastic sheet, a fabric sheet, and/or the like) that may be draped or otherwise secured over a frame 20 of a plant growth habitat. The solar canopy material 10 may be at least substantially transparent or translucent, and may be configured to allow ultraviolet light to pass through the solar canopy material 10. The solar canopy material 10 may have a high tensile strength, and may be resistant to tears and/or punctures. In certain embodiments, the solar canopy material 10 may comprise one or more reinforcing threads, tapes, and/or the like embedded within the solar canopy material. For example, the reinforcing threads, tapes, and/or the like may comprise Kevlar threads, metallic threads, and/or the like.

In certain embodiments, the solar canopy material 10 comprises a first protective sheet 11 defining a top surface of the solar canopy material 10, and/or a second protective sheet 14 defining a bottom surface of the solar canopy material 10. In certain embodiments the first protective sheet 11 and/or second protective sheet 14 may comprise a woven material (e.g., a woven fabric, woven carbon fiber, and/or the like), a non-woven material (e.g., a high-strength plastic membrane), and/or the like. In certain embodiments, each of the first protective sheet 11 and/or second protective sheet 14 may individually comprise a plurality of layers, including, for example, one or more covering layers defining the outermost layers of the solar canopy material 10, a reinforcing layer (e.g., comprising the one or more reinforcing threads, tapes, and/or the like), and/or the like.

The first protective layer 11 and/or second protective layer 14 may cover one or more electrical layers of the solar canopy material 10. For example, the electrical layers may comprise a layer comprising a plurality of LED elements 12 and/or a layer comprising one or more photovoltaic elements 13. These layers may be separate layers secured relative to one another via an adhesive material, or these electrical systems may be incorporated into a single layer of the solar canopy material 10 secured relative to the first and/or second protective layers 11, 14 via an adhesive material.

In certain embodiments, the photovoltaic elements 13 (e.g., strips, patches, and/or the like) may be embedded within the solar canopy material 10 as an array of photovoltaic elements 13, and may be configured to collect sunlight. The photovoltaic elements 13 may thus have a collection side facing an outer side of the solar canopy material 10. The photovoltaic elements 13 may be spaced apart from one another within the solar canopy material 10 as desired, such that sunlight is enabled to pass between the photovoltaic elements 13 and through the solar canopy material 10. For example, the photovoltaic elements 13 may be spaced at regular intervals within the solar canopy material 10.

The photovoltaic elements 13 may be electrically connected to conductors embedded within the solar canopy material 10 configured to direct electricity away from the photovoltaic elements 13. In certain embodiments, the electricity may be directed to a storage device, such as a battery and/or a UPS for later use by various portions of the AWG system, the plant growth habitat, and/or the like. In certain embodiments, the electricity may be provided as Direct Current (DC) for storage and/or use. In certain embodiments, the generated DC electricity may be provided to a power converter configured to convert the DC electricity into Alternating Current (AC) energy for use by various components and/or to be supplied to a connected power grid.

As mentioned above, the solar canopy material 10 may additionally comprise one or more embedded LEDs 12 connected within an LED array configured to emit light from and/or through at least a portion of the solar canopy material 10. In certain embodiments, the embedded LEDs 12 may be directed through an inner side of the solar canopy material 10 (e.g., through a second protective layer 14), opposite the outer side of the solar canopy material 10, such that the LEDs 12 emit light through the inner side of the solar canopy material 10. In certain embodiments the LEDs may be aligned with the one or more photovoltaic elements 13 and may be configured to emit light toward a back side of the photovoltaic elements 13, such that the light reflects off of the back side of the photovoltaic elements and through the inner side of the solar canopy 10. The LEDs 12 may additionally be connected to one or more conductors (which may be provided in series with the photovoltaic elements 13, in parallel with the photovoltaic elements 13, or in a separate circuit from the photovoltaic elements 13).

As yet another embodiment, various LEDs may be suspended from the solar canopy 10. For example, LEDs may be suspended within a growth habitat of an agricultural module 1000 surrounded by one or more solar canopies 10, such that the LEDs provide additional light to plants growing therein from additional angles (e.g., proximate a growth medium in which the plants are growing).

In certain embodiments, the solar canopy material 10 may be embodied as separate solar canopy panels having finished edges. The finished edges may comprise smooth edges configured to impede fraying and/or tearing. For example, the edges may be sewn, melted, and/or the like. In certain embodiments, the finished edges may comprise one or more grommets or other attachment mechanisms 15 proximate each of the finished edges. The attachment mechanisms 15 may be configured to attach the solar canopy panels 10 relative to a frame 20 (e.g., via one or more fasteners 22 secured relative to a mounting plate 21) and/or relative to adjacent solar canopy panels 10. The attachment mechanisms 15 may be spaced a distance away from the finished edges (e.g., 1 inch) and may be spaced along a line provided parallel with each of the finished edges. In certain embodiments, attachment mechanisms 15 for adjacent solar canopy panels 10 may be configured for engagement therebetween, such that adjacent solar canopy panels 10 may be joined via the one or more fastener mechanisms 15. In certain embodiments, the solar canopy panels may additionally comprise one or more electrical connection mechanisms 16 configured to enable conductors of adjacent solar canopy panels 10 to be connected in series. In certain embodiments, solar canopy panels 10 may comprise a first set of electrical connectors 16 configured for connecting conductors of the photovoltaic portion circuit for adjacent solar canopy panels 10, and a second set of electrical connectors 16 configured for connecting conductors of the LED lighting circuits for adjacent solar canopy panels 10.

The solar canopy panels 10 may additionally comprise one or more overlap flaps (not shown) configured to extend beyond the smooth finished edges. The overlap flaps extend beyond the attachment mechanisms 15, and provide a sealing overlapped portion extending across a joint between adjacent and connected solar canopy panels 10. The sealing overlapped portion is configured to minimize the amount of air that can flow between adjacent and connected solar canopy panels 10, for example, to prevent air from escaping from the interior of a plant growth habitat enclosed with a plurality of connected solar canopy panels 10. In certain embodiments, the sealing overlapped portion may comprise a material shared with remaining portions of the solar canopy panel 10. However, it should be understood that the sealing overlapped portion may comprise a material different from the materials of the solar canopy panel 10. For example, the sealing overlapped portion may comprise a tacky surface configured to detachably adhere to a surface of the solar canopy panel 10 to provide additional sealing against undesirable air leakage from between the secured solar canopy panels 10.

In certain embodiments, the solar canopy material 10 may be configured for use with a translucent covering layer configured for permitting only low levels of light to pass to the solar canopy material. For example, the solar canopy material 10 may be utilized to underlay visual advertisements, such as billboards having a printed, translucent advertisement sheet placed over the solar canopy material. The photovoltaic elements 13 of the solar canopy material 10 may be configured to collect light as it is filtered through the overlaid advertisement sheet.

Agricultural Module

Figure 4:
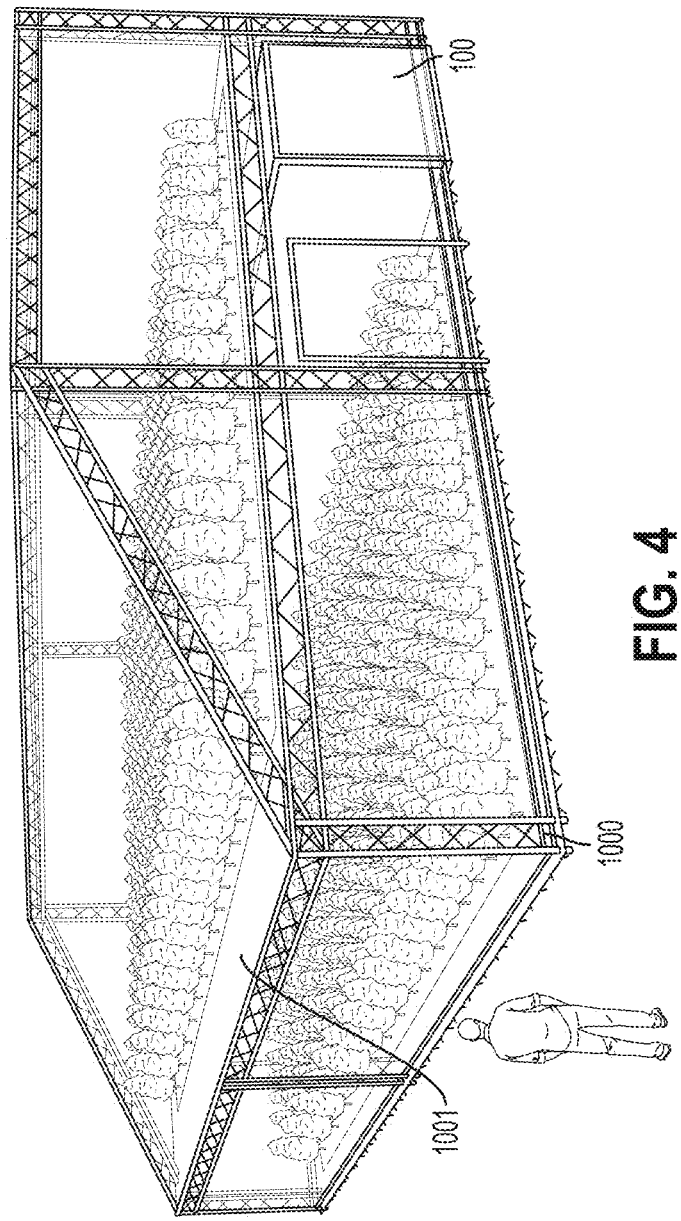
FIG. 4 is an example implementation of a vapor consolidation system with an agricultural module according to one embodiment.
Figure 5:
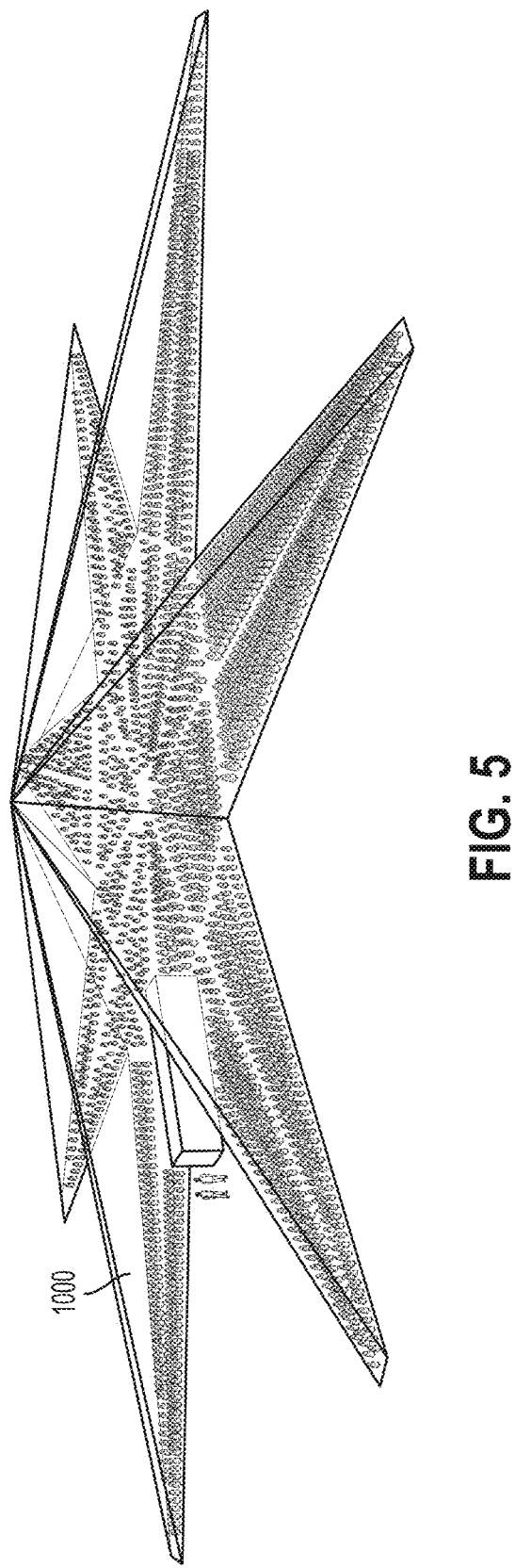
FIG. 5 is another example implementation of a vapor consolidation system with an agricultural module according to one embodiment.

The AWG system may be utilized to generate water and/or power to be supplied to an agricultural module, which may comprise a greenhouse, plant growth habitat, and/or other structure that may be utilized to encourage plant growth within controlled atmospheric conditions. FIGS. 4-5 illustrates various embodiments of an agricultural module 1000 in association with an AWG system 100 housed within a shipping container according to one embodiment. As shown in the figures, the agricultural module 1000 may define a plant growth habitat having an at least substantially rectangular shape, or a shape with a plurality of separate lobes (e.g., to form a star-shape, as shown in FIG. 5). In embodiments comprising separate lobes, the volume within each lobe may be separated from the remainder of the growth habitat, such that each lobe may be provided with a unique growth environment (e.g., different temperatures, carbon dioxide levels, humidity levels, and/or the like) to foster growth of different agricultural products.

Figure 6:
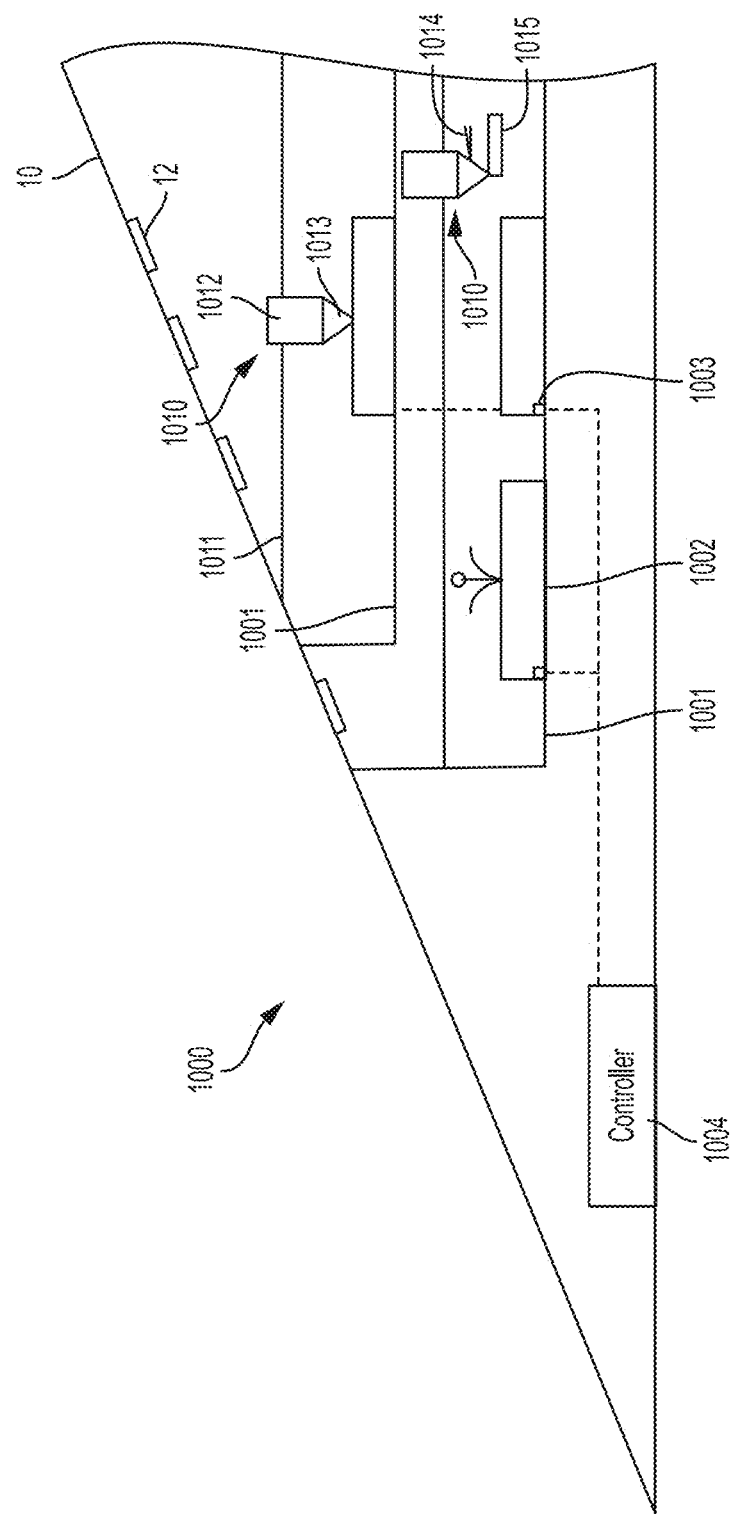
FIG. 6 illustrates an automated planting mechanism according to one embodiment.

FIG. 6 shows a schematic detail view of a portion of a growth habitat of an agricultural module 1000 according to one embodiment. The growth habitat of the agricultural module 1000 may comprise one or more stackable structures 1001 each having one or more base portions 1002 configured to support a growth medium (e.g., soil, a hydroponic support, and/or the like) one or more sidewalls and a ceiling. The stackable structures 1001 may be suspended from support frames of the growth habitat, may be stacked such that the support of an upper structure is supported by a lower structure, and/or the like. The one or more sidewalls and ceiling are configured to contain the controlled atmospheric conditions within the structure (e.g., environmental air having controlled oxygen and carbon dioxide levels, controlled temperature, controlled humidity, and/or the like). The one or more sidewalls and ceiling may comprise a covering material, such as a flexible covering material, a rigid covering material, and/or the like. In certain embodiments, the covering material may comprise integrated growth lamps (e.g., light emitting diode growth lamps) and/or integrated electrical circuitry and/or may be configured to enable natural sunlight to pass through the covering material to the contained environment. In certain embodiments, the integrated growth lamps may be spaced at regular intervals throughout the flexible covering material, and may be electrically connected relative to one another and/or relative to one or more power sources via electrical circuitry. For example, in the illustrated embodiment of FIG. 6, the covering material comprises a solar canopy 10 as discussed herein, with integrated LEDs 12 spaced across the surface of the canopy 10.

In embodiments comprising flexible covering materials, the agricultural module may comprise one or more rigid supports collectively forming a rigid support frame for the flexible covering material.

In certain embodiments, the agricultural module 1000 may be embodied as a portable system that is configured to be quickly set up at a desired agricultural site. The agricultural module 1000 may additionally comprise one or more sensors 1003 that may be provided within the growth medium of the growth habitat. These sensors may be embodied as a portion of a flexible bundle of electrical circuitry, including conductors, sensors, and/or the like that may be quickly deployed within a growth habitat by unrolling the bundle onto a support surface of the growth habitat before providing the growth medium therein. In certain embodiments, the various sensors may be electrically connected relative to one another, relative to a control computing system 1004, and/or relative to a power source via one or more conductors (e.g., flexible conductors). The various sensors may comprise moisture sensors, temperature sensors, carbon dioxide content sensors, oxygen sensors, humidity sensors, and/or the like. It should be understood that certain of the described sensors may be configured for wireless data transmission to a control computing system via one or more wireless communication technologies, such as Wi-Fi, Bluetooth, Internet of Things (IoT) technologies, and/or the like.

In certain embodiments, sensor outputs (e.g., indicative of measured aspects of the environment within the growth habitat) may be utilized by the control computing system 1004 to regulate the environmental conditions within the growth habitat. For example, the control computing system 1004 may comprise data indicative of one or more target environmental conditions, such as a target temperature, target carbon dioxide content, and/or the like. Based on the monitored data output from the various sensors 1003 within the growth habitat, the control computing system 1004 is configured to compare the monitored data output against the target environmental conditions, and may be configured to adjust water flows, carbon dioxide flows, and/or the like from the AWG 100 into the growth habitat. For example, the control computing system 1004 may be configured to automatically activate sprinkler (or drip irrigation) systems (which may be incorporated into the stackable structures 1001) within the growth habitat to water the plants within the growth habitat in response to predetermined conditions; to increase and/or decrease the amount of carbon dioxide flowing into the growth habitat from carbon dioxide capture systems of the AWG system 100, and/or the like.

Moreover, the growth habitat may comprise one or more automated planting and harvesting mechanisms configured to autonomously plant seeds for new plants, and/or to automatically harvest fruits and/or vegetables grown within the growth habitat (this includes the use of agricultural robots and drones).

For example, seed planting/management may be provided via a planting probe 1010 operable to move along a grid/track system 1011 elevated above a support surface of the growth habitat. In certain embodiments, the grid/track system 1011 may be raised and/or lowered via a support mechanism (e.g., a pneumatic and/or hydraulic support mechanism). The planting probe 1010 may be operable in response to signals received from the control computing system 1004, which comprises data indicative of an internal mapping of the planting medium and/or base portions 1002 within the growth habitat. The control computing system 1004 additionally comprises data indicative of a desired crop, crop spacing, and/or the like for planting within the growth habitat, and may provide movement signals to the planting probe 1010 to insert seeds into the planting medium according to a desired planting plan.

The planting probe 1010 itself may comprise a hopper 1012 configured to hold a volume of seed, and an insertion probe 1013 (e.g., a wedge shaped insertion probe) configured to inject seed at an appropriate depth within the planting medium (as determined by the control computing system 1004). The planting probe 1010 additionally comprises a movement mechanism (e.g., one or more motors) configured to move the planting probe 1010 along the track/grid to plant seeds within the planting medium. Moreover, the planting probe 1010 may be configured to periodically return to a refill position within the growth habitat to retrieve additional seed within the included hopper 1012. The refill position may be positioned within the growth habitat, proximate a fill chute containing additional seed that may be selectably provided to the planting probe 1010 as needed. In certain embodiments, the fill chute may be embodied as a container supported (e.g., suspended) above the movement path of the planting probe, such that the planting probe 1010 may move below the fill chute to be refilled by gravitational force moving the seed from the fill chute into the planting probe 1010. Moreover, in certain embodiments the fill chute may comprise an actuatable feed door (e.g., a servo-actuated feed door) configured to open and allow a flow of seed out of the feed chute in response to a signal received from the control computing system 1004. Thus, when the planting probe 1010 is positioned beneath the feed chute, the control computing system 1004 may be configured to open the feed door to enable seed to flow from the feed chute to the planting probe 1010. Once an appropriate amount of seed has been provided to the planting probe 1010, the control computing system 1004 may transmit a second signal causing the feed door to close.

The planting probe 1010 may additionally comprise a harvesting mechanism that may be detachably secured relative to the movable planting probe 1010. The harvesting mechanism may comprise a mechanically movable cutting/picking arm 1014 and a holding basket/tray 1015. Once the planting probe 1010 receives signals from the control computing system 1004 to initiate the harvest process, the planting probe 1010 may process to pick and/or cut produce/plants from the various plants within the growth habitat, and to deposit the cut produce/plants into the holding basket/tray 1015. Once the holding basket/tray 1015 is full, the planting probe 1010 may return to a docking position, where the holding basket/tray 1015 may deposit the harvested items into a retention crate that may be removed from the growth habitat. Moreover, in certain embodiments the retention crate may comprise one or more level sensors configured to monitor the amount of harvested items within the retention crate to avoid the retention crate from overflowing. Upon detecting that the retention crate fill level is above a threshold level, the control computing system 1004 may be configured to transmit a signal to the planting probe 1010 to suspend harvesting operations until the retention crate is emptied.

Although described above in reference to a track-based planting and harvesting probe configuration, various embodiments may be configured to plant seeds and/or harvest produce via an unmanned aerial vehicle (UAV) comprising a planting probe and/or a harvesting probe having a configuration similar to that described above. The UAV may be autonomous, and may be configured to navigate the interior of the growth habitat according to a defined planting plan. In certain embodiments, the planting plan may define a map of locations of intended seed plantings, such that the autonomous UAV may be configured to autonomously navigate between the plurality of intended seed planting locations to deposit seeds within the growth medium.

The autonomous UAV may additionally comprise a harvesting probe configuration similar to that described herein. The UAV with the harvesting probe configuration may be configured to autonomously navigate the interior of the growth habitat to harvest produce grown therein.

The irrigation system of the growth habitat may be embodied as one or more tubes that may be connected to water distribution mechanisms, such as spraying-style sprinklers, drip-irrigation tubes, and/or the like. The tubes may comprise a plastic, flexible tubing and may be embodied as a self-healing material configured to self-seal cracks, cuts, and/or punctures through the tube walls. These tubes may be connected to a water outlet of a condensation system of the AWG system, a water holding tank of the AWG system, and/or the like.

Moreover, the irrigation system may comprise a fertilizer supply mechanism configured to automatically mix a metered quantity of fertilizer (e.g., a liquid fertilizer) into water supplied to the irrigation system. The fertilizer supply mechanism may be in electronic communication with the control computing system 1004, which may be configured to provide signals to the fertilizer supply mechanism to modify the amount of liquid fertilizer introduced into the water stream.

Mechanical Vapor Compression Based Embodiments

Figure 9:
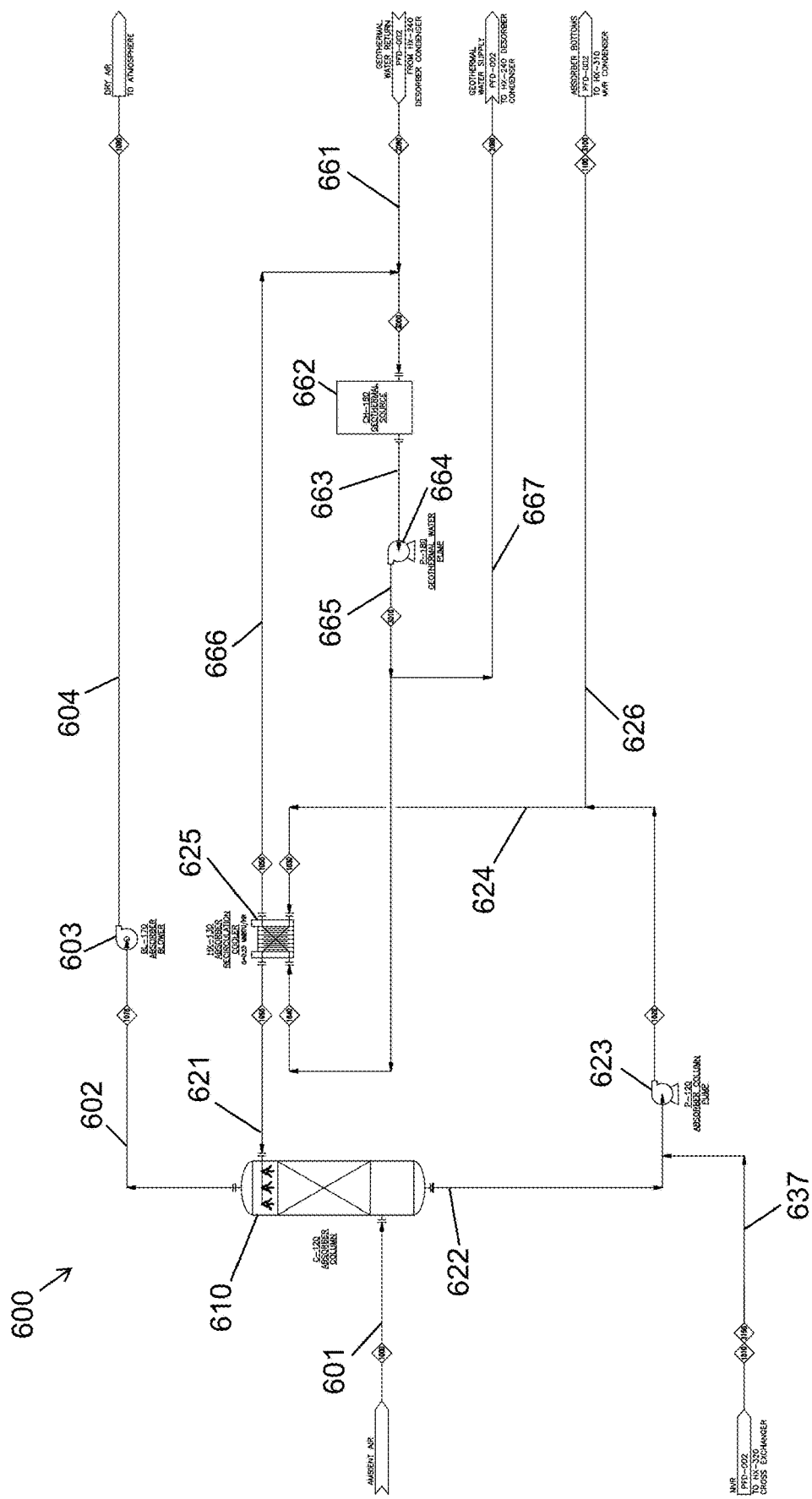
FIGS. 9-10 shows a schematic diagram of a vapor consolidation system including a mechanical vapor consolidation according to one embodiment.
Figure 10:
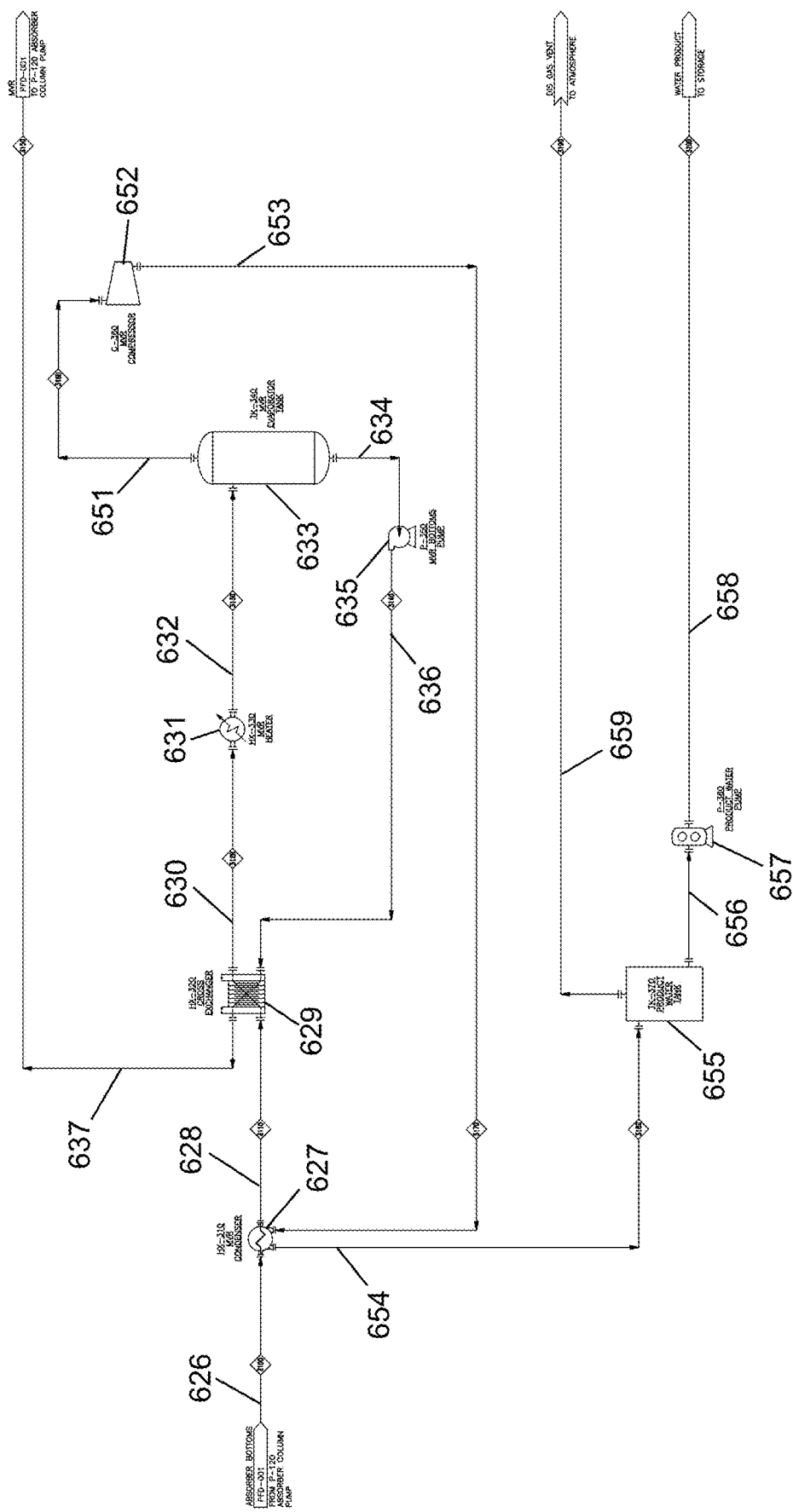
Figure 11:
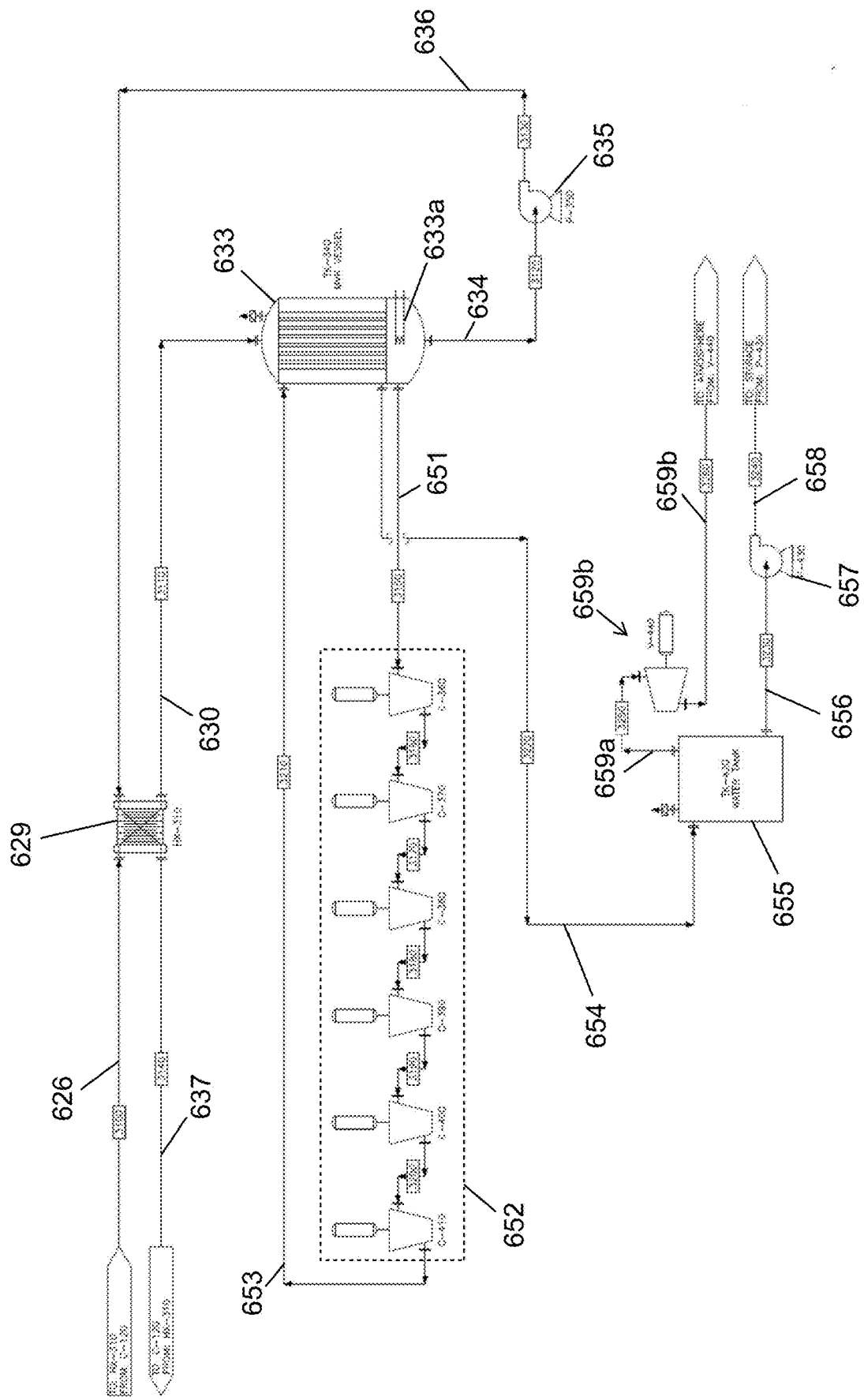
FIGS. 11-12 illustrate alternative fluid flow paths surrounding an MVC evaporator vessel according to certain embodiments.
Figure 12:
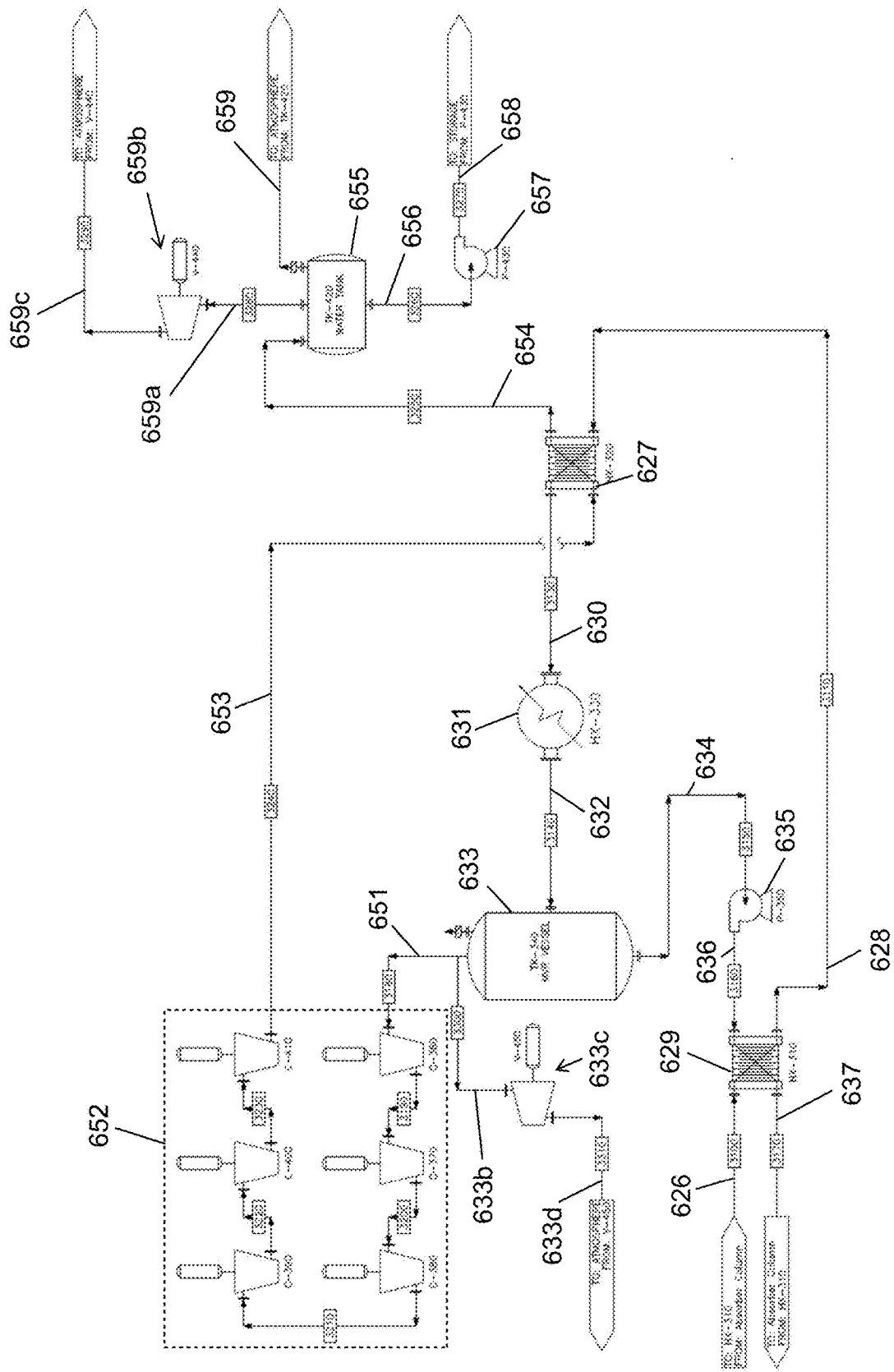
Figure 13:
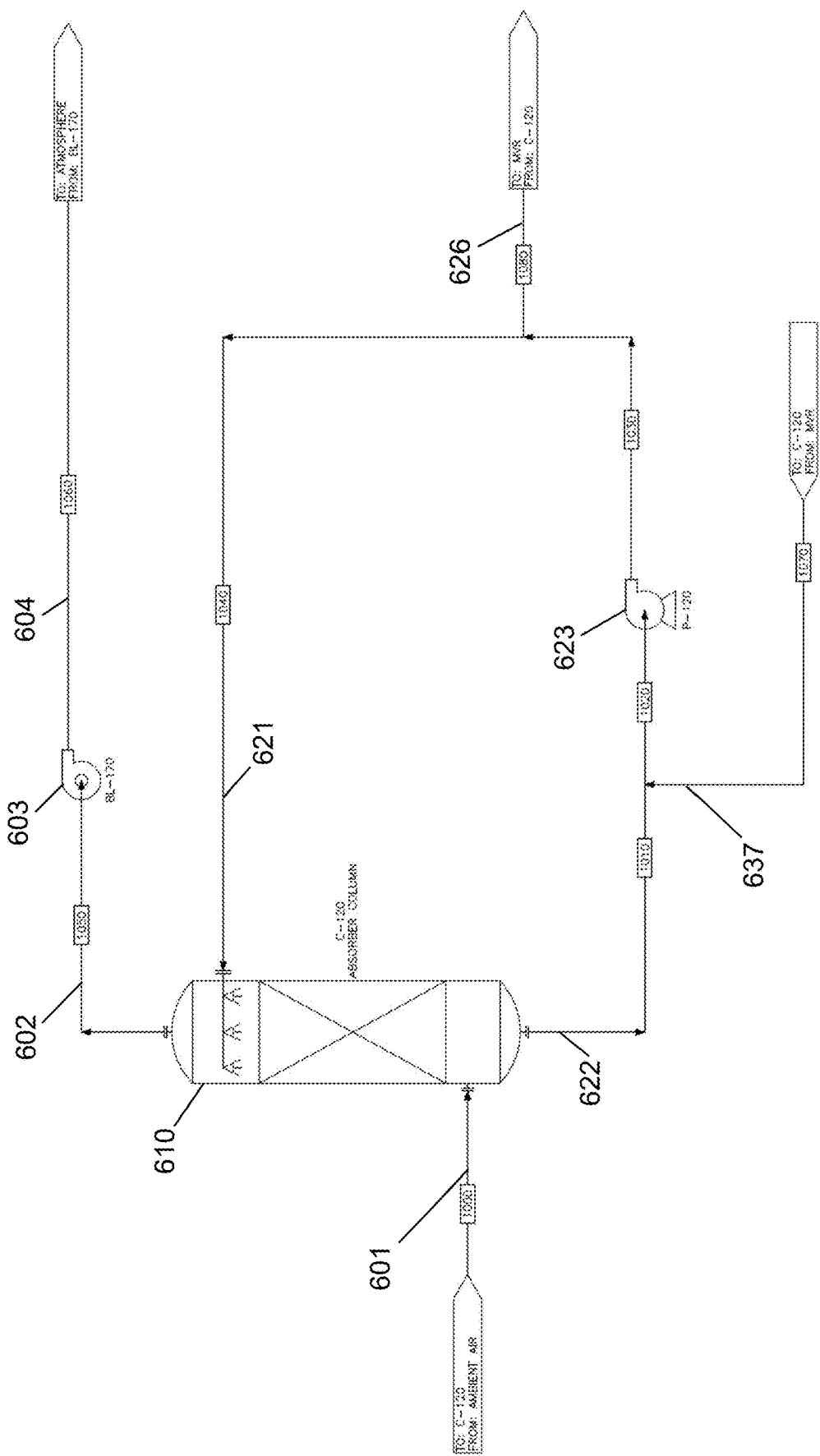
FIGS. 13-15 illustrate alternative fluid flow paths surrounding an absorber according to certain embodiments.
Figure 14:
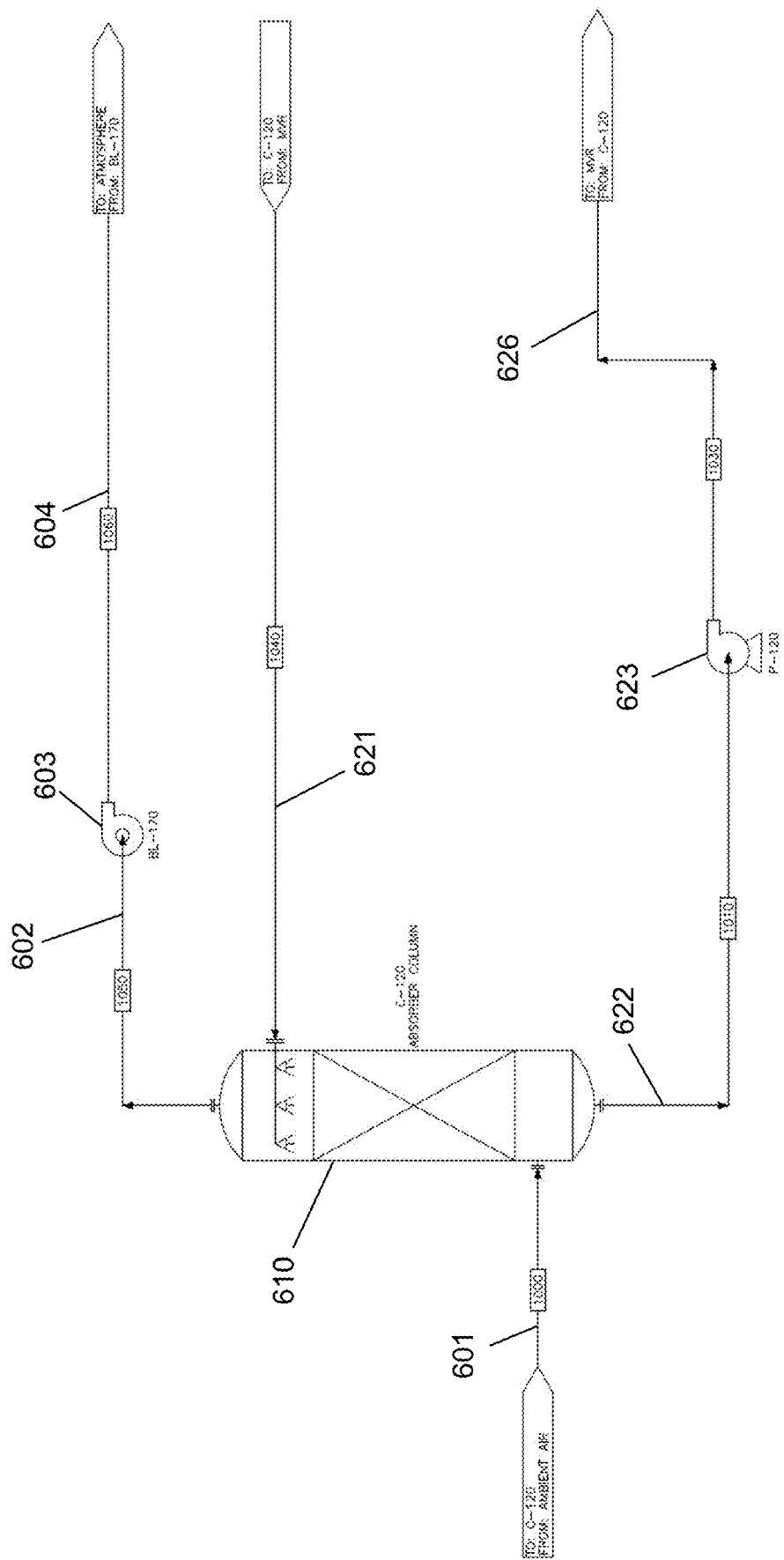

Certain embodiments as discussed herein may additionally comprise one or more components for implementing Mechanical Vapor Compression (MVC) also known as Mechanical Vapor Recompression (MVR). FIGS. 9-10 illustrate a schematic of an example system 600 embodiment incorporating MVC components and FIGS. 11-12 illustrate alternative embodiments that may be implemented in place of the configuration of FIG. 10. FIGS. 13-14 illustrate alternative embodiments that may be implemented in place of the configuration surrounding the absorber 610 of FIG. 9. As shown at reference 601, ambient air (at an ambient temperature and an ambient humidity level) is directed into absorber 610 (although not shown, a blower may be implemented at the air intake to the absorber 610 to increase the volumetric flowrate of ambient air entering the absorber 610). In the absorber 610, the ambient air contacts a rich (concentrated) desiccant fluid provided to the absorber 610 at a low temperature at reference 621, to increase the vapor pressure within the absorber to encourage water vapor within the humid ambient air to condense and to be absorbed by the desiccant fluid while the humid air contacts the rich desiccant fluid. While the ambient air and the desiccant fluid flow through the absorber 610, humidity within the air condenses and/or is otherwise absorbed into the desiccant fluid to dilute the desiccant fluid and to dry the air. The dry air then exits the absorber back to the atmosphere, as indicated at 602. As shown, a blower 603 may be incorporated at an ambient air exhaust of the absorber 610 to increase the volumetric flowrate of air passing through the absorber 610. The blower 603 may be provided in addition to, or as an alternative to, the above-mentioned blower placed at the ambient air intake of the absorber 610. Moreover, once the desiccant fluid has passed through the absorber 610, a diluted, but still cool, desiccant fluid exits the absorber 610 as indicated at reference 622.

In certain embodiments the absorber 610 is configured in a counter flow configuration where atmospheric air enters the absorber 610 proximate to the bottom of the absorber 610. Dry, atmospheric air then exits the absorber 610 proximate the top of the absorber 610 via flow path 602-604 (with a pump/blower 603 utilized to move air through the absorber 610). Rich desiccant fluid enters proximate the top of the absorber 610 via flow path 621 and flows down through the interior of the absorber 610 due to gravity. Water is absorbed from the ambient air into the desiccant fluid, such that dilute desiccant fluid exits the absorber proximate to the bottom of the absorber 610 along flow path 622. In certain embodiments, flow modifiers, such as barriers, mesh, and/or turns in exit piping from the absorber 610 may be used to reduce carry over of desiccant fluid in the air exit of the absorber 610. In certain embodiments the flow modifiers may be positioned in the interior of the absorber 610 proximate to the top of the absorber 610 (e.g., at a mouth of an exhaust port for dry ambient air to exit the absorber via flow path 602.

Figure 15:
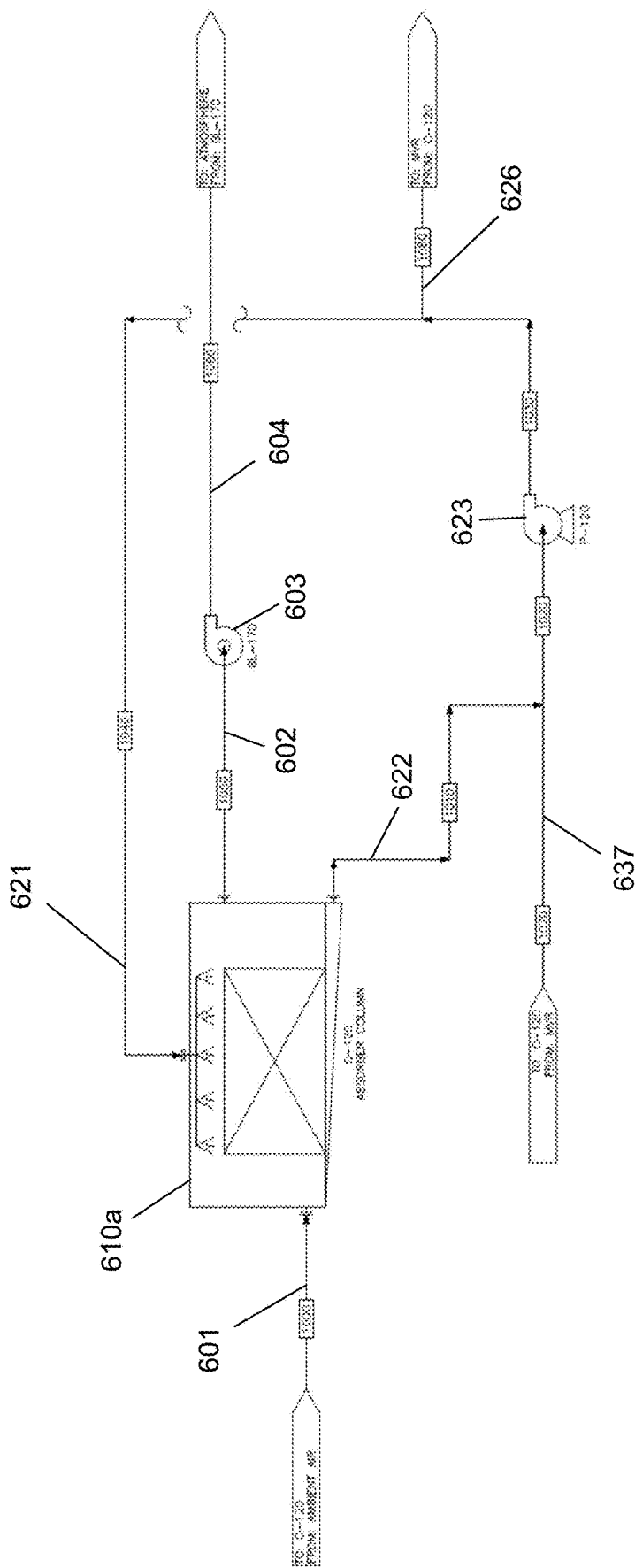

In certain embodiments similar to that reflected in FIG. 15, the absorber 610a operates in a cross-flow configuration where air enters the absorber from one side of the absorber 610a and traverses (e.g., at least substantially horizontally) to the other side. Rich desiccant fluid enters the top of the absorber 610a, absorbs water from the ambient air as it flows to a low point in the absorber 610a where dilute desiccant fluid exits proximate the bottom. In this fashion, the air flow is at least substantially perpendicular to the flow of desiccant fluid within the absorber 610a. In this configuration, the air inlet and air outlet are approximately at the same height on the absorber 610a.

In certain configurations, the absorber 610a is operated in the cross-counter flow configuration where air enters the absorber 610a from one the side of the absorber 610a and traverses to the other side. Rich desiccant fluid enters proximate the top of the absorber 610a and absorbs water from the ambient air as it flows to a low point in the absorber 610a where dilute desiccant fluid exits proximate the bottom of the absorber 610a. In this configuration, the air inlet and air outlet are offset in level from each other as shown in the example of FIG. 15. In this configuration, the air inlet can be at the side of the absorber 610a at a location proximate to the top of the absorber 610a and the air outlet is on the side of the absorber 610a proximate to the bottom. In another orientation of this configuration, the air inlet is positioned on the side of the absorber 610a proximate to the bottom of the absorber 610a and the air outlet is positioned on the opposite side of the absorber 610a proximate to the top of the absorber 610a (as shown in FIG. 15). As such, the air path travels in an angled manner through the absorber 610a from the top of the absorber 610a to the bottom or the bottom of the absorber 610a to the top.

Figure 16A:
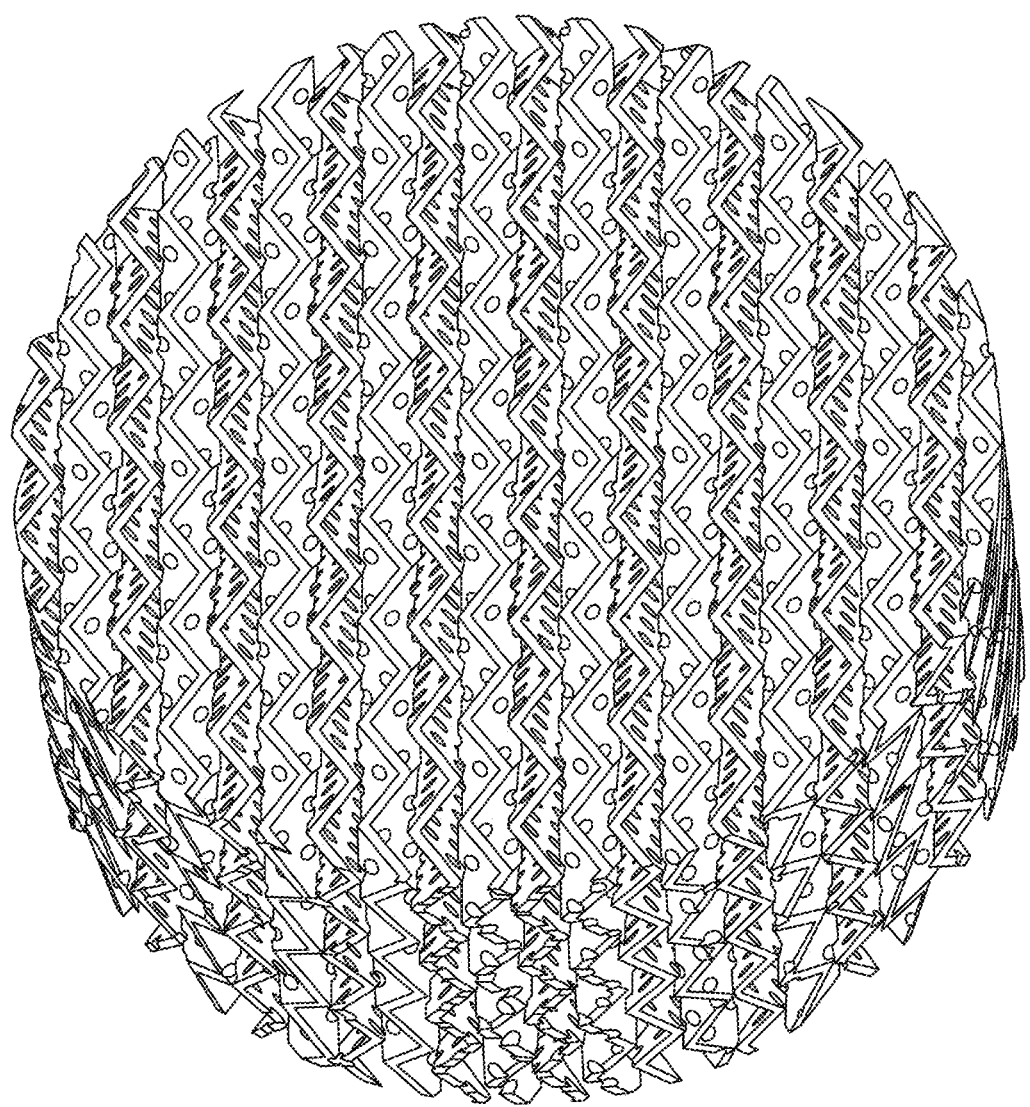
FIG. 16A illustrates an example packing component for use as a structured packing configuration according to one embodiment.
Figure 16B:
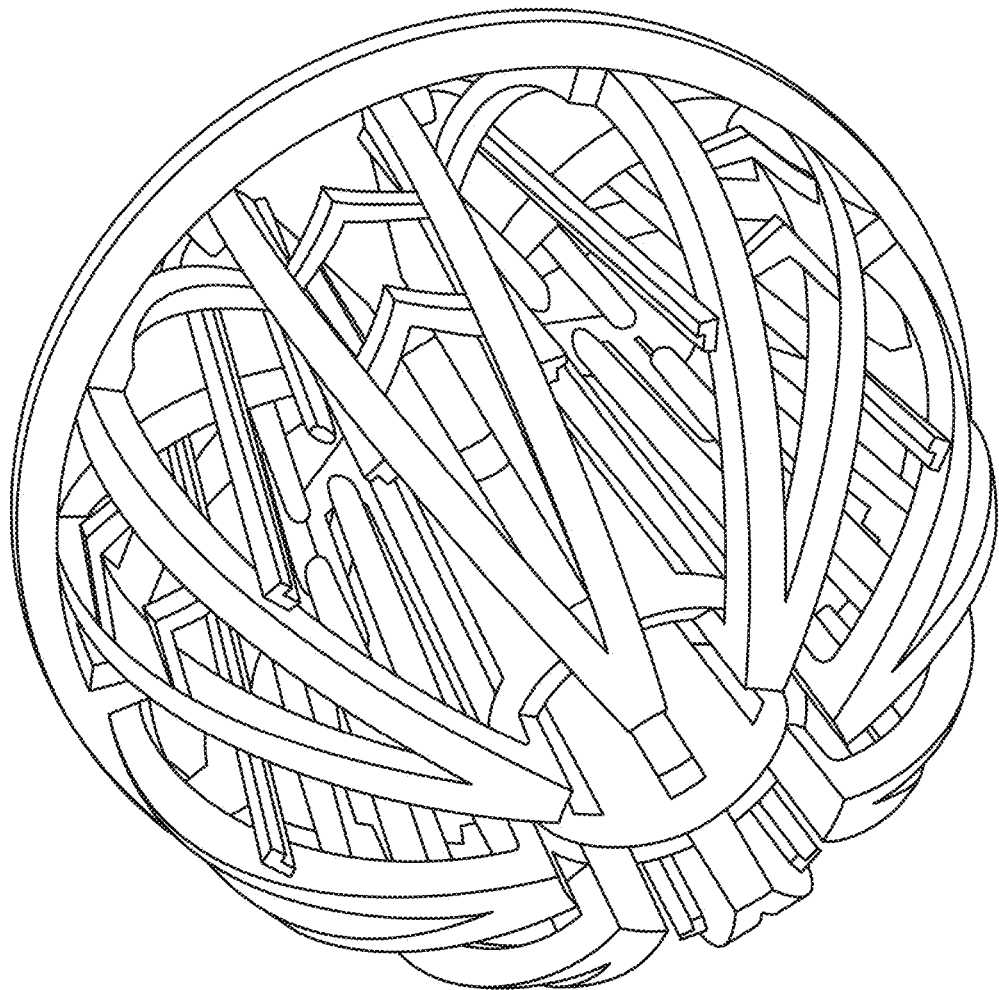
FIG. 16B illustrates an example packing component for use in a collection of a plurality of packing components within a random packing configuration according to one embodiment.

In certain embodiments, the interior of the absorber 610 comprises a plurality of packing components across which the rich desiccant fluid flows as it absorbs water extracted from the humid ambient air. The packing components are provided to increase the surface area of the rich liquid desiccant flowing within the absorber 610 and also to provide a highly tortuous flow path for ambient air flowing through the absorber 610 such that the air has a turbulent flow through the interior of the absorber 610. The absorber 610 may be embodied as a counter flow column described above, with the rich desiccant fluid entering the absorber 610 at a desiccant column inlet located at or near the top of the absorber 610, and the ambient air inlet is located at the bottom of the absorber 610. The ambient air flows upwards to a dry air exhaust located at or near the top of the absorber 610, and the desiccant fluid flows downward, across the packing components, to a dilute desiccant outlet of the absorber 610. As examples, the packing components may comprise individual blocks, balls, trays, baffles and/or any other shape defining a plurality of baffles, slits, holes, meshes, and/or other flow modifying components that may be positioned within the absorber 610 to collectively define a highly tortuous path for the ambient air and the desiccant fluid to pass through the absorber 610. The packing components may comprise (be formed of) a material that is not reactive to the desiccant fluid. Example packing components are illustrated in FIGS. 16A-16B. In certain embodiments, a plurality of packing components (such as the unstructured packing component shown in FIG. 16B) may be positioned within the absorber 610 without physically connecting the packing components relative to one another. In other embodiments, a single packing component (such as the structured packing example of FIG. 16A) sized and shaped specifically for the interior of the absorber 610 may be provided and positioned within the absorber 610.

The packing components of certain embodiments may be placed in a structured configuration to define channels set at different angles to each other with or without holes that collectively define structured flow paths for the ambient air and the desiccant fluid flowing through the absorber 610. To provide a structured packing configuration, the packing components are placed in the absorber 610 in an ordered stacked manner. Packing components can also be positioned randomly in which a plurality of geometrically shaped components (such as the ball shown in FIG. 16B) are randomly placed in the absorber 610 to increase surface area. Although discussed as a packing-based absorber, it should be understood that the desiccant fluid can be passed through the absorber 610 via other configurations, such as by atomization of the liquid desiccant fluid, by spraying the desiccant fluid within the absorber and/or the like).

According to certain embodiments, dilute desiccant fluid (e.g., liquid) exits the absorber 610 to a pump 623. In certain operation, the absorber 610 can be operated in a batch configuration where a series of valves may be configured to recirculate the dilute desiccant fluid along flow path 624 (while additional rich desiccant fluid is prevented from entering the closed loop via flow path 637 while appropriate valves remain closed) and through a pre-absorber heat exchanger 625 (e.g., a shell-and-tube heat exchanger, a plate heat exchanger, and/or the like) to cool the dilute desiccant fluid (the opposite side of the heat exchanger is cooled water that has been collected from the overall system, as discussed in greater detail herein) before it is passed back into the top of the absorber 610 as indicated at 621. In this way, the amount of water absorbed into the desiccant fluid may be increased (thereby increasing the level of dilution of the desiccant fluid) before the desiccant fluid is directed to evaporation portions of the overall system.

In certain embodiments, the pre-absorber heat exchanger 625 is cooled through the use of a chiller in which a cooling media such as water, glycol, and/or the like is used to on the other side of the heat exchanger 625 to cool the rich desiccant fluid along flow path 624. In this embodiment of FIG. 9, illustrated components 662, 664, 625 may all be part of a chilled refrigerator system.

In certain operation, the absorber 610 can be operated in a continuous configuration where valves are configured to recirculate a certain amount of dilute desiccant fluid along flow path 624 and through flow path 626 simultaneously. In this configuration, a certain amount of dilute desiccant fluid flows along flow path 624 through the pre-absorber heat exchanger 625 (e.g., a shell-and-tube heat exchanger, a plate heat exchanger, and/or the like) to cool the dilute desiccant fluid (the opposite side of the heat exchanger 625 is cooled using water that has been collected from the overall system, as discussed in greater detail herein) before it is passed back into the top of the absorber 610 as indicated at 621. Dilute desiccant fluid simultaneously traverses along flow path 626 to the MVC evaporator vessel 633.

In certain embodiments, the absorber 610 is configured such that the rich desiccant fluid is not cooled in a heat exchanger, for example, as shown in the illustrated embodiment of FIG. 13. In this embodiment, cooling of the desiccant fluid may be provided via thermal conductive heat exchange with ambient air through the conductive pipes along flow paths (637, 622, and 621). Fluid cooling may be provided in the absorber 610 as sensible heat is exchanged with the atmospheric air, provided that the air temperature is lower than the entering desiccant fluid temperature.

In certain embodiments the absorber 610 is configured such that the diluted desiccant fluid exits the absorber 610 and is sent to the MVC evaporator vessel 633 without a recirculation path, as shown in the example of FIG. 14. Rich desiccant fluid returning from the MVC evaporator vessel 633 may or may not be cooled with a heat exchanger and/or chiller and/or geothermal cooling on flow path 621 prior to entering the absorber 610.

According to FIG. 9, dilute desiccant fluid that exits the absorber 610 at 622 is pumped (via pump 623) along flow path 626 (which extends to FIG. 10) with appropriate valves closed to prevent the dilute desiccant fluid from recirculating into the absorber 610 as discussed above, constituting a batch operation. The dilute desiccant fluid passes through one or more heating subsystems between the absorber 610 and the MVC evaporator vessel 633. The one or more heating subsystems may comprise one or more of: a condenser 627, a pre-evaporator heat exchanger 629, and/or a heater 631. It should be understood that the one or more heating subsystems may be provided in any order relative to the flow of desiccant fluid. In the illustrated example, the dilute desiccant fluid, which remains cool after passing through the absorber 610, passes through a condenser 627 which utilizes the generally cool temperature of the dilute desiccant fluid to encourage condensation of water vapor from the compressed water vapor that has exited the MVC evaporator vessel 633, as discussed below. In certain embodiments, the condenser 627 is a shell-and-tube heat exchanger, with the dilute desiccant fluid passing through the tubes, and the water vapor condensing on the exterior of the tubes, within the shell of the heat exchanger. In another embodiment, the condenser 627 is a plate-and-frame heat exchanger, with the dilute desiccant fluid passing through one set of plates and the water vapor passes through the other set of plates, and the water vapor condenses in the heat exchanger as it traverses through the heat exchanger as it warms the dilute desiccant fluid. In another embodiment, the condenser 627 is a double-pipe heat exchanger where the dilute desiccant fluid passes through the inner pipe and the water vapor passes through the outer pipe such that it can condense on the exterior surface of the inner pipe. In certain embodiments the condenser 627 may have a counter-flow configuration (the dilute desiccant fluid flowing in an opposite direction than the water vapor). In other embodiments, the condenser 627 may have a parallel, co-current flow configuration in which the dilute desiccant fluid and the water vapor flow in the same direction through the condenser 627.

The dilute desiccant fluid exiting the condenser 627 via the flow path represented at 628 has an increased temperature due to a certain amount of heat transfer that is transferred from the compressed water vapor to the dilute desiccant fluid within the condenser 627. The dilute desiccant fluid then passes through a pre-evaporator heat exchanger 629 (e.g., a shell-and-tube heat exchanger, a plate-and-frame heat exchanger, a dual-tube heat exchanger (with concentric tubes), and/or the like) and/or heater 631 (e.g., an externally powered heater, such as an electric heater, a natural gas heater, a solar heater and/or the like) to increase the temperature of the dilute desiccant fluid to or near the evaporation temperature. In certain embodiments, the heater may be an inline electric heater with heating element bundles for heating the dilute desiccant fluid. The heater may have an orientation to reduce the likelihood of fluid flashing on the elements. The heater 631 may be positioned within the MVC evaporator vessel 633. In certain embodiments, the heater is a heat exchanger (e.g., a shell-and-tube heat exchanger, a plate-and-frame heat exchanger, and/or the like). In certain embodiments, the heater 631 is a solar heater utilizing photovoltaic panels to generate electrical energy to drive electrical heater elements (e.g., resistive heater elements). In certain embodiments, the heater 631 is a frenal lens heater utilizing solar energy to generate thermal energy in the form of heat. In certain embodiments, the heater 631 comprises a geothermal heater mechanism comprising a series of pipes extending into the ground to utilize geothermal energy to heat the dilute desiccant fluid. In other embodiments, the heater 631 is a fired heater utilizing a hydrocarbon fuel source (e.g., natural gas, oil, wood, biomass, and/or the like) combined with oxygen (supplied from ambient air) to create heat from combustion. As shown in the embodiment of FIG. 10, which includes both a pre-evaporator heat exchanger 629 and heater 631, the dilute desiccant fluid first exits the pre-evaporator heat exchanger 629 via flow path represented at 630 before entering the heater 631. Moreover, as discussed in greater detail herein, the opposite side of the pre-evaporator heat exchanger 629 is provided with heated rich desiccant fluid exiting the MVC evaporator vessel 633.

The dilute desiccant fluid exiting the heater 631 along flow path 632 then passes into a MVC evaporator vessel 633. In certain embodiments, the MVC evaporator vessel 633 is configured to apply a vacuum pressure within an interior thereof (e.g., via a vacuum pump) to lower the vapor pressure within the MVC evaporator vessel 633 and to lower the evaporation temperature (the bubble point) of water particles captured within the dilute desiccant fluid within the MVC evaporator vessel 633. As just one example, the MVC evaporator vessel 633 may comprise a reducing orifice where the flow path 632 enters the MVC evaporator vessel 633 to lower the pressure of the entering dilute desiccant fluid. In other embodiments, the reducing orifice may be positioned upstream of the one or more heating subsystems. In other embodiments, the MVC evaporator vessel 633 comprises a heater to increase the temperature within an interior thereof to the evaporation temperature (the bubble point), which lowers the vapor pressure within the MVC evaporator vessel 633 to encourage evaporation of the water from the desiccant fluid. The MVC evaporator vessel 633 of certain embodiments is embodied as a tank into which the dilute desiccant fluid is pumped, sprayed, atomized, or otherwise provided into an interior thereof in a manner to encourage evaporation of water entrapped within the dilute desiccant fluid. When the dilute desiccant fluid is pumped into the MVC evaporator vessel 633, it may pass through an orifice as described above causing the water molecules to flash through the orifice due to a reduction in pressure across the orifice. In certain embodiments, the fluid is directed below the liquid level in the MVC evaporator vessel 633 to encourage sealing of vacuum pressures in the MVC evaporator vessel 633. In another configuration, dilute desiccant fluid is sprayed into the MVC evaporator vessel 633 from the top of the vessel and/or sides of the vessel, and/or through the bottom of the vessel. In embodiments where atomization is used, the atomizer is positioned in MVC evaporator vessel 633 in such a way as to impart energy to the dilute desiccant fluid to further assist with separation of the water molecules from the dilute desiccant fluid. Examples of positioning may have the atomizer proximate the top of the MVC evaporator vessel 633 and flowing desiccant fluid through the atomizer to create a showering effect of atomized fluid particles entering the MVC evaporator vessel 633. Another example of positioning may be on the liquid surface of the dilute desiccant fluid to atomize fluid up from the liquid surface. Other orientations that encourage separation of water from the dilute desiccant fluid may also be used with the atomizer.

In certain embodiments the dilute solution may pass through a series of heat exchangers and/or heaters prior to reaching the MVC evaporator vessel 633, in addition to those heat exchangers and/or heaters shown in FIG. 10. The water in the dilute desiccant fluid vaporizes within the MVC evaporator vessel 633 due to the elevated temperature of the dilute desiccant fluid entering the MVC evaporator vessel 633 and due to the decrease in pressure within the MVC evaporator vessel 633, thereby concentrating the desiccant fluid such that rich desiccant fluid exits the MVC evaporator vessel 633 at flow path 634 (e.g., at the bottom of the MVC evaporator vessel 633). The rich and warm desiccant fluid is pumped (via pump 635) along flow path 636 into the pre-evaporator heat exchanger 629, where heat is transferred from the rich desiccant fluid entering the heat exchanger 629 via flow path 636 to the dilute desiccant fluid entering the pre-evaporator heat exchanger 629 via flow path 628. The rich desiccant fluid exits the pre-evaporator heat exchanger 629 at flow path 637, where it is passed back to pump 623 of FIG. 9 (by opening the appropriate valves to allow entry of the rich desiccant fluid into the flow circulation path surrounding the absorber 610). By appropriately configuring valves, the rich desiccant fluid exiting the pump 623 is then passed to flow path 624 and into pre-absorber heat exchanger 625 in a manner similar to what is discussed above regarding the recirculation of dilute desiccant fluid. The rich desiccant fluid is cooled via pre-absorber heat exchanger 625 (as mentioned, the opposite side of the pre-absorber heat exchanger 625 retains a flow of cool water collected as a part of the process, as discussed below) before it is passed, via flow path 621, into the top of the absorber 610 to collect additional water vapor from ambient air.

With reference again to the MVC evaporator vessel 633 shown in FIG. 10, the water vapor that evaporates from the dilute desiccant fluid exits the MVC evaporator vessel 633 via flow path 651. The water vapor passes through a compressor 652 that raises the pressure of the water vapor, thereby raising the saturation temperature of the water vapor that exits the compressor at flow path 653. In certain embodiments, a liquid entrapment device is installed upstream of the compressor 652 to minimize the amount of entrained liquid in the vapor that reaches the compressor 652. Moreover, the compressor may additionally or alternatively have a water injection mechanism to reduce the super heated temperature of the water vapor (and/or to generally cool the compressor 652). The vapor exiting the compressor 652 is then passed through either a series of pipes (that define flow path 653) and/or another heat exchanger in the MVC evaporator vessel 633 (as shown in FIG. 11, for example) or in another process line as shown in FIG. 10 allowing for the latent heat to transfer to the original desiccant liquid entering the MVC evaporator vessel 633. For example, the compressed water vapor passes through condenser 627, which utilizes sensible and latent heat transfer (from the water vapor and to the dilute desiccant fluid) as a part of the condensation process to condense the water vapor into liquid water. In certain embodiments the condensed water exiting the condenser at flow path 654 may then be passed through another heat exchanger (not shown) that also utilizes sensible heat transfer prior to the liquid water being stored or used as potable water within storage tank 655. It should be understood that additional heat exchangers may be provided either upstream or downstream of the condenser. As shown in FIG. 10, the storage tank 655 has a draw-off line to enable usage of the water (along flow path 656-658, inclusive of an optional pump 657 (e.g., a centrifugal pump, a positive displacement pump, and/or the like) between flow paths 656 and 658). Certain embodiments need not include a pump if the storage tank 655 is elevated above a usage area (thereby using potential energy to enable water to drain from the storage tank 655 as it is needed). Moreover, the storage tank 655 has a gas vent 659 for ensuring that non condensable gases dissolved in the water (e.g., $O_2$, $N_2$, $CO_2$, etc.) can be removed. In certain embodiments a vacuum pump and/or blower on flow path 659 is used to remove the non-condensable gases from the water in storage tank 655. In certain embodiments, the storage tank 655, the draw-off line 656-658, and/or the flow path 654 may additionally comprise one or more water purification mechanisms, such as a carbon-based water filter. It should be noted that water condensed from water vapor extracted from the dilute desiccant fluid is at least substantially distilled water even without purification, and therefore a remineralization process may be included within the storage tank 655, the draw-off line 656-658, and/or flow path 654 to add various minerals (e.g., fluoride, calcium, iron, and/or the like) to the water before usage, depending on the intended end use of the water.

FIGS. 11-12 reflect alternative fluid routing configurations that may be implemented in lieu of the configuration shown in FIG. 10. In other words, the embodiments of either FIG. 11 or FIG. 12 may be implemented in combination with FIG. 9 (e.g., flows from FIG. 9 may proceed to FIG. 11; or flows from FIG. 9 may proceed to FIG. 12). With reference first to FIG. 11, dilute desiccant fluid that exits the absorber 610 at flow path 622 is pumped (via pump 623 shown in FIG. 9) along flow path 626 (which extends into FIG. 11) with appropriate valves closed to prevent dilute desiccant fluid from recirculating into the absorber 610 as discussed above for the batch operation of the absorber 610. The absorber 610 may also be operated in such a way that dilute desiccant fluid simultaneously flows through flow path 624 and 626 as described above. The absorber 610 may also operate where dilute desiccant fluid flows from the absorber 610 to the MVC evaporator vessel 633 without a return as described above. The dilute desiccant fluid passes through one or more heating subsystems between absorber 610 and the MVC evaporator vessel 633. In the illustrated embodiment of FIG. 11, the one or more heating subsystems comprise pre-evaporator heat exchanger 629 (e.g., a shell-and-tube heat exchanger, a plate-and-frame heat exchanger, a dual-tube heat exchanger (with concentric tubes), and/or the like). The dilute desiccant fluid passing into the pre-evaporator heat exchanger 629 is heated by sensible heat transfer with the previously heated, rich desiccant fluid exiting the MVC evaporator vessel 633. Therefore, the dilute desiccant fluid exiting the pre-evaporator heat exchanger 629 via flow path 630 has an increased temperature due to a certain amount of heat transfer that is transferred from the rich desiccant fluid to the dilute desiccant fluid within the pre-evaporator heat exchanger 629.

In the embodiment of FIG. 11, the dilute desiccant fluid passes into the MVC evaporator vessel 633 via flow path 630. In certain embodiments, the MVC evaporator vessel 633 is configured to apply a vacuum pressure within an interior thereof (e.g., via a vacuum pump) to lower the vapor pressure within the MVC evaporator vessel 633 and to lower the evaporation temperature (the bubble point) of water particles captured within the dilute desiccant fluid within the MVC evaporator vessel 633. As just one example, the MVC evaporator vessel 633 may comprise a reducing orifice where the flow path 632 enters the MVC evaporator vessel 633 to lower the pressure of the entering dilute desiccant fluid. In other embodiments, the reducing orifice may be positioned upstream of the one or more heating subsystems. In other embodiments, the MVC evaporator vessel 633 comprises a heater 633a (which may have a configuration analogous to heater 631, discussed above) to increase the temperature within an interior thereof to the evaporation temperature (the bubble point), which lowers the vapor pressure within the MVC evaporator vessel 633 to encourage evaporation of the water from the desiccant fluid. The heater 633a may be positioned to heat the dilute desiccant fluid in the event that the provided heat exchange is insufficient to vaporize water within the dilute desiccant fluid. The MVC evaporator vessel 633 of certain embodiments is embodied as a tank into which the dilute desiccant fluid is pumped, sprayed, atomized, or otherwise provided into an interior thereof in a manner to encourage evaporation of water entrapped within the dilute desiccant fluid. For example, the embodiment of FIG. 11 specifically illustrates the MVC evaporator vessel 633 as encompassing a plurality of at least substantially vertical tubes therein, through which the dilute desiccant fluid flows from the top "head" of the MVC evaporator vessel 633 toward the bottom "sump" of the MVC evaporator vessel 633. In such embodiments, the water vapor is introduced into a shell portion located outside of the included tubes and within the interior of the MVC evaporator vessel 633. The water vapor passing around the tubes within the interior of the MVC evaporator vessel 633 is at a higher temperature than the desiccant fluid, and therefore the water vapor serves to increase the temperature within the interior of the MVC evaporator vessel 633

(specifically, within the interior of the tubes where the desiccant fluid is flowing) to encourage evaporation of water from the dilute desiccant fluid. The evaporated water extracted from the desiccant fluid flows to the top of the tubes, as the concentrated, rich desiccant fluid flows downward within the interior of the tubes. It should be understood that the tube side of the MVC evaporator vessel 633 and/or the shell side of the MVC evaporator vessel 633 may be subject to a vacuum pressure.

In certain embodiments, the MVC evaporator vessel 633 additionally comprises an actuated wiper mechanism to ensure a film of desiccant fluid (e.g., or a film of salt that precipitates from the desiccant fluid as the concentration increases) remains thin. The actuated wiper mechanism may be operated by a motor which mechanically moves a wiper to wipe the inner surface of the tubes. In certain embodiments, an analogous wiper mechanism may be utilized to wipe condensed water from the outer surface of the tubes. As water evaporates from the dilute desiccant fluid within the MVC evaporator vessel 633, the concentration of the desiccant fluid increases, and rich desiccant fluid exits the MVC evaporator vessel 633 at flow path 634 (e.g., at the bottom of the MVC evaporator vessel 633). The rich and warm desiccant fluid is pumped (via pump 635) along flow path 636 into the pre-evaporator heat exchanger 629, where heat is transferred from the rich desiccant fluid entering the heat exchanger 629 via flow path 636 to the dilute desiccant fluid entering the pre-evaporator heat exchanger 629 via flow path 626. The rich desiccant fluid exits the pre-evaporator heat exchanger 629 via flow path 637, where it is passed back to pump 623 of FIG. 9 (by opening the appropriate valves to allow entry of the rich desiccant fluid into the flow circulation path surrounding the absorber 610 during batch operation, or by keeping all valves open to the appropriate degree to allow continuous flow). By appropriately configuring valves, the rich desiccant fluid exiting the pump 623 is then passed to flow path 624 and into pre-absorber heat exchanger 625 in a manner similar to what is discussed above regarding the recirculation of dilute desiccant fluid in both batch and continuous operation. The rich desiccant fluid is cooled via pre-absorber heat exchanger 625 (as mentioned, in certain embodiments the opposite side of the pre-absorber heat exchanger 625 retains a flow of cool water collected as a part of the process, as discussed below) before it is passed via flow path 621 into the top of the absorber 610 to collect additional water vapor from ambient air.

With reference again to the MVC evaporator vessel 633 shown in FIG. 11, the water vapor that evaporates from the dilute desiccant fluid exits the MVC evaporator vessel 633 via flow path 651. The water vapor passes through a series of compressors 652 that are each configured to sequentially increase the pressure of the water vapor, thereby raising the saturation temperature of the water vapor that exits the series of compressors at flow path 653. Although 6 compressors are illustrated in FIG. 11, it should be understood that any number of compressors may be implemented, such as a single compressor, 2 compressors, 3 compressors, 4 compressors, 5 compressors, 6 compressors, 7 compressors, and/or the like. In certain embodiments, a liquid entrapment device is installed upstream of the series of compressors 652 (or a liquid entrapment device may be installed upstream of each individual compressor within the series of compressors 652) to minimize the amount of entrained liquid in the vapor that reaches the compressors 652. Moreover, each of the plurality of compressors may additionally or alternatively have a water injection mechanism to reduce the super heated temperature of the water vapor (and/or to generally cool each of the compressors 652). The vapor exiting the series of compressors 652 is then passed through a series of pipes (that define flow path 653) into a heat exchanger embodied within the MVC evaporator vessel 633. As mentioned above, the heat exchanger within the MVC evaporator vessel 633 may be embodied as a series of at least substantially vertical tubes within the MVC evaporator vessel 633, such that the MVC evaporator vessel 633 is embodied as a shell-and-tube heat exchanger. In the embodiment of FIG. 11, the compressed water vapor is introduced on a shell side of the MVC evaporator vessel 633. In certain embodiments, the compressed water vapor is introduced proximate the bottom of the MVC evaporator vessel 633 to provide a counter-flow style of heat exchange with the desiccant fluid passing within the interior of the tubes. The water vapor may then condense on the outer surfaces of the tubes, and may drain down the exterior surface of the tubes within the MVC evaporator vessel 633 toward the bottom of the MVC evaporator vessel 633 (referred to as the sump of the MVC evaporator vessel 633), and it exits the sump of the MVC evaporator vessel 633 via flow path 654. Although not shown, the flow path 654 may lead the condensed water (and water vapor) through one or more cooling mechanisms, such as a geothermal cooling mechanism, to more completely condense the water vapor into liquid water prior to introduction into the storage tank 655. As shown in FIG. 11, the storage tank has a draw-off line to enable usage of the water (along flow path 656-658, inclusive of an optional pump 657 (e.g., a centrifugal pump, a positive displacement pump, and/or the like) between flow paths 656 and 658). Certain embodiments need not include a pump if the storage tank 655 is elevated above a usage area (thereby using potential energy to enable water to drain from the storage tank 655 as it is needed). Moreover, the storage tank 655 has a gas vent 659a-659c for actively ensuring that the pressure within the storage tank remains at approximately atmospheric pressure or below atmospheric pressure (e.g., via pump 659b that maintains a negative pressure within the storage tank 655 to draw water into the storage tank along flow path 654). In certain embodiments, the storage tank 655, the draw-off line 656-658, and/or the flow path 654 may additionally comprise one or more water purification mechanisms, such as a carbon-based water filter. It should be noted that water condensed from water vapor extracted from the dilute desiccant fluid is at least substantially distilled water even without purification, and therefore a remineralization process may be included within the storage tank 655, the draw-off line 656-658, and/or flow path 654 to add various minerals (e.g., fluoride, calcium, iron, and/or the like) to the water before usage, depending on the intended end use of the water.

With reference now to FIG. 12, dilute desiccant fluid that exits the absorber 610 at flow path 622 is pumped (via pump 623 shown in FIG. 9) along flow path 626 (which extends into FIG. 12) with appropriate valves closed to prevent dilute desiccant fluid from recirculating into the absorber 610 during batch operation or when valves are opened to allow simultaneous flow in path 624 and 626 as discussed above. The dilute desiccant fluid passes through one or more heating subsystems between absorber 610 and the MVC evaporator vessel 633. In the illustrated embodiment of FIG. 12, the one or more heating subsystems comprise pre-evaporator heat exchanger 629 (e.g., a shell-and-tube heat exchanger, a plate-and-frame heat exchanger, a dual tube heat exchanger (with concentric tubes), and/or the like), condenser 627, and heater 631 (e.g., an externally powered heater, such an electric heater, a natural gas heater, a solar heater, and/or the like) to increase the temperature of the dilute desiccant fluid to or near the evaporation temperature. In certain embodiments, the heater 631 may be an inline electric heater with heating element bundles for heating the dilute desiccant fluid. The heater 631 may have an orientation to reduce the likelihood of fluid flashing on the elements. The heater 631 may be positioned within the MVC evaporator vessel 633. In certain embodiments, the heater 631 is a heat exchanger (e.g., a shell-and-tube heat exchanger, a plate-and-frame heat exchanger, and/or the like). In certain embodiments, the heater 631 is a solar heater utilizing photovoltaic panels to generate electrical energy to drive electrical heater elements (e.g., resistive heater elements). In certain embodiments, the heater 631 is a frenal lens heater utilizing solar energy to generate thermal energy in the form of heat. In certain embodiments, the heater 631 comprises a geothermal heater mechanism comprising a series of pipes extending into the ground to utilize geothermal energy to heat the dilute desiccant fluid. In other embodiments, the heater 631 is a fired heater utilizing a hydrocarbon fuel source (e.g., natural gas, oil, wood, biomass, and/or the like) combined with oxygen (supplied from ambient air) to create heat from combustion.

With reference to FIG. 12, the dilute desiccant fluid passing into the pre-evaporator heat exchanger 629 is heated by sensible heat transfer with the previously heated, rich desiccant fluid exiting the MVC evaporator vessel 633. Therefore, the dilute desiccant fluid exiting the pre-evaporator heat exchanger 629 via flow path 628 has an increased temperature due to a certain amount of heat transfer that is transferred from the rich desiccant fluid to the dilute desiccant fluid within the pre-evaporator heat exchanger 629.

The dilute desiccant fluid exiting the pre-evaporator heat exchanger 629 remains below the condensation temperature of the water vapor, and therefore the dilute desiccant fluid is passed into the condenser 627 which utilizes the relatively-cooler temperature of the dilute desiccant fluid to encourage condensation of water from the compressed water vapor that has exited the MVC evaporator vessel 633, as discussed below. In certain embodiments, the condenser 627 is a shell-and-tube heat exchanger, with the dilute desiccant fluid passing through the tubes, and the water vapor condensing on the exterior of the tubes, within the shell of the heat exchanger. In another embodiment, the condenser 627 is a plate-and-frame heat exchanger, with the dilute desiccant fluid passing through one set of plates and the water vapor passes through the other set of plates, and the water vapor condenses in the heat exchanger as it traverses through the heat exchanger as it warms the dilute desiccant fluid. In another embodiment, the condenser 627 is a double-pipe heat exchanger where the dilute desiccant fluid passes through the inner pipe and the water vapor passes through the outer pipe such that it can condense on the exterior surface of the inner pipe. In certain embodiments the condenser 627 may have a counter-flow configuration (the dilute desiccant fluid flowing in an opposite direction than the water vapor). In other embodiments, the condenser 627 may have a parallel, co-current flow configuration in which the dilute desiccant fluid and the water vapor flow in the same direction through the condenser 627.

As will be recognized by a comparison between FIG. 10 and FIG. 12, the location of the pre-evaporator heat exchanger 629 and the condenser 627 can be reversed to modify how sensible heat transfer is utilized to heat the dilute desiccant fluid and to cool the water vapor and the rich desiccant fluid. Specifically in reference to FIG. 12, the dilute desiccant fluid first exits the pre-evaporator heat exchanger 629 via flow path 628 before entering the condenser 627, and then enters the heater 631 after exiting the condenser 627.

The dilute desiccant fluid exiting the heater 631 is then passed to the MVC evaporator vessel 633 via flow path 632. In certain embodiments, the MVC evaporator vessel 633 is configured to apply a vacuum pressure within the interior thereof via the vacuum pump configuration 633b-633d (including a tube 633b into the interior of the MVC evaporator vessel 633, a vacuum pump 633c, and an exhaust 633d to atmosphere). By lowering the pressure within the MVC evaporator vessel 633, the evaporation temperature (bubble point) of the water particles captured within the desiccant fluid is lowered to encourage evaporation of the water from the desiccant fluid. As another example, the MVC evaporator vessel 633 may comprise a reducing orifice where the flow path 632 enters the MVC evaporator vessel 633 to lower the pressure of the entering dilute desiccant fluid. In other embodiments, the reducing orifice may be positioned upstream of the one or more heating subsystems. In other embodiments, the MVC evaporator vessel 633 comprises a heater (like heater 633a in FIG. 11) to increase the temperature within the interior thereof to the evaporation temperature (the bubble point), which lowers the vapor pressure within the MVC evaporator vessel 633 to encourage evaporation of the water from the desiccant fluid. The MVC evaporator vessel 633 of certain embodiments is embodied as a tank into which the dilute desiccant fluid is pumped, sprayed, atomized, or otherwise provided into an interior thereof in a manner to encourage evaporation of water entrapped within the dilute desiccant fluid.

As water evaporates from the dilute desiccant fluid within the MVC evaporator vessel 633, the concentration of the desiccant fluid increases, and rich desiccant fluid exits the MVC evaporator vessel 633 at flow path 634 (e.g., at the bottom of the MVC evaporator vessel 633). The rich and warm desiccant fluid is pumped (via pump 635) along flow path 636 into the pre-evaporator heat exchanger 629, where heat is transferred from the rich desiccant fluid entering the heat exchanger 629 via flow path 626 to the dilute desiccant fluid entering the pre-evaporator heat exchanger 629 via flow path 626. The rich desiccant fluid exits the pre-evaporator heat exchanger 629 via flow path 637, where it is passed back to pump 623 of FIG. 9 (by opening the appropriate valves to allow entry of the rich desiccant fluid into the flow circulation path surrounding the absorber 610). By appropriately configuring valves, the rich desiccant fluid exiting the pump 623 is then passed to flow path 624 and into pre-absorber heat exchanger 625 in a manner similar to what is discussed above regarding the recirculation of dilute desiccant fluid in both the batch and continuous operation. The rich desiccant fluid is cooled via pre-absorber heat exchanger 625 (as mentioned, in certain embodiments the opposite side of the pre-absorber heat exchanger 625 retains a flow of cool water collected as a part of the process, as discussed below) before it is passed, via flow path 621, into the top of the absorber 610 to collect additional water vapor from ambient air With reference again to the MVC evaporator vessel 633 shown in FIG. 12, the water vapor that evaporates from the dilute desiccant fluid exits the MVC evaporator vessel via flow path 651. The water vapor passes through a series of compressors 652 that are each configured to sequentially increases the pressure of water vapor, thereby raising the saturation temperature of the water vapor that exits the series of compressors at flow path 653. Although 6 compressors are illustrated in FIG. 12, it should be understood that any number of compressors may be implemented, such as a single compressor, 2 compressors, 3 compressors, 4 compressors, 5 compressors, 6 compressors, 7 compressors, and/or the like. In certain embodiments, a liquid entrapment device is installed upstream of the series of compressors 652 (or a liquid entrapment device may be installed upstream of each individual compressor within the series of compressors 652) to minimize the amount of entrained liquid in the vapor that reaches the compressors 652. Moreover, each of the plurality of compressors may additionally or alternatively have a water injection mechanism to reduce the super heated temperature of the water vapor (and/or to generally cool each of the compressors 652). The vapor exiting the series of compressors 652 is then passed through either a series of pipes (that define flow path 653) and/or another heat exchanger in the MVC evaporator vessel 633 (as shown in FIG. 11, for example) or in another process line as shown in FIG. 12 allowing for latent heat to transfer to the original desiccant fluid entering the MVC evaporator vessel 633. For example, the compressed water vapor passes through condenser 627, which utilizes sensible heat transfer (from the water vapor and to the dilute desiccant fluid) as a part of the condensation process to condense the water vapor into liquid water. In certain embodiments, the condensed water exiting the condenser at flow path 654 may then be passed through another heat exchanger (not shown) that also utilizes sensible heat transfer prior to the liquid water being stored or used as potable water within storage tank 655. As shown in FIG. 12, the storage tank 655 has a draw-off line to enable usage of the water (along flow path 656-658, inclusive of an optional pump 657 (e.g., a centrifugal pump, a positive displacement pump, and/or the like) between flow paths 656 and 658). Certain embodiments need not include a pump if the storage tank 655 is elevated above a usage area (thereby using potential energy to enable water to drain from the storage tank 655 as it is needed). Moreover, the storage tank 655 has a gas vent 659 for ensuring the pressure within the storage tank 655 remains at approximately atmospheric pressure. In certain embodiments, the storage tank 655 additionally comprises a pressure reduction mechanism 659a-659c for actively ensuring that the pressure within the storage tank remains below atmospheric pressure via pump 659b that maintains a negative pressure within the storage tank 655 to draw water into the storage tank along flow path 654. In certain embodiments, the storage tank 655, the draw-off line 656-658, and/or the flow path 654 may additionally comprise one or more water purification mechanisms, such as a carbon-based water filter. It should be noted that water condensed from water vapor extracted from the dilute desiccant fluid is at least substantially distilled water even without purification, and therefore a remineralization process may be included within the storage tank 655, the draw-off line 656-658, and/or flow path 654 to add various minerals (e.g., fluoride, calcium, iron, and/or the like) to the water before usage, depending on the intended end use of the water.

In certain embodiments, multiple MVC evaporator vessels are provided in series, such that the desiccant fluid from an upstream MVC evaporator vessel is passed to a downstream MVC evaporator vessel, to increase the concentration of the rich desiccant fluid to a desired concentration. If a series setup is used, the rich desiccant fluid is routed from a first MVC evaporator vessel to a next (downstream or "second") MVC evaporator vessel where the rich desiccant fluid undergoes an analogous process for evaporating water vapor from the desiccant fluid. In such embodiments, a second set of one or more heating subsystems may be positioned along a desiccant flow path between the exit of an upstream MVC evaporator vessel and the inlet of a downstream MVC evaporator vessel. The second set of one or more heating subsystems comprise one or more of a pre-evaporator heat exchanger and/or a heater. The rich desiccant fluid leaves the first MVC evaporator vessel and passes through a pre-evaporator heat exchanger (and/or a heater) upstream of the second MVC evaporator vessel to increase the temperature of the desiccant fluid. In certain embodiments the desiccant fluid may pass through a pre-evaporator heat exchanger prior to (upstream of) both of the first and second MVC evaporator vessels. The dilute desiccant fluid may also utilize a heater (e.g., an externally powered heater, such as an electric heater, a natural gas heater, and/or the like) encompassed within the second set of one or more heating subsystems to heat the desiccant fluid up to or close to the evaporation temperature before the desiccant fluid enters the second MVC evaporator vessel. The desiccant fluid is passed into the second MVC evaporator vessel where it is subjected again to a vacuum to lower the evaporation temperature. Additional water in the desiccant fluid is vaporized in the second MVC evaporator vessel and passed through a compressor in a manner analogous to that shown in FIG. 10. The compressor (relating to the second MVC evaporator vessel) raises the pressure of the vapor hence raising the saturation temperature of the water vapor. A liquid entrapment device may be installed prior to (upstream of) the compressor to minimize any entrained liquid in the vapor from reaching the compressor. The vapor exiting the compressor is then passed through either a series of pipes or another heat exchanger in the second MVC evaporator vessel or in another process line analogous to that shown in FIG. 10 allowing for the latent heat to transfer to the original liquid in the second MVC evaporator vessel. The condensed water is then passed through a heat exchanger going to the second MVC evaporator vessel to utilize sensible heat transfer prior to being stored or used as potable water in the storage tank 655.

In certain embodiments the MVC evaporator vessel 633 may be of split geometry encompassing two sections. One section acts as the original MVC evaporator vessel 633 and the other section acts as a condensing heat exchanger allowing the dividing wall to act as the heat transfer surface thereby moving the location of the condensing heat exchanger to inside the vessel. As discussed above in reference to FIG. 11, the MVC evaporator vessel 633 may alternatively utilize a shell-and-tube style of heat exchange to enable condensation to occur therein, such that the surfaces of the tubes within the interior of the MVC evaporator vessel 633 operate as the heat transfer surface. Moreover, with reference again to FIGS. 9-10, at least a portion of the water exiting the condenser 627 (or an alternative water source) may be redirected from flow path 654 (of FIG. 10) to flow path 661 (shown in FIG. 9) and through a geothermal cooling mechanism 662 to reduce the temperature of the water prior to the water being utilized to cool the rich desiccant fluid via pre-absorber heat exchanger 625 that is provided for cooling the rich desiccant fluid prior to introduction of the rich desiccant fluid into the absorber 610. The cooled water exits the geothermal cooling mechanism at flow path 663 and through a pump 664 before passing along flow path 665 into pre-absorber heat exchanger 625. The water exiting pre-absorber heat exchanger 625 passes along flow path 666, where it can be recirculated into flow path 661. To return the water to the storage tank 655 of FIG. 10, a series of valves may be configured such that the water exiting pump 664 (downstream of the geothermal cooling mechanism 662) is directed along flow path 667 which intersects flow path 654 of FIG. 10 (the intersection not shown in the figures) and/or otherwise is provided to an input of the storage tank 655.

Mechanical Vapor Compression Based Example Operation

The following discussion provides an example illustration of the operation of an embodiment utilizing MVC according to FIGS. 9-10 (with specific call outs provided to alternatives illustrated in FIGS. 11-12, as appropriate) as a part of an atmospheric water generation system and method. It should be noted that recitation of the term "about" with reference to a numerical value (e.g., a temperature value, a pressure value, and/or the like) encompasses both the value itself as well as deviations from the temperature value that provide the same functional operation of the methodology in which the value is recited. For example, a recitation of a temperature range between "about" 10° F. to "about" 50° F. is intended to encompass a temperature range between 10° F. to 50° F., as well as slight deviations in the upper and lower bounds of the temperature range that provide the same functionality as the recited temperature range. Moreover, MVC may be utilized with any of a variety of desiccant fluids, as the MVC process is not dependent on the desiccant fluid utilized. Any one of a plurality of desiccant fluids may be utilized, including the non-limiting examples of $CaCl_2$, NaCl, LiCl, KCOOH, $MgCl_2$, Ionic liquids, Deep Eutectic Solvent, Organic Liquids and/or any combination thereof. The following example methodology for Mechanical Vapor Compression is described as utilizing $CaCl_2$ and the temperatures and pressures discussed herein are provided specifically for use with $CaCl_2$, therefore it should be understood that other pressure and temperature ranges may be provided for embodiments utilizing other desiccant fluids.

A $CaCl_2$ desiccant fluid exiting the absorber 610 of FIG. 9 at flow path 622 exits the absorber at a concentration between about 10% and about 50% by weight percent, and a temperature between about 75° F. and about 130° F. The desiccant fluid flows along flow path 622, through pump 623, along flow path 626 and through condenser 627. In certain embodiments the condenser 627 is of the shell and tube type with the desiccant fluid entering on the tube side of the heat exchanger. Water vapor produced as a result of the overall process enters the shell side and is condensed in the condenser 627. In another embodiment the condenser 627 is a plate and frame heat exchanger. Desiccant fluid enters one set of plates while water vapor enters the other set of plates. Water vapor condenses in the condenser 627 as it traverses through the condenser 627 as it warms the desiccant fluid. In another embodiment, the condenser 627 is a double pipe heat exchanger where the desiccant fluid enters the double pipe heat exchanger through the inner pipe. Water vapor enters the heat exchanger via the outer pipe. Water vapor condenses on the exterior surface of the inner pipe as it traverses through the condenser 627.

In certain embodiments, the flow pattern through the condenser 627 is in a counter current orientation. In other embodiments flow patterns through the condenser 627 are in the co-current orientation depending on the shape and orientation of the heat exchanger embodying the condenser 627.

Upon exiting the condenser 627 via flow path 628, the dilute desiccant fluid temperature is between about 132° F. and about 170° F. The dilute desiccant fluid is then sent to a pre-evaporator heat exchanger 629 where sensible heat transfer from rich desiccant fluid (flowing from 636, through heat exchanger 629 to 637) further heats the dilute desiccant fluid. In certain embodiments the pre-evaporator heat exchanger 629 is a shell- and-tube heat exchanger with the dilute desiccant fluid entering on the tube side of the pre-evaporator heat exchanger 629. Rich desiccant fluid flow path 636 enters the shell side of the pre-evaporator heat exchanger 629. In another embodiment, the dilute desiccant fluid enters the shell side of the pre-evaporator heat exchanger 629, and the rich desiccant fluid enters the tube side of the pre-evaporator heat exchanger 629. In another embodiment the pre-evaporator heat exchanger 629 is a plate and frame heat exchanger. Dilute desiccant fluid enters one set of plates while rich desiccant fluid enters the other set of plates. In another embodiment the pre-evaporator heat exchanger 629 is a double pipe heat exchanger where the dilute desiccant fluid enters the double pipe heat exchanger via the inner pipe and rich desiccant fluid enters the heat exchanger via the outer pipe.

The dilute desiccant fluid exits the pre-evaporator heat exchanger 629 at flow 630 between a temperature of about 140° F. and about 210° F. The dilute desiccant fluid then traverses through the heater 631. The heater 631 may be an inline electric heater with element bundles for heating the fluid. The heater 631 may have different orientations to reduce the likelihood of fluid flashing on the elements. In certain embodiments, the heater 631 may reside in the MVC evaporator vessel 633. In certain embodiments the heater 631 is a heat exchanger of the shell-and-tube or plate-and-frame type. In certain embodiments the heater 631 is a solar heater utilizing photovoltaic panels to generate energy through electricity from solar capture. In certain embodiments, the heater 631 is a frenal lens utilizing solar energy to generate thermal energy in the form of heat. In certain embodiments the heater 631 is a geothermal heater as discussed herein. In certain embodiments the heater 631 is a fired heater utilizing a hydrocarbon fuel source combined with oxygen to create heat from combustion. In certain embodiments, the oxygen is used from the ambient air. Upon exiting the heater 631, the dilute desiccant fluid is between a temperature of between about 150° F. and about 270° F.

The dilute desiccant fluid then passes along flow path 632 to MVC evaporator vessel 633. In certain embodiments a reducing orifice is provided at the interface between flow path 632 and MVC evaporator vessel 633 to lower the pressure of the entering dilute desiccant fluid prior to the dilute desiccant fluid entering the MVC evaporator vessel 633. The pressure reduction through the orifice is between about 5 PSIG and about 30 PSIG. In certain embodiments the reduction orifice is positioned upstream of the one or more heater sub systems.

The interior of the MVC evaporator vessel 633 may is subject to a vacuum between about −3 PSIG and about −14.6 PSIG. In certain embodiments, a vacuum pump is attached to the MVC evaporator vessel 633. In certain embodiments, a vacuum pump is attached to storage tank 655 which provides a negative pressure on the system via flow paths 654, 653, and 651 (and the intervening components). In certain embodiments, vacuum pumps are attached to both the storage tank 655 and MVC evaporator vessel 633 (analogous to that shown in FIG. 12).

Water vapor separates from the dilute desiccant fluid due to the bubble point being reached by the dilute desiccant fluid from the heater 631 and lower pressure in the MVC evaporator vessel 633. Water vapor is then sent through the compressor 652, where it is compressed between about 0.1 PSIG and about 5 PSIG. Water vapor then exits the compressor 652 at a temperature between about 160° F. and about 370° F. The water vapor is sent to the condenser 627 where latent heat of condensation is transferred to the dilute desiccant fluid as discussed above. Liquid water exits the condenser 627 via flow path 54 at a temperature between about 75° F. and about 180° F. The water is then collected in the storage tank 655. When water is needed, or the storage tank 655 is full, the pump 657 removes water from the storage tank 655. The pump 657 may be of the centrifugal, or positive displacement type pump. In certain embodiments, the storage tank 655 is elevated above the final dispensing point and potential energy is used to drain the storage tank 655. The stored water may be further purified via one or more purification and/or filtration mechanisms. It should be noted that the water in the storage tank 655 has been distilled and is ultra-pure water. In certain embodiments a carbon filter may be added between the storage tank 655 and a dispensing point (accessible via flow path 658). In certain embodiments a remineralization process is added between the storage tank 655 and the dispensing point.

With reference again to the MVC evaporator vessel 633, rich desiccant fluid exits the MVC evaporator vessel at 634 at a temperature between about 150° F. and about 270° F. after water has been separated. The weight percent of the $CaCl_2$ within the desiccant fluid increases between about 0.1% and about 15% by weight percent relative to the dilute desiccant fluid. The rich desiccant fluid is passed through the pump 635, which carries the rich desiccant fluid through the pre-evaporator heat exchanger 629 where sensible heat transfer from the rich desiccant fluid to the dilute desiccant fluid takes place. The rich desiccant fluid then exits the pre-evaporator heat exchanger 629 at a temperature between about 135° F. and about 173° F. The rich desiccant fluid is then sent back to the inlet of the absorber 610 along flow path 637 to flow path 624 to flow path 621 (through intervening pumps and heat exchangers). In certain embodiments, the rich desiccant fluid is cooled to a temperature between about 50° F. and about 80° F. prior to entering the absorber 610, where it absorbs additional water condensed from humidity in ambient air.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

In certain embodiments, various portions of the AWG system may be enclosed within one or more shipping containers that may be easily transported as modular system components to desired operating locations. For example, the air preconditioning system may be enclosed within a first container, and one or more water consolidation systems (e.g., a single-stage batch water consolidation system and/or a continuous water consolidation system) may be enclosed within a second shipping container, with various ports/inlets extending through walls of the shipping containers to enable connection with one or more geothermal cooling systems, solar heating systems, high-pressure gas inputs, and/or the like. In certain embodiments, one or more condensation systems, water storage tanks, and/or the like may be embodied within a third storage container. However, it should be understood that certain embodiments may be configured such that the entirety of the AWG system may be enclosed within a single storage container, with one or more ports/ inlets extending through walls thereof to enable interaction with aspects of the surrounding environment (e.g., air inlets/ exhausts, high pressure gas inlets, solar heating inlets/ outlets, geothermal cooling inlets/outlets, and/or the like).

That which is claimed:

1. A system for extracting water from atmospheric air, the system comprising:
   an absorber configured to dilute a desiccant fluid from a rich desiccant fluid state to a diluted desiccant fluid state by absorbing water vapor from atmospheric air passing across the desiccant fluid within the absorber;
   an evaporator vessel configured to concentrate the desiccant fluid from the diluted desiccant fluid state by evaporating water vapor from the desiccant fluid and to direct the evaporated water vapor toward a compressor;
   a liquid entrapment device, wherein the liquid entrapment device is configured to receive evaporated water vapor from the evaporator vessel and reduce an amount of entrained liquid in the evaporated water upstream of the compressor;
   a desiccant flow path from the absorber to the evaporator vessel for providing the desiccant fluid from the absorber to the evaporator vessel, wherein the desiccant flow path comprises one or more heating subsystems and wherein the one or more heating subsystems comprises:
      a heat exchanger for exchanging heat from desiccant fluid exiting the evaporator vessel with the desiccant fluid passing along the desiccant flow path between the absorber and the evaporator vessel; and
      a condenser configured to condense the water vapor after the compressor raises a vapor pressure of the water vapor, wherein the condenser defines at least a portion of the desiccant flow path and wherein the condenser is configured to utilize sensible heat transfer between the desiccant fluid flowing through the condenser and the water vapor to lower a temperature of the water vapor to condense the water vapor into condensed water.

2. The system of claim 1, wherein an interior of the absorber defines a plurality of packing components, a desiccant inlet proximate an upper end of the absorber and a desiccant outlet proximate a lower end of the absorber, wherein one or more absorption beds are configured such that liquid desiccant flowing from the desiccant inlet to the desiccant outlet flows substantially horizontally across the one or more absorption beds.

3. The system of claim 2, wherein the absorber additionally defines an atmospheric air inlet proximate the lower end of the absorber and an atmospheric air outlet proximate the upper end of the absorber.

4. The system of claim 1, further comprising an input heat exchanger within a portion of the desiccant flow path upstream of the absorber, wherein the input heat exchanger is cooled by a cool water flow, wherein the cool water flow is cooled via a geothermal cooling system prior to introduction to the heat exchanger.

5. The system of claim 1, wherein the one or more heating subsystems comprises a heater positioned downstream of the heat exchanger.

6. The system of claim 1, wherein the desiccant flow path is configurable via a plurality of valves between:
   a first configuration in which desiccant fluid exiting the absorber in the diluted desiccant fluid state is redirected to an inlet of the absorber to be provided to the absorber as the desiccant fluid in a rich state;

a second configuration in which desiccant fluid exiting the absorber is directed to the evaporator vessel;

a third configuration in which desiccant fluid exiting the evaporator vessel is redirected to an inlet of the evaporator vessel; and a fourth configuration in which desiccant fluid exiting the evaporator vessel is directed to the inlet of the absorber to be provided to the absorber as the desiccant fluid in the rich state.

7. The system of claim 1, wherein the evaporator vessel is a first evaporator vessel, and wherein the system further comprises a second evaporator vessel connected downstream to the first evaporator vessel such that desiccant solution exiting the first evaporator vessel is directed to the second evaporator vessel.

8. The system of claim 7, further comprising a second set of one or more heating subsystems located between the first evaporator vessel and the second evaporator vessel, wherein the second set of one or more heating subsystems comprises a second heat exchanger for exchanging heat from desiccant fluid exiting the second evaporator vessel with the desiccant fluid passing to the second evaporator vessel.

9. The system of claim 1, further comprising a water storage tank for holding the condensed water.

10. The system of claim 1, further comprising:
a closed air flow loop, wherein the closed air flow loop circulates air flow through the evaporator vessel and carries the water vapor from the evaporator vessel to the condenser.

11. The system of claim 10, wherein the condenser condenses the water vapor in the closed air flow loop into liquid water, and wherein the closed air flow loop returns from the condenser to the evaporator vessel.

\* \* \* \* \*

UNITED STATES PATENT AND TRADEMARK OFFICE
CERTIFICATE OF CORRECTION

| | | |
|---|---|---|
| PATENT NO. | : 12,276,090 B2 | Page 1 of 1 |
| APPLICATION NO. | : 17/552173 | |
| DATED | : April 15, 2025 | |
| INVENTOR(S) | : Stuckenberg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
Twelfth Day of August, 2025

Coke Morgan Stewart
*Acting Director of the United States Patent and Trademark Office*